United States Patent [19]
Bannai et al.

[11] Patent Number: 5,390,033
[45] Date of Patent: Feb. 14, 1995

[54] METHOD AND APPARATUS FOR TURNING OVER PAGES OF BOOK-ORIGINAL

[75] Inventors: Kazunori Bannai, Tokyo; Kazushige Taguchi, Warabi; Tetsuya Fujioka, Yokohama; Hiroshi Takahashi, Kawasaki; Fumio Kishi, Yokohama, all of Japan

[73] Assignee: Ricoh Company, Ltd., Tokyo, Japan

[21] Appl. No.: 803,058

[22] Filed: Dec. 6, 1991

[30] Foreign Application Priority Data

Jul. 19, 1991 [JP] Japan ................... 3-179788

[51] Int. Cl.[6] ............................. H04N 1/04
[52] U.S. Cl. .................... 358/498; 358/400
[58] Field of Search ........... 358/474, 400, 401, 486, 358/488, 496, 497, 498; 355/81, 82, 23, 24, 25, 308, 320, 210, 233; 271/191, 193

[56] References Cited

U.S. PATENT DOCUMENTS

| | | | |
|---|---|---|---|
| 4,693,594 | 9/1987 | Garavuso et al. | 355/25 |
| 5,121,170 | 6/1992 | Bannai et al. | 271/193 |

FOREIGN PATENT DOCUMENTS

| | | | |
|---|---|---|---|
| 57-208300 | 12/1982 | Japan | B42D 19/04 |
| 62-35891 | 2/1987 | Japan | B42D 9/04 |
| 62-267196 | 11/1987 | Japan | B42D 9/00 |
| 403162341A | 7/1991 | Japan | 271/193 |

Primary Examiner—Edward L. Coles, Sr.
Assistant Examiner—Jerome Grant, II
Attorney, Agent, or Firm—Oblon, Spivak, McClelland, Maier, & Neustadt

[57] ABSTRACT

A method for turning over a page of a book-type original using a belt as a device for turning over the page. The original is set with spread pages arranged upward. The method includes the steps of disposing the belt over spread pages of the original so that the belt comes in contact with a surface of the spread pages, attracting one of the spread pages of the original to the belt by an attracting devices, and deforming a part of the belt upward at a portion of the belt continuously along the surface of the spread pages while moving the portion from one end of the page to the other end thereof so that the page attracted to the belt is separated from a next page of the original.

20 Claims, 47 Drawing Sheets

METHOD AND APPARATUS FOR TURNING OVER PAGES OF BOOK-ORIGINAL

BACKGROUND OF THE INVENTION

1. Field of the Invention

The present invention relates to a method and apparatus for turning over pages of a book-original, i.e., a bound book to be used as an original for copy or facsimile transmission applied to a copying machine or a facsimile apparatus.

2. Description of the Related Art

As an original reading device for a copying machine or a facsimile apparatus, there has been known an automatic document feeder (ADF) which automatically feeds a sheet of original to a scanning position of the device where the original is read and automatically discharges the original from the scanning position after the original is read.

As mentioned above, if the original is composed of sheets of paper, it is possible to automatically read information from the original by using the ADF. However, if the original is composed of a bound book, the pages of the original book has to be turned over by hand since there has been no practical automatic page turning over device realized until now.

With respect to such a book-original, various kinds of methods and apparatuses have been proposed to automate the reading and turning over operation of the book-original which is very troublesome and time consuming.

However, the proposed techniques are merely ideas of desire and far from the level of practical use.

The techniques in relation to the method and apparatus for automatic book-original reading and turning over pages are proposed in, for example, Japanese Patent Applications Laying Open (KOKAIs) No.54-21836 titled "READING DEVICE OF COPYING APPARATUS", No.61-28449 titled "AUTOMATIC PAGE TURNING OVER DEVICE FOR BOOK TYPE ORIGINAL", No.56-60294 titled "PAGE TURNING OVER DEVICE FOR BOOK", No.60-122932 titled "IMAGE FORMING DEVICE", No.63-47197 titled "AUTOMATIC PAGE TURNING OVER DEVICE", No.63-47198 titled "AUTOMATIC PAGE TURNING OVER DEVICE", No.63-49743 titled "ORIGINAL TREATMENT DEVICE", No.63-49744 titled "ORIGINAL TREATMENT DEVICE", No.63-49745 titled "ORIGINAL TREATMENT DEVICE", No.63-49746 titled "ORIGINAL TREATMENT DEVICE", No.63-49747 titled "ORIGINAL TREATMENT DEVICE", No.63-49748 titled "ORIGINAL TREATMENT DEVICE", No.63-49749 titled "ORIGINAL TREATMENT DEVICE", No.63-50825 titled "ORIGINAL TREATMENT DEVICE", No.63-50826 titled "ORIGINAL TREATMENT DEVICE", No.63-50827 titled "ORIGINAL TREATMENT DEVICE", No.63-50828 titled "ORIGINAL TREATMENT DEVICE", No.63-51192 titled "ORIGINAL TREATMENT DEVICE", No.63-41192 titled "PAGE TURNING OVER DEVICE", No.63-42895 titled "AUTOMATIC PAGE TURNING OVER DEVICE", Japanese Utility Model Application Laying Open (KOKAI) No.63-43141 titled "ORIGINAL TURNING OVER DEVICE", Japanese Patent Applications Laying Open (KOKAIs) No.63-67191 titled "PAGE TURNING OVER DEVICE", No.63-67192 titled "PAGE TURNING OVER DEVICE", Japanese Utility Model Application Laying Open (KOKAI) No.63-41588 titled "DEVICE FOR TURNING OVER PAGES OF BOOK", Japanese Patent Applications Laying Open (KOKAIs) No.62-267196 titled "SAFETY DEVICE FOR PAGE TURNING OVER DEVICE", No.62-267197 titled "SAFETY DEVICE FOR PAGE TURNING OVER DEVICE", No.62-234462 titled "IMAGE SCANNER", No.63-33738 titled "COPYING MACHINE", No.62-273892 titled "PAGE TURNING OVER DEVICE" and No.63-64797 titled "PAGE TURNING OVER DEVICE".

Of all the almost unpractical proposed techniques, there are some useful ideas which have possibility of realization for practical use such as the technique described in the patent documents 61-284492 and 62-35891. The technique adopts a method for turning over pages of a book-original wherein the pages are turned over in such a way that the book is opened at a page to be read and placed with the page being downward on a scanning plate and that the book is shifted while the page is being sucked so that the page is separated and turned over.

However, in accordance with the above mentioned proposed technique, since the book is placed and moved on the scanning plate with the page to be read being downward, the page surface rubs the plate surface with being pressed by the weight of the book, which adversely acts on the function of turning over the page, thus decreasing the reliability of the device.

Also, the structure of the device of the related art page turning over technique is bulky and complicated.

It is to be noted that there is proposed another technique of the related art wherein the original turning over arrangement is made in such a way that the book is opened and placed with the page to be read being upward and that the page is turned over by mechanical means such as a roller or an arm or vacuum means. However, such an arrangement makes the whole structure of the copying apparatus bulky since the large space is necessitated for the page turning over device to move above the book-original.

Also, in accordance with the page turning over device of the related art, the page is not reliably turned over.

Referring now to another point of the related art, when a book-original is to be read or scanned for copy, for instance, the ranges spanning several pages in the middle of the book are usually to be read which ranges are not continuous each other.

It is desirable that the pages in the ranges be automatically read and turned over to raise the functionability of the book-original turning over and reading device for the sake of easy manipulation of the device.

However, the page turning over device of the related art does not comprise means for automatically turning over the pages in a specified range of the book-original.

Therefore, in accordance with the page turning over device of the related art, the operator has to open the book and set the desired page in the range, which takes much time to scan the pages of the range and makes the device inconvenience to manipulate.

On the other hand, from the another point of view, each paper of almost all of the book-originals (more than 90 percents) has information printed to be read or scanned on both sides thereof.

Therefore, the first page to be read can be either the left side page or the right side page of the book opened and placed on the scanning plate.

Accordingly, if the first page to be scanned is not indicated, the unnecessary page may be read, instead, which wastes a copy and time for reading the necessary pages and impairs the convenience of the device.

Also, in accordance with the page turning over device of the related art, the pages of the book-original are turned over by moving the device with respect to the book placed on the scanning plate.

Therefore, if the device is moved back without the page being securely held, the motion of the device may be disturbed so that a stable motion of the device is not realized.

Referring still another aspect of the page turning over device of the related art, in accordance with the device wherein the book-original is placed being opened with the spread pages to be scanned being upward, the original page surface becomes curved instead of flat due to the spine of the book.

Accordingly, if the scanning device is constructed so that the spread pages are scanned by a scanning optical system which is moved along the original in a state of being in contact with the original surface, unless the book-original is pressed against the plate to be flattened or the optical system is moved along the curve of the original page, the original can not correctly be imaged and read since focal point of the optical system becomes dislocated due to the curve of the original surface.

Especially, if the optical system is constructed from an equimultiple optical system, the dislocation of the focal point of the optical system becomes large since the allowable focal range of the system is small.

Also, if the optical system is constructed so that it scans the original with being in contact with the page surface, the optical system rubs the page surface and the functional reliability of turning over the pages is reduced, which then impairs the scanning reliability of the system.

Also, in the above mentioned device of the related art, the book-original is read and pages are turned over by moving an original reader unit having a page turning over means with respect to the book-original placed on the scanning plate.

It is desirable that such a related art device comprise a pressing means for holding the book-original down against the scanning plate at the time of reading operation. However, from the point of mechanical structure, it is difficult to combine such a pressing means and the scanning system. Therefore, the related art device does not comprise a pressing means for pressing the spread pages of the book-original against the plate to flatten the pages to be scanned, which degrades the reliability of scanning the original and turning over the pages of the book.

Especially, if the device is so constructed that the scanning system or the page turning over means moves on and along the original with being in contact with the spread pages of the original book, it becomes further difficult to realize the stable function of scanning the original and turning over the pages, since the original page surface is easily moved and dislocated.

SUMMARY OF THE INVENTION

The present invention was made considering the above mentioned points.

It is therefore a primary object of the present invention to provide a method and apparatus for turning over pages of a book-original wherein a stable and reliable page turning over function is repeatedly performed over the wide range of pages, by a arrangement of a belt means for separating the page of the book-original by being sucked by the belt.

Another object of the present invention is to provide a method and apparatus for turning over pages of a book-original wherein both of the reading function of the book-original and the page turning over function are conveniently combined together and a compact structure can be realized.

Still another object of the present invention is to provide a method and apparatus for turning over pages of the book-original wherein pages are automatically turned over by setting the range of pages to be scanned so that the original reading time can be shortened and the convenience in relation to manipulation of the device is heightened.

Still another object of the present invention is to provide an optical reader apparatus for reading a book-original wherein the pages of the book can be reliably turned over at a high speed and the structure becomes compact.

Still another object of the present invention is to provide an optical reader apparatus for reading a book-original wherein convenience in manipulation is enhanced so that the operation time for reading the original is shortened and miscopies can be avoided.

Still another object of the present invention is to provide a compact apparatus for turning over pages of a book-original which is able to reliably turn over pages by an arrangement wherein a separated page is inserted into a page turning over unit which moves in the direction toward the page to be superposed on and wherein the inserted page is discharged onto the page to be superposed on from the side opposite to the inserted side.

Still another object of the present invention is to provide a method and apparatus for turning over pages of a book-original wherein the pages can be stably and reliably turned over spanning a wide range of pages of the book, with the use of a fixed belt which sucks and separates the page of the book.

A further object of the present invention is to provide a book-original reading apparatus which is able to obviate the problem of focal point dislocation so as to accurately read the original by an arrangement wherein the optical scanning system is shifted vertically at the time of scanning the original.

A still further object of the present invention is to provide a book-original reading apparatus which makes it possible to attenuate the friction between the scanning system and the original page surface as well as to raise the reliability of turning over the pages of the book and scanning the page by an arrangement wherein the optical system scans the original in a state being separated from the original surface.

A still further object of the present invention is to provide a book-original reader apparatus which is able to stably and accurately read and turn over pages of the book-original by an arrangement of a belt means which securely holds down the original surface at the time of reading or turning over the page.

Above mentioned objects of the present invention can be achieved by the arrangement of the present invention and preferred variants thereof summarized below, that is, by a method for turning over a page of a book-type original using an endless belt as a means for turning over the page, the original being set with spread pages arranged upward, the method comprising steps of:

disposing the belt over spread pages of the original so that the belt comes in contact with a surface of the spread pages;

sticking one of the spread pages of the original to the belt by a sticking means; and deforming a part of the belt upward at a portion of the belt continuously along the surface of the spread pages while moving the portion from one end of the spread pages to the other end thereof so that the page stuck to the belt is separated from a next page of the original.

The objects mentioned above can also be achieved by an apparatus for turning over a page of a book-type original which is set with spread pages being arranged upward, the apparatus comprising:

an endless belt arranged for turning over the page;

a page sticking means for sticking one of the spread pages to the belt; and a belt deforming means for deforming a part of the belt upward at a portion of the belt; and a movable means for moving the belt deforming means continuously along a surface of the spread pages so that the page stuck to the belt is separated from a next page to the original.

The objects of the present invention can also be achieved by an apparatus for turning over a page of a book-type original according to the above mentioned arrangement, wherein the page sticking means is composed of a means for applying uneven electric fields to the belt.

The objects of the present invention can also be achieved by an apparatus for turning over a page of a book-type original according to the above mentioned arrangement, wherein the apparatus further comprises a means for erasing the uneven electric fields applied on the belt.

The objects of the present invention can also be achieved by an apparatus for turning over a page of a book-type original according to the above mentioned arrangement, wherein the apparatus further comprises a bias roller which is arranged in contact with the belt and commonly constitutes the uneven electric fields applying means and the erasing means as well.

In accordance with the arrangements of the present invention mentioned above, since a belt is used for turning over the pages, the spread page of the book is stuck to the belt and separated from the next page of the book by continuously deforming the belt partly upward along the spread pages from one end thereof to the other end.

Also, in accordance with the present invention, the page sticking unit applies uneven electric fields to the page turning over unit as a result of which the page is reliably stuck to the belt by electrostatic force for a wide range of sticking portion.

Further, in accordance with the present invention, the uneven electric fields applied to the belt is erased by a high frequency electricity erasing unit.

Further, in accordance with the present invention, a bias roller is arranged in contact with the page turning over unit for commonly functioning as a member to apply the uneven electric fields to the page turning over unit and also as a member to erase the uneven electric fields from the page turning over unit by a high frequency voltage.

Therefore, an advantage of the present invention is that at the time of starting the page turning over unit and the original reading unit, in the case where the upper portion of the apparatus is being open or incompletely closed when the book is overly thick, it becomes possible to prohibit the scanning motion of the reading unit, which makes it possible to realize a stable function of the apparatus and prevent the book-original from being damaged.

Also, another advantage of the present invention is that since the alarm is displayed in the case where the scanning operation is started with the upper portion of the apparatus being open, it becomes possible not only to keep the original from being damaged but avoid waste of time or danger situation due to the misoperation by the user, which raise the convenience of the apparatus in operation for reading the original.

The objects of the present invention mentioned before can also be achieved by a book-original reading method for reading information from a book-original and turning over a page of the original which is placed on an original mounting surface, the method is characterized by that a page turning over means and an original reading means are moved forward and backward with respect to a surface of the original so as to scan the page to read information from the page and turn over the read page.

The objects of the present invention can also be achieved by a book-original reading method according to the above mentioned arrangement, wherein the original is set with spread pages to be read being arranged upward at a position on the mounting surface where the original is to be read.

The objects of the present invention can also be achieved by a book-original reading apparatus for reading a book-original comprising:

means for turning over one of spread pages of the book-original which is spread and placed on an original mounting surface at a reading position thereof;

means for reading information from one of the spread pages; and means for driving to move forward and backward the page turning over means and the information reading means, respectively.

The objects of the present invention can also be achieved by a book-original reading apparatus according to the above mentioned arrangement, wherein the driving means for driving the page turning over means and the driving means for driving the information reading means are constituted from one common drive means.

In accordance with the above mentioned arrangement of the present invention, it is an advantage that it becomes possible to realize a compact structure of the book-original reading apparatus and method having an original reading function and page turning function as well.

Also, it becomes possible to realize a compact and inexpensive book-original reading apparatus since the page turning over unit and the original reading unit can be driven by one common drive unit.

The objects of the present invention can also be achieved by a book-original reading apparatus comprising:
        means for turning over one page of a book-original which is placed at an original reading position on an original mounting surface with spread pages being arranged upside;
        means for reading original information from the spread pages by scanning the pages; and
        means for setting a total number of pages to be read on the basis of which the book-original is scanned and read after the book-original is placed at the reading position on the mounting surface with a first page to be read being opened.

The objects of the present invention can also be achieved by a book-original reading apparatus comprising:
        means for turning over one page of a book-original which is placed at an original reading position on an original mounting surface with spread pages being arranged upside;
        means for reading original information from the spread pages by scanning the pages;
        means for setting a first page to be read from which page the reading operation is started; and
        means for setting last page to be read.

In accordance with the above mentioned arrangements of the present invention, it is an advantage that since the range of pages to be read is set in advance and the pages are read automatically, it becomes unnecessary to open the book and set the page to be read every time the reading operation is started by the manual operation by the user, which makes it possible to avoid wasting of time and labor and raise the convenience of the apparatus from the point of manipulation thereof as well as to realize an automated structure for the apparatus.

The objects of the present invention can also be achieved by a book-original reading apparatus comprising:
        means for turning over one page of a book-original which is placed at an original reading position on an original mounting surface with spread paged being arranged upside; and
        means for reading original information from the spread pages one by one by scanning the pages;
        the apparatus being arranged in such a way that the page turning over means is constituted from a belt and that the direction of the movement of the means for turning over the page is opposite to that of the original reading means for scanning the page, so that in the scanning motion of the reading means, the belt surface is charged with electricity by an AC bias means at a portion corresponding to the page to be turned over so that when the page turning over means is moved, the page is electrostatically attracted to the belt and separated from the other pages.

In accordance with the arrangement of the present invention mentioned above, the page turning over unit is constituted from a belt and the unit is moved in the direction opposite to the scanning direction of the reading unit so that a page can be stuck to the belt and separated from the next page by electrostatic attraction force at the time of page turning over motion. Therefore, it is an advantage of the present invention that it becomes possible to realize a stable and small book-original reading apparatus having a high reliability and a compact structure as well as to heighten the functional speed in the page turning over process.

The objects of the present invention can also be achieved by a book-original reading apparatus according to the above mentioned arrangement, wherein the original reading means is disposed in the vicinity of the outer portion of the page turning over means composed of the belt.

The objects of the present invention can also be achieved by a book-original reading apparatus according to the above mentioned arrangement, wherein the page turning over means composed of the belt is used as a means for feeding sheet-originals and wherein a drive means for the page turning over means is constituted independent from a drive means for the original reading means so that at the time of scanning the book-original, the drive of the page turning over means is stopped.

The objects of the present invention can also be achieved by a book-original reading apparatus comprising:
        means for turning over one page of a book-original which is placed at an original reading position on an original mounting surface with spread paged being arranged upside;
        means for reading original information from the spread pages one by one by scanning the pages; and
        means for selecting and setting one of spread pages to start with for reading operation.

In accordance with the arrangements of the present invention mentioned above, the reading operation is started from a page which is directed and set in advance from the spread two pages of the book-original. Therefore, it is an advantage that it becomes possible to minimize the waste of time for reading the original and waste of copy (miscopy) and raise the convenience of the apparatus from the point of manipulation thereof.

The objects of the present invention can also be achieved by a page turning over apparatus for book-original comprising:
        an original reading means for reading original information from a book-original set so that spread pages are arranged upside in a forward scanning motion;
        a page turning over means for turning over the pages of the book-original in a backward scanning motion; and
        a page holder means which is arranged in such a way that in a first half scanning motion of the page turning over means, one page of the book-original is turned over and inserted into the holder means and that in a second half scanning motion of the page turning over means, the inserted page is discharged onto the preceding page.

The objects of the present invention can also be achieved by a page turning over apparatus for book-original according to the above mentioned arrangement, wherein the page holder means comprises a cylindrical member having an inlet along an edge of the page of the book-original so that the inserted page is housed in the cylindrical member in a state of being rolled up by being curved and separated by a curving and separating means.

The objects of the present invention can also be achieved by a page turning over apparatus for book-original according to the above mentioned arrangement, wherein the curving and separating means is constituted from a roller which also functions as a page turning over roller of a page conveyer belt for sticking and separating one page of the book-original.

In accordance with the arrangements of the present invention mentioned above, a separated page is inserted into the page turning over unit moving toward the direction to superpose the page and the page is discharged from the unit from the direction opposite to the insertion direction onto the preceding pages. Therefore, it is an advantage that it becomes possible to reliably turn over the page and realize a compact structure of the apparatus as well.

Also, in accordance with the present invention, it becomes possible to further reliably turn over pages of the book-original and realize a further compact structure due to the arrangement wherein the page separated from the book is further separated from the belt and compactly housed in the holder.

Further, in accordance with the present invention, it becomes unnecessary to prepare a special page separation means since the page curving and separation unit also functions as the page turning over roller for sticking a page and separating the page from the book one by one, thus enabling the apparatus to reliably turn over pages and realizing a compact and inexpensive apparatus.

The objects of the present invention can also be achieved by a page turning over method for turning over pages of a book-original one by one with the use of a belt as a means for turning over the pages, the method being arranged in such a way that one of spread pages of the book-original is stuck to the belt and that the shape of the belt is deformed partly upward continuously from an end of the book-original to the other end thereof so that the page stuck to the belt is separated from the next page of the book-original.

The objects of the present invention can also be achieved by a page turning over apparatus for turning over pages of a book-original one by one comprising:
a page turning over means composed of a belt for turning over the pages of the book-original;
a page sticking means for sticking one of spread pages of the book-original to the page turning over means; and
a belt deformation means for deforming the belt partly upward continuously along the book-original from an end thereof to the other end so as to separate the page stuck to the belt from the next page of the book-original, wherein the page sticking means comprises means for applying uneven electric fields to the page turning over means.

The objects of the present invention can also be achieved by a page turning over apparatus for book-original according to the above mentioned arrangement, wherein the apparatus further comprises a high frequency erasing means for erasing the uneven electric fields applied to the page turning over means.

The objects of the present invention can also be achieved by a page turning over apparatus for book-original according to the above mentioned arrangement, wherein the apparatus further comprises a bias roller which is arranged in contact with the page turning over means and constitutes a common member for applying the uneven electric fields to the page turning over means and also for erasing the uneven electric fields by high frequency voltage as well.

In accordance with the arrangements of the present invention mentioned above, since a belt is used for turning over the pages, the spread page of the book is stuck to the belt and separated from the next page of the book by continuously deforming the belt partly upward along the spread pages from one end thereof to the other end.

Also, in accordance with the present invention, the page sticking unit applies uneven electric fields to the page turning over unit as a result of which the page is reliably sticked to the belt by electrostatic force for a wide range of sticking portion.

Further, in accordance with the present invention, the uneven electric fields applied to the belt is erased by a high frequency electricity erasing unit.

Further, in accordance with the present invention, a bias roller is arranged in contact with the page turning over unit for commonly functioning as a member to apply the uneven electric fields to the page turning over unit and also as a member to erase the uneven electric fields from the page turning over unit by a high frequency voltage.

An advantage of the above mentioned arrangement of the present invention is that it becomes possible to obtain a stable page turning over function and widen the allowable range for turning over the pages due to the structure and function of the arrangement of belt mentioned above.

Also, another advantage of the present invention is that the page is stably sticked to the belt over the wide allowable range for sticking the page due to the arrangement of the uneven electric fields applied to the page turning over unit as mentioned above.

Also, still another advantage of the present invention is that it becomes possible to prevent unnecessary sticking of the page and repeat a stable page turning over function due to the arrangement of the high frequency electric charge erasing unit to erase the uneven electric fields as mentioned above.

A further advantage of the present invention is that it becomes possible to realize a compact and inexpensive book-original page turning over apparatus due to the arrangement of the common bias roller which is disposed in contact with the page turning over unit and commonly functions as a means for applying the uneven electric fields and as a means for erasing the electric fields as well, as mentioned above.

The objects of the present invention can also be achieved by a book-original reading apparatus comprising:

a reading unit including an optical reading system for scanning and reading spread pages of a book-original contacting with a surface of the spread pages; and a movable means for vertically moving the optical system in a perpendicular direction to the spread page surface.

The objects of the present invention can also be achieved by a book-original reading apparatus according to the above mentioned arrangement, wherein the optical system vertically moves up and down following the curve of the spread page surface while horizontally scanning along the page surface and pressing the surface so as to arrange the optical system in focus with the page surface.

The objects of the present invention can also be achieved by a book-original reading apparatus according to the above mentioned arrangement, wherein the apparatus further comprises:

a page turning over means for turning over pages of the book-original one by one assembled with the reading unit as one integrated body; and an optical system evacuation means for evacuating the optical system from the page surface of the book-original at the time of page turning over motion and scanning motion without reading the original information.

An advantage of the above mentioned arrangements of the present invention is that it becomes possible to accurately read the information from the original due to the arrangement of the vertically movable optical system, as mentioned above.

Also, another advantage of the present invention is that the accuracy of original reading function is further raised with a simple construction due to the arrangement of the optical system which scans the original while the original surface is being pressed.

Further, still another advantage of the present invention is that it becomes possible to raise the reliability of the page turning over function and the scanning motion without reading information from the original so that a stable function is realized without damaging or staining the original surface or optical system due to the friction between the original surface and the optical system.

The objects of the present invention can also be achieved by a book-original reading apparatus comprising:

an original reading unit for scanning and reading original information from spread pages of a book-original in a state of coming in contact with the spread page surface; and a belt member which is disposed over the book-original and presses the spread page surface of the book-original opening a space for reading the original information from the spread pages by the reading unit.

The objects of the present invention can also be achieved by a book-original reading apparatus according to the above mentioned arrangement, wherein the belt member is used as a means for turning over pages of the book-original one by one and at the time of turning over the page, the reading unit is moved to scan the book-original in a state where the belt member is being fixed.

An advantage of the arrangement of the present invention mentioned above is that it becomes possible to avoid the dislocation or displacement of the book-original at the time of reading the original so that an accurate and stable reading operation can be achieved due to the arrangement of the belt which reliably press and hold the original surface, as mentioned above.

Also, another advantage of the present invention is that it becomes further reliably avoid the dislocation or displacement of the original and achieve a further reliable page turning over operation due to the arrangement of the belt which is kept in a fixed state when the reading unit is functioning as mentioned above.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter in detail with reference to the drawings.

It is to be noted that the illustrations of the structure and function which are clear to the person skilled in the art from the description of the specification are deleted or simplified for the sake of easy understanding of the drawings.

First, the structure of a page turning over conveyer belt and the structure around thereof in accordance with the present invention are described with reference to FIG. 1.

Figure 1:
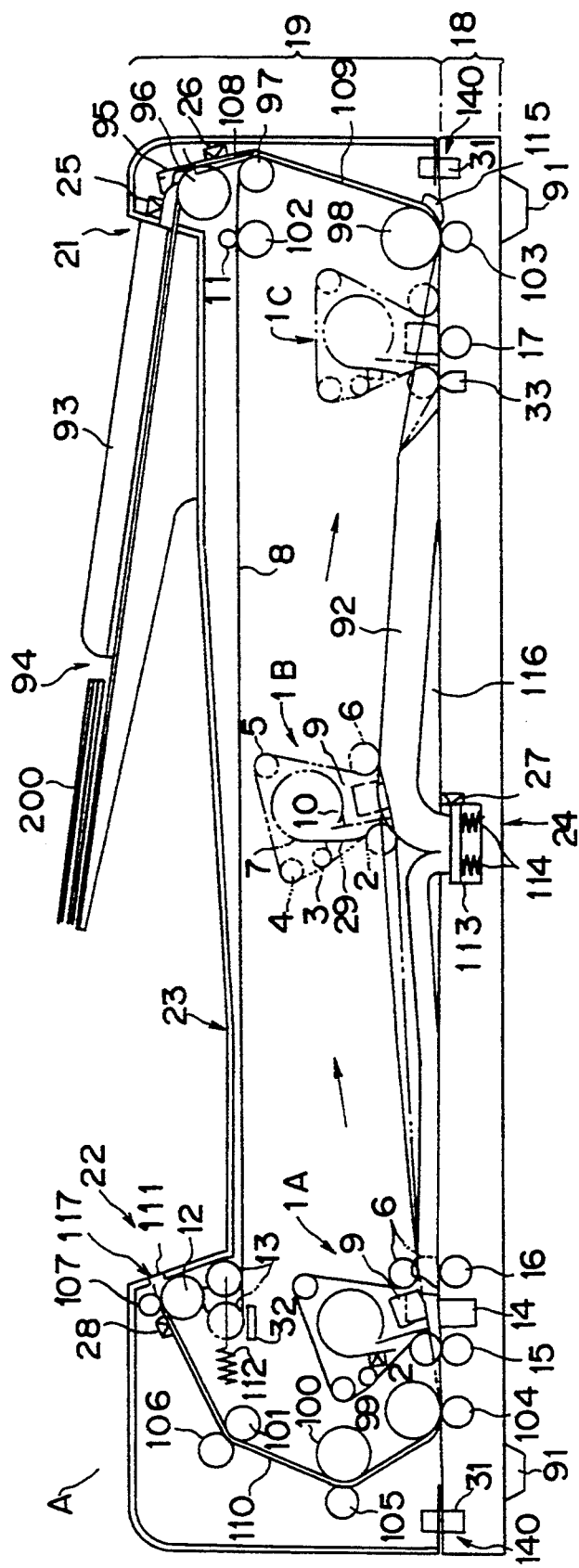
FIG. 1 is a constructional sectional view of a multi-function document scanner (MFDS) to which the present invention is applied.

FIG. 1 is a sectional view of a multi-function document scanner (MFDS) in accordance with the present invention.

In FIG. 1, a page turning over conveyer belt 8 is wound around and supported by a drive roller 12, a tension roller 13, a first belt support roller 97, a second belt support roller 98, a third belt support roller 99, a fourth belt support roller 100 and a fifth belt support roller 101, respectively.

The belt 8 is disposed surrounding a page turning over and reading unit 1 comprising a page turning over roller 2, a first bias roller 3, a first roller 4, a second roller 5, and a pressing roller 6.

The tension roller 13 is forced leftward in the drawing by a belt tension spring 112 so as to apply an appropriate tension force to the belt 8 to press the surface of a book-original 92.

A belt tension sensor 32 detects the tension force of the belt 8 from the length the roller 13 is shifted.

On the other hand, in the upper side of the conveyer unit 19 of the MFDS, there are disposed an original tray 94 for setting sheet-originals 200, a sheet-original side guide 93 for adjusting and arranging the lateral side edges of sheets even and a discharge paper tray 23 for receiving discharged sheets of original 200.

Also, in the paper feeding portion 21 (upper right side of the drawing) of the MFDS, there are disposed a sheet-original sensor 25 for detecting whether the sheet-originals 200 are set or not, a paper separation means comprising a feed roller 96 and a paper separation pad 95 for separating each sheet of the originals one by one, a paper feed sensor 26 for detecting the timing of feeding the sheet-originals 200, and a conveyer route comprising a first conveyer guide 108 and a second conveyer guide 109 for conveying the sheet-originals 200.

Also, in the left side of the belt support roller 97 and upper outside of the belt 8 is disposed a second bias roller 11 for electrically charging the sheet-originals 200 during the time of conveyance thereof. A counter roller 102 is arranged inside the belt 8 under the roller 11.

Also, at the lower end of the second conveyer guide 109 is disposed a guide lever 115 for guiding the sheets of original 200.

Further, a sixth counter roller 105, a seventh counter roller 106 and a discharge roller 107 are disposed in the outside of the belt 8 contacting therewith and facing the fourth belt support roller 100, the fifth belt support roller 105 and the drive roller 12, respectively, through the belt 8.

Also, in the outside of the belt 8 between the third belt support roller 99 and the drive roller 12, the upper surface of the original placing plate 18 which surface constitutes an original placing surface 116 is used as a conveyer route for the sheets of original 200.

The surface 116 is colored black so that the leading end of the book-original 92 can be easily and reliably detected at the time when the original 92 is to be detected in the prescanning operation.

On the other hand, in FIG. 1, in the paper discharge portion 22 of the MFDS in the upper left side of the drawing, a paper discharge sensor 28 is disposed in front of the roller 107 so as to detect whether the sheet of original 200 is jammed or not at the time of discharging the sheet.

Also, in the lower side of the paper outlet 117 of the paper discharge portion 22 is arranged a paper separation lever 111 for the sake of smooth discharge of the paper.

In the plate 18 of the MFDS, a fourth counter roller 103 and a fifth counter roller 104 are disposed under the second belt support roller 98 and the third belt support roller 99, respectively. Also, in the state where the page turning over unit 1 is in the home position 1A, a first counter roller 15, a second counter roller 16 and a second reading sensor 14 are arranged under the roller 2, the roller 6 and the first sensor unit 9, respectively.

Also, in the state where the unit 1 is in the end position 1C (where the unit 1 is stopped in the operation mode for reading the sheet-original 200), a third counter roller 17 and a book size upper limit sensor 33 are arranged under the first sensor unit 9 and the roller 2, respectively.

Further, in the central portion of the original placing surface 116 is arranged a center reference positioning portion 24 for positioning the book-original 92.

In the portion 24 are arranged a central positioning plate 113 to which the spine of the book-original 92 abuts when placed on the plate 18, springs 114 for urging the plate 113 upward, and a book-original sensor 27 for detecting the downward displacement of the plate 113 when the book 92 is placed on the plate 18.

The MFDS is supported in a substantially horizontal state by stand pads 91 disposed under the plate 18 having the above mentioned structure.

On the other hand, in each of both ends of the boundary between the conveyer potion 19 and the plate 18 is arranged a lock device 140 which includes a lock sensor 31 for detecting whether the conveyer portion 19 is opened or closed with respect to the plate 18.

As mentioned above, the MFDS is constructed in such a way that it functions not only to automatically feed and read the sheet-originals 200 but automatically read and turn over the pages of book-original as well.

Next, the structure of the drive system assembled within the above mentioned original reader apparatus is described with reference to Figs.2 to 4 hereinafter.

Figure 2:
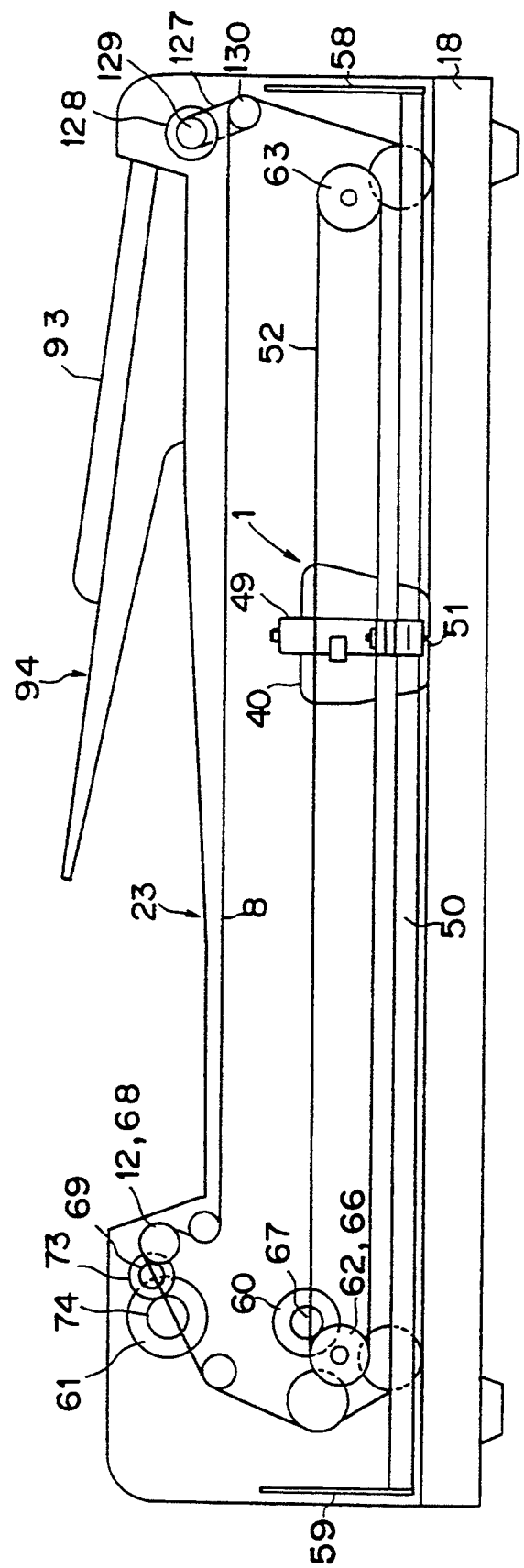
FIG. 2 is a sectional view of a driving system of the MFDS of FIG. 1.

FIG. 2 illustrates a vertical section of the drive system of the MFDS. FIG. 3 illustrates a plan view of the drive system of the MFDS. FIG. 4 illustrates an outer view of end portion of the page turning over and reading unit 1 mentioned above.

Figure 3:
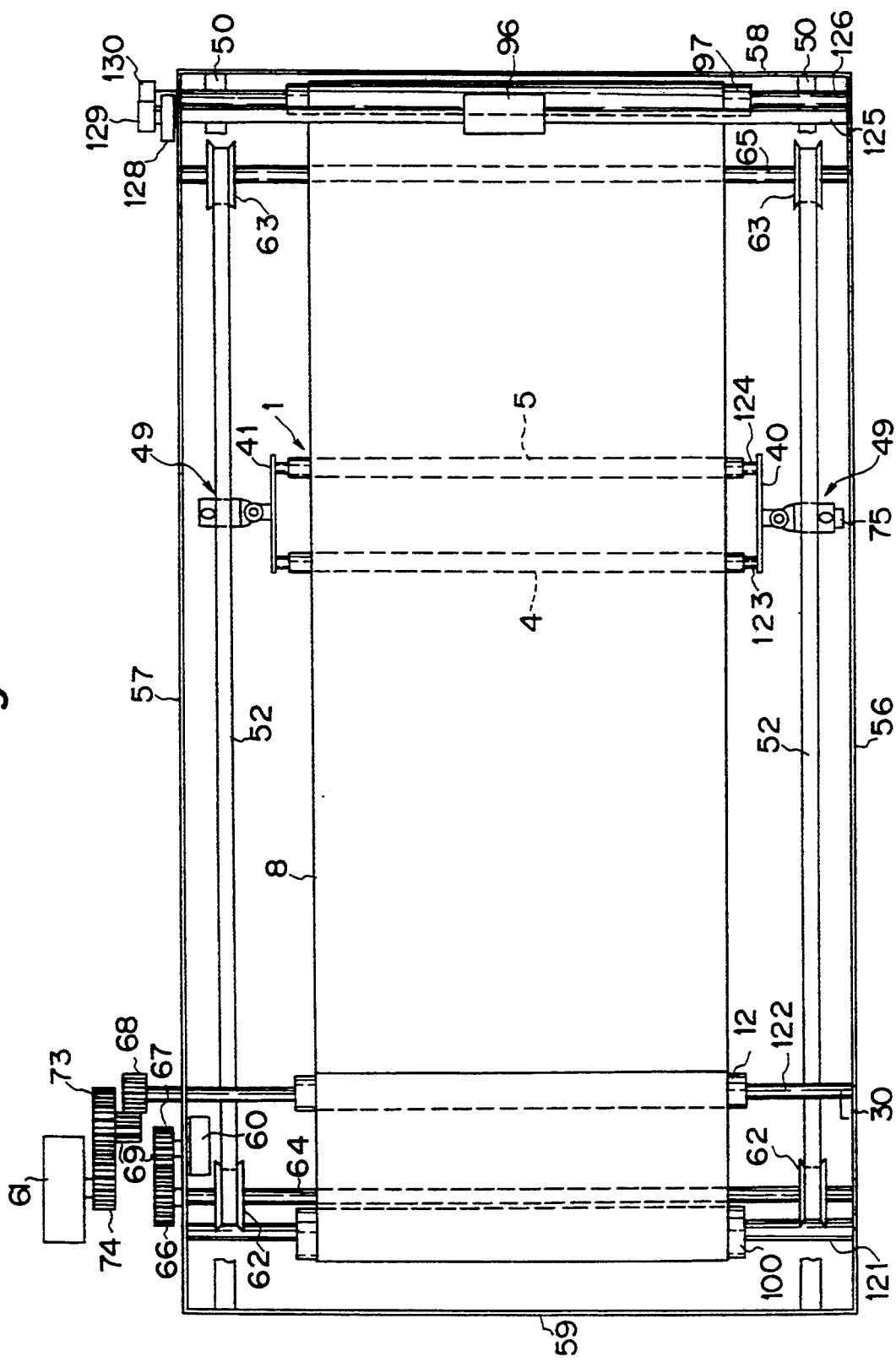
FIG. 3 is a plan view of the driving system of the MFDS of FIG. 1.
Figure 4:
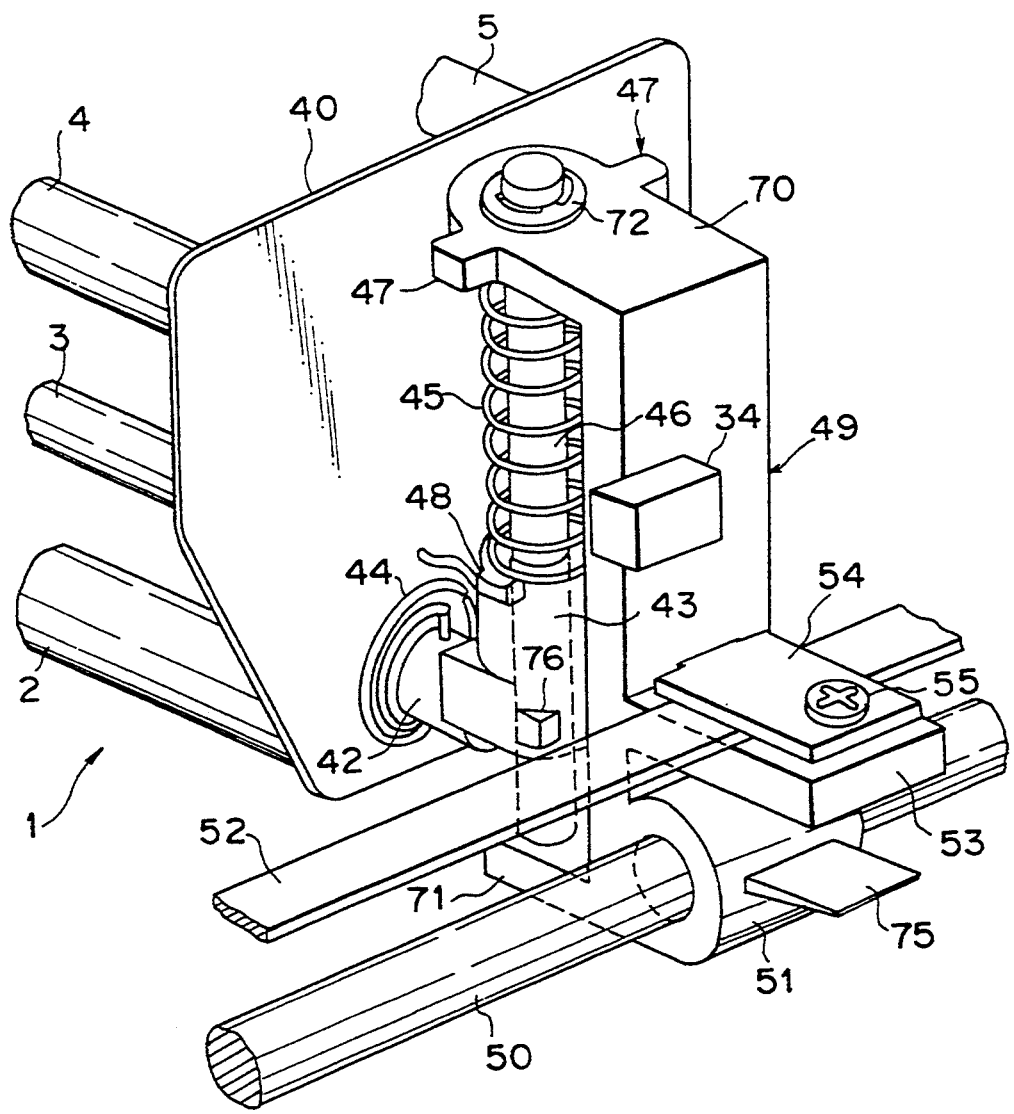
FIG. 4 is a perspective view of an end portion of the page turning over and reading unit of the MFDS of FIG. 1.

In FIGS. 2 to 4, a turning over unit driving body 49 is illustrated arranged at each side of the unit 1. The drive body 49 comprises a pipe 51 through which a rod 50 is inserted. A pair of rods 50 are disposed along both side edges of the MFDS so that the unit 1 is slidably movable along the rods 50. The two rods 50 are disposed in parallel with each other from the front side of the MFDS to the rear side thereof. The ends of each rod 50 are secured to a right side plate 58 and a left side plate 59 of the MFDS, respectively.

Also, as illustrated in FIG. 3, a first shaft 64 and a second shaft 65 are disposed between a front side plate 56 and a rear side plate 57, respectively, being rotatably supported thereby.

Two pairs of drive pulleys 62 and 63 are installed on the front end and rear end of the shafts 64 and 65, respectively. A page turning over unit drive belt 52 is wound around and between the pulleys 62 and 63 of each pair.

The driving body 49 of the unit 1 is secured to the belt 52, as illustrated in FIGS. 3 and 4, especially as can be seen from FIG. 4, in such a way that the belt is disposed on an ear plate 53 and fixed thereto through a fixing plate 54 by a screw 55 so that the driving body 49 is moved along with the belt 52 by driving the belt 52 to rotate around the pulleys 62 and 63.

Also, at the end of the first shaft 64 in the outside of the rear side plate 57 is fixedly installed a first gear 66 with which a second gear 67 engages which is fixingly installed on an output shaft of a drive motor 60. With such a structure, the drive force of the motor 60 is transmitted through the gears 67 and 66 to the drive pulley 62 and then through the belt 52 to the following pulley 63 so that the drive body 49 is driven to move. On the other hand, as illustrated in FIG. 3, a third shaft 121 which is coaxial with the roller 100, a fourth shaft 122 which is coaxial with the roller 12, a seventh shaft 125 which is coaxial with the roller 96 and an eighth shaft 126 which is coaxial with the roller 97 are disposed between and rotatably supported by the front and rear plates 56 and 57, respectively.

A third gear 68 is fixedly installed on the shaft 69 at the rear end thereof outside the rear plate 57. Also, a fourth gear 69 and a fifth gear 73 are coaxially arranged with each other and the gear 69 engages with the third gear 68.

A sixth gear 74 is secured to an output shaft of a conveyer belt drive motor 61. The gear 74 engages with the gear 73. With such a structure, the belt 8 is driven to move by the motor 61 through the drive roller 12.

Also, as illustrated in FIGS. 2 and 3, a second paper feed pulley 130 is secured to the shaft 126 in the outside of the rear plate 57 and a first paper feed pulley 129 is secured to the shaft 125 through a clutch 128 in the outside of the rear plate 57, respectively. A paper feed drive belt 127 (see FIG. 2) is arranged between and wound around the pulleys 129 and 130.

In accordance with the structure mentioned above, the rotational force of the roller 97 driven by the motion of the belt 8 is transmitted to the input side of the clutch 128 through the shaft 126, pulley 130, belt 127 and puller 129, respectively.

Also, by a control signal transmitted from the main control board 310 (see FIG. 34), the clutch 128 is operated so that the shaft 125 and the roller 96 are driven.

On the other hand, the counter rollers 15, 16 and 17 illustrated in FIG. 1 are driven at a same speed with being synchronized with the belt 8 by a not shown drive transmission means.

The structure of the unit 1 is further described below with reference to FIGS. 1 to 4.

A first side plate 40 and a second side plate 41 are disposed at the oppsing end portions of the unit 1, respectively, sandwiching the belt 8 therebetween. The rollers 2 to 6 are disposed between and rotatably supported by the plates 40 and 41.

The rollers 2 to 6 are supported by the plates 40 and 41 in a same manner which is described below taking the roller 4 as an example.

Figure 5:
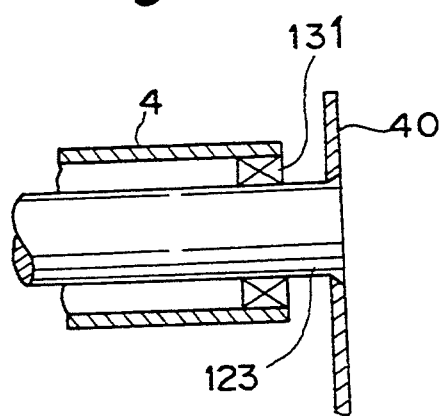
FIG. 5 is a sectional view of a roller structure for supporting the above mentioned page turning over and reading unit.

The roller 4 is hollow, as illustrated in FIG. 5. The shaft 123 is inserted through the hollow roller 4. The both ends of the shaft 123 are secured to the plates 40 and 41, respectively. A bearing 131 is interposed between the roller 4 and the shaft 123 at each end thereof so that the roller 4 is rotatably supported on the shaft 123.

It is to be noted that the rollers 2 to 6 have no drive means to rotate itself. The rollers are instead rotated according to the motion of the belt 8.

Also, in the outside of each plate 40, 41 is arranged a rod 42 which is rotatably supported by the plate. The rod is disposed at an elongated position along the longitudinal direction of the sensor unit 9 illustrated in FIG. 1.

The support structure of the rod 42 at an end of the unit 1 is described hereinafter with reference to FIG. 4. The structure of the other end is the same as that described below.

The rod 42 is assembled with a slidable pipe 43, a second spring stop 48 and an upper limit detector 76. An end of a coil spring 44 for correcting inclination is secured to the rod 42 while the other end of the spring 44 is secured to the plate 40.

The spring 44 is arranged in such a way that in the state as being it is wherein no outside force is applied to the spring, the axial direction of the pipe 43 (vertical direction in the drawing) and the optical axis direction of the optical system of the sensor unit 9 become aligned with each other. The optical axis direction of the unit 9 is, as described later in detail, the direction of the motion of the unit 9 with respect to the plates 40 and 41.

In accordance with the arrangement mentioned above, when the plates 40 and 41 are rotated at the same time as being one unit about the rod 42 and inclined from the initial state, the restoring rotation force is applied to each plate 40, 41 from the spring 44 to restore and maintain the plate in the initial state so that the inclination of the plate 40, 41 is corrected and always kept in the normal state.

The pipe 43 is arranged to smoothly slide along the support rod 46. The upper and lower ends of the rod 46 are secured to an upper support plate 70 and a lower support plate 71 of the drive body 49, respectively. Also, a first spring stop 47 is formed at each lateral side of the upper plate 70. A second spring stop 48 is formed at an upper end of the pipe 43. A coil spring 45 is vertically arranged between the upper plate 70 and the pipe 43 with the upper and lower ends thereof being engaged with the first and second stops 47 and 48, respectively.

The pipe 43 abuts against the lower plate 71 in the normal state. When a force is applied to the unit 1 from outside, the pipe 43 moves upward in FIG. 4 along the rod 46 against the elastic force of the spring 45.

In the above mentioned state, a restoring force is always applied to the pipe 43 downward from the spring 45 through the stop member 48 to which the spring 45 applies the downward force.

The upward motion of the pipe 43 is limited by an upper limit position where a scan cut-off sensor 34 attached to the drive body 49 detects the projection 76 for upper limit detection formed on the side of the pipe 43 and the motion of the pipe 43 is stopped.

The drive body 49 is constituted from the upper and lower plate 70 and 71, the spring stop 7, the scanning pipe 51, the belt fixing plate 53 and a home detection member 75 assembled as one unit. Also, the belt fixing plate 53 of the body 9 is, as described before, secured to the belt 52 through the fixing member 54 by the screw 55. Further, the pipe 51 of the body 49 is arranged so that the pipe 51 smoothly slides along the rod 50.

In accordance with the structure mentioned above, the belt 52 is driven so that when the unit reaches the home position 1A, the sensor 30 of FIG. 3 detects the home detection member 75 secured to the pipe 51.

Next, with reference to FIGS. 6 to 8, the lock device for locking the conveyer unit of the original reader apparatus of the invention is described hereinafter.

Figure 6:
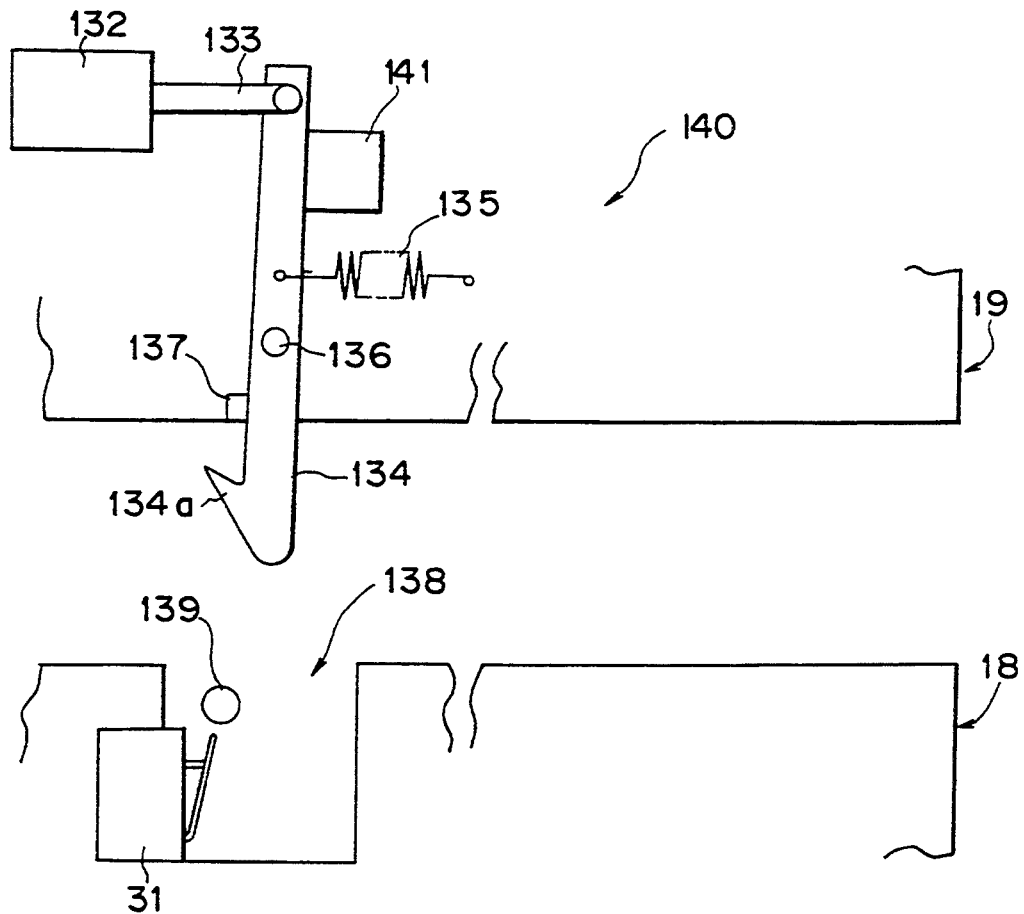
FIG. 6 is a side view of a conveyer lock device of the MFDS in a state of being unlocked.
Figure 7:
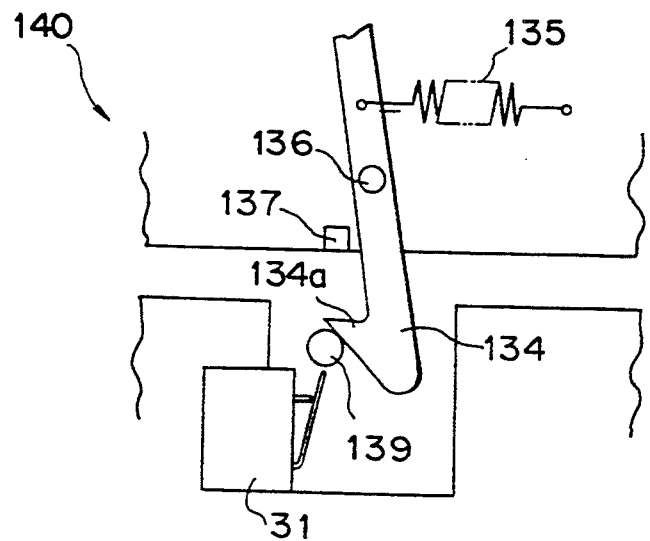
FIG. 7 is a side view of the conveyer lock device of FIG. 6 in a state of starting the locking operation.
Figure 8:
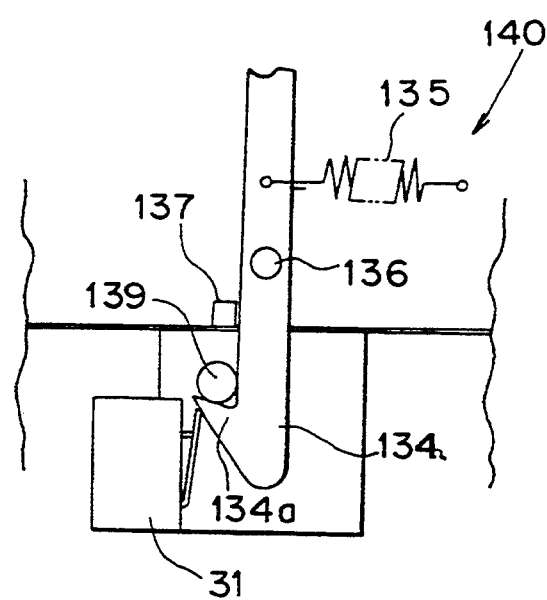
FIG. 8 is a side view of the conveyer lock device of FIG. 6 in a state of being locked.

FIGS. 6 to 8 illustrate a lock device 140 which is disposed at a side end of the MFDS of the present invention. The lock device is also arranged at the other side end of the MFDS. The structure of the lock device disposed at the other side end is the same as that of FIGS. 6 to 8.

The lock device 140 comprises a lock release solenoid 132 and a lock lever 134. The solenoid 132 is connected to an end of an arm 133. The other end of the arm 133 is pivotably linked with an upper end of the lever 134. An electromagnetic lock 141 is disposed on the lateral side of the lever 134 at a position in the side opposite to the arm 133 with respect to the lever 134. Also, at the lower end of the lever 134 is formed a hook 134a cranked toward the arm 133.

The lock lever 134 is pivotable about a pivot 136. An end of a spring 135 is connected to the lever 134 at a position above the pivot 136. The other end of the spring 135 is connected to a portion of the conveyer unit 19 so that the spring 135 applies a clockwise rotational force to the lever 134. The rotational motion of the lever 134 due to the spring 135 is limited by a stop member 137 disposed in the lower left side of the pivot 136.

On the other hand, in the side of the original placing plate 18 is arranged a lock portion 138 comprising a lock pin 139 and a lock sensor 31.

In FIG. 6, when the unit 19 is depressed and moved downward to close the device, the lower end of the hook 134a of the lever 134 abuts against the pin 139 so that the lever 134 is rotated in the counter clockwise about the pivot 136, as illustrated in FIG. 7. When the unit 19 is further closed from the state of FIG. 7, the hook 13a of the lever 134 comes to catch the pin 139, as illustrated in FIG. 8, so that the unit 19 is secured to the plate 18 and locked.

Also, in this locking operation of the unit 19, the hook 13a of the lever 134 acts on the sensor 31.

Figure 16:
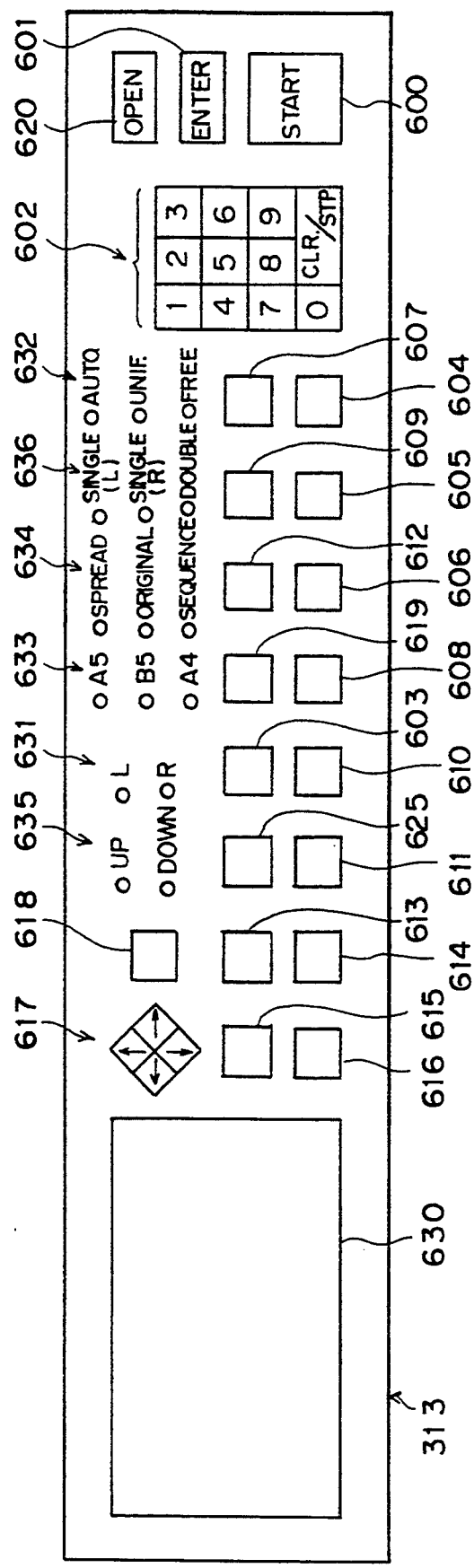
FIG. 16 is a plan view of a function display board of the MFDS.

The unit 19 is unlocked by pressing an open key 620 of a function board 313 illustrated in FIG. 16. More precisely, when the key 620 of the board 313 is pressed, the solenoid 132 is actuated so that the lever 134 is rotated counter clockwise about the pivot 136, whereby the hook 13a of the lever 134 is disengaged from the pin 139 so that the unit 19 is opened upward by a force of a not shown spring.

On the other hand, in a state where the input from the key 620 is not applied, the lock 141 is actuated instead, so that the rotational motion of the lever 134 is limited to maintain the state wherein the hook 13a is being engaged with the pin 139.

Figure 9:
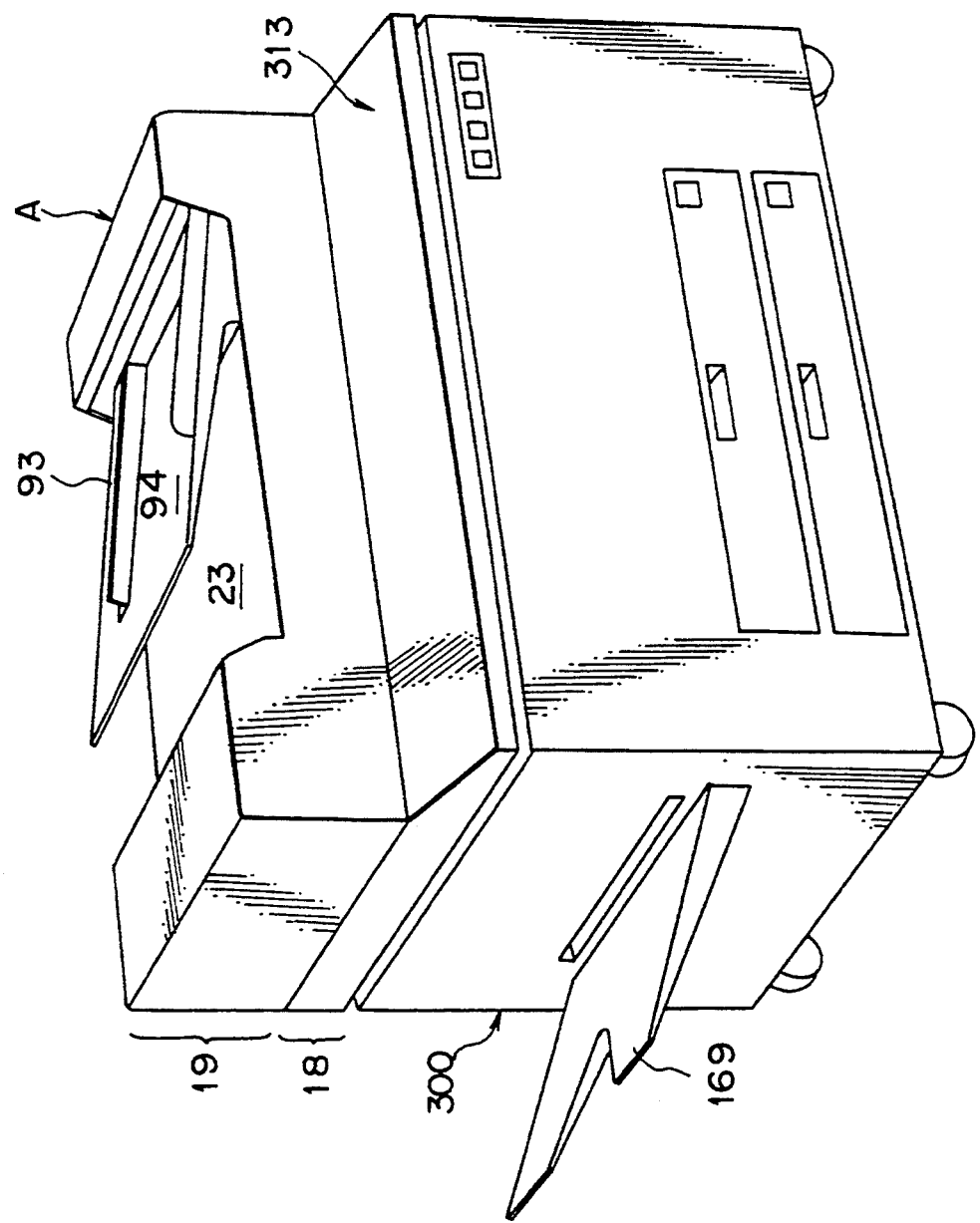
FIG. 9 is a perspective view of a printer equipped with the above mentioned MFDS.
Figure 10:
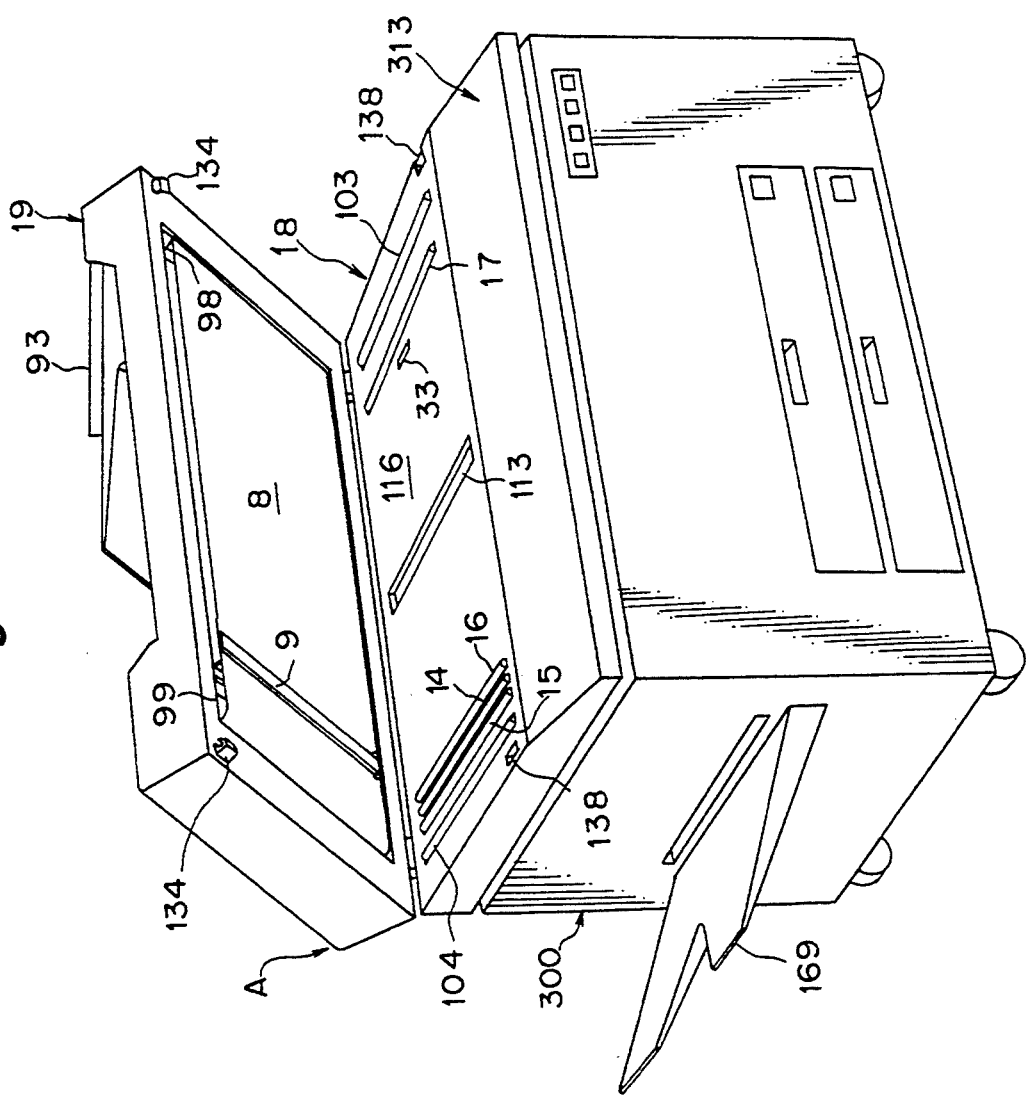
FIG. 10 is a perspective view of the printer of FIG. 9 in a state where the conveyer portion is opened.

The MFDS having the above-mentioned structure is mounted and used on a printer 300, for instance, as illustrated in FIGS. 9 and 10. FIG. 10 illustrates a state of the MFDS where the unit 19 is opened, as mentioned above.

Figure 12:
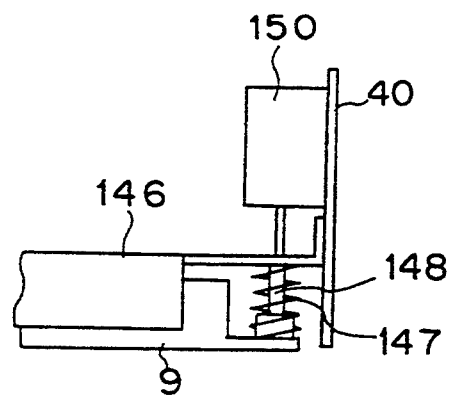
FIG. 12 is a side view of the end portion of the first sensor unit of FIG. 11.
Figure 13:
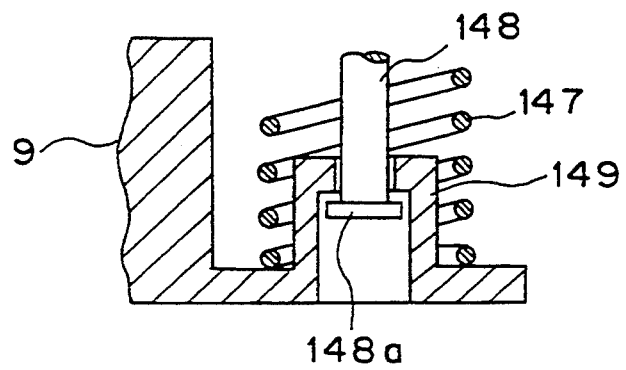
FIG. 13 is a enlarged partial sectional view of the support structure at the end of the first sensor unit of FIG. 11.

Next, with reference to FIGS. 11 to 13, the structure of the first reading sensor unit 9 disposed in the unit 1 is described hereinafter.

Figure 11:
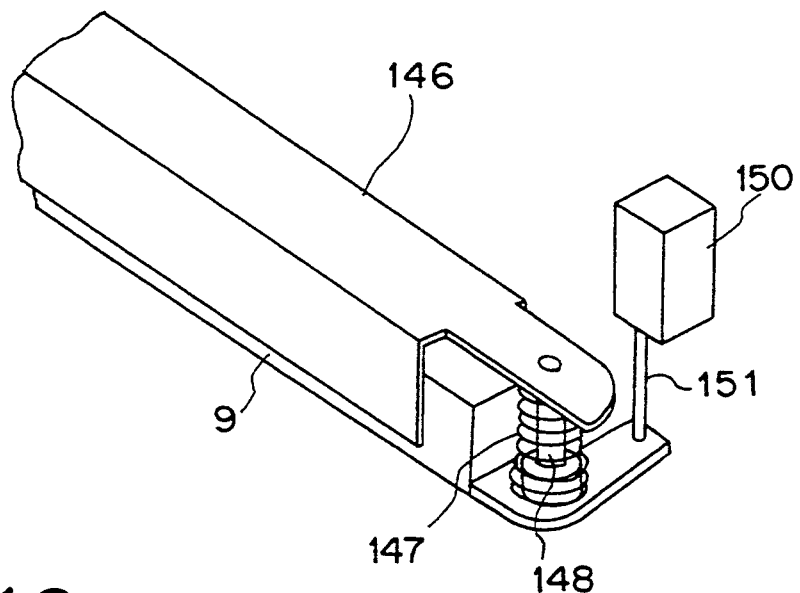
FIG. 11 is a perspective view of an end portion of a first sensor unit for reading the original disposed in the page turning over and reading unit.

FIG. 11 illustrates a perspective view of an end portion of the unit 9. FIG. 12 illustrates a side view of the unit 9. And FIG. 13 illustrates a detailed sectional view of the unit 9. The both ends of the unit 9 are similarly constructed. Therefore, only one of the end portions is described here.

The upper portion of the unit 9 is covered by a sensor bracket 146 having a U-shaped section, as illustrated in FIG. 11. Also, the unit 9 is vertically movable with respect to the bracket 146.

Both ends of the bracket 146 are secured to the plates 40 and 41, respectively, so that the bracket 146 is formed as one unit assembled with the unit 1. A sensor stud 148 is secured downward to the bracket 146 at a slightly inside portion from the end thereof. A lower end of the stud 148 is fitted in a hollow portion of a boss 149 formed at an end of the unit 9, as illustrated in FIG. 13, so that the unit 9 is arranged vertically movable with respect to the bracket 146 through the stud 148. A flange 148a is formed at the lower end of the stud 148 to prevent the stud 148 from separating from the boss 149.

A spring 147 is disposed between the bracket 146 and the unit 9 surrounding the stud 148 so that the unit 9 is always forced downward with respect to the bracket 146.

In accordance with the springy structure mentioned above, it becomes possible to arrange the unit 9 in such a way that the unit 9 is always positioned at the lowest position of the unit 1 and smoothly moves vertically following the shape of the original when the unit 9 scans the surface of the original.

Also, as illustrated in FIG. 11, a sensor release solenoid 150 is connected to the unit 9 through an arm 151. The solenoid 150 is secured to the plate 40, as illustrated in FIG. 12. The solenoid 150 is operated when the unit 1 is moved without scanning the original by the unit 9.

The solenoid 150 is also operated at the time of turning the page over, or ineffective scanning of the page unnecessary to be read or when the unit 9 is in a return motion at the time of sheet-original scanning mode operation. When the solenoid 150 is actuated, the unit 9 is moved upward against the springy force of the spring 147 so that the scanning surface of the unit 9 is separated from the surface of the original to be scanned.

The unit 9 is operated to read the original image with the use of a reference signal generated from an encoder 152 in accordance with the roller 2.

Figure 14:
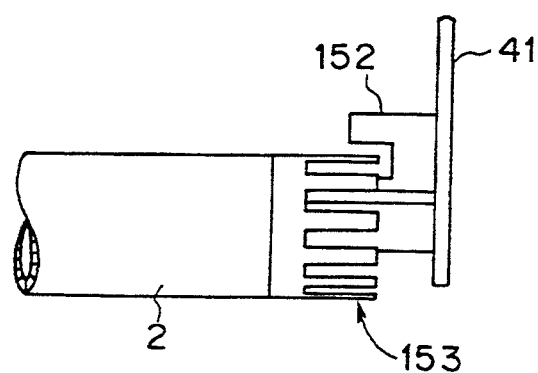
FIG. 14 is a side view of an end of a page turning over roller assembled within the page turning over and reading unit mentioned above.

FIG. 14 illustrates a side view of the assembled state of the roller 2 and the encoder 152. A crown shaped filler 153 is arranged at the end of the roller 2. The filler 153 is constituted in such a way that a plurality of slits of a constant width are formed at regular intervals in a sleeve-like member. The encoder 152, composed of a photo-coupler, for instance, is secured to the plate 41 in such a way that it vertically sandwiches the filler 153.

In accordance with the structure mentioned above, the filler 153 intermittently shuts the optical path of the encoder 152 at regular timing intervals so that the encoder 152 generates the reference signal for reading the original image to be scanned by the unit 9.

On the other hand, the book-original 92 is positioned with respect to the plate 18 by the central positioning portion 24.

Figure 15:
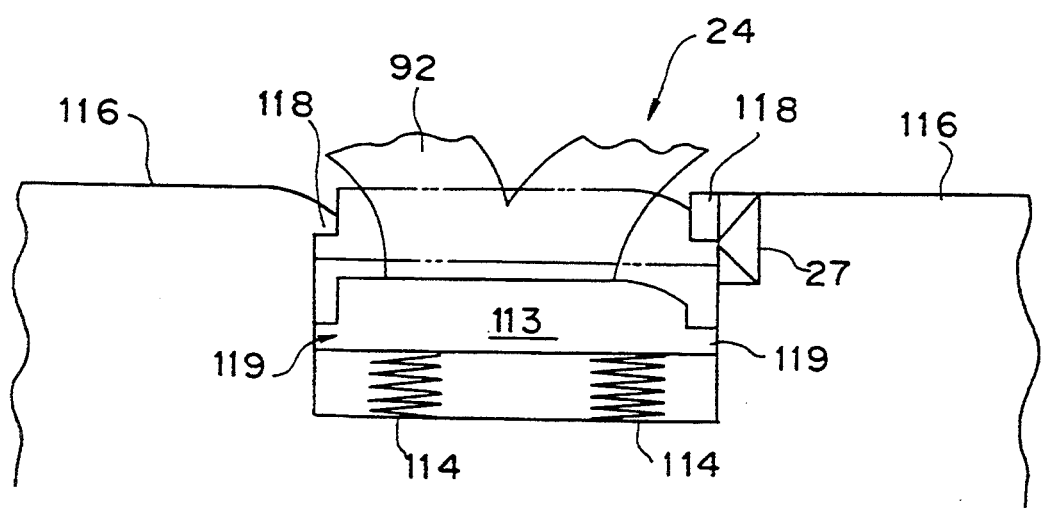
FIG. 15 is a sectional view of a central positioning structure disposed in the original placing surface of the MFDS.

FIG. 15 illustrates a detailed sectional view of the portion 24. The central portion 24 is used as a reference position at the time of scanning the book-original 92 and turning over the pages of the original.

The central portion 24 is formed as a groove arranged in the middle of the original placing surface 116. In the groove is fitted a positioning plate 113 which is vertically movable with respect to the surface 116. The plate 113 is always urged upward by the springy force of positioning springs 114 disposed under the plate 113. The upward motion of the plate 113 is limited by stop member 118 arranged on the inner side wall of the groove to which member a projection 119 of the plate 113 abuts at the position of the plate 113 depicted by a dash-two-dot line.

The book 92 is set on the surface 116 by placing the spine (binding portion) of the book 92 on the plate 113 disposed in the groove. When the spine of the book 92 is placed on the plate 113, the plate 113 is depressed by the weight of the book 92. The downward motion of the plate 113 is detected by the sensor 27 disposed on the inner side wall of the groove so that the state where the original is being set is detected.

In the front portion of the original placing plate 18 is disposed a function display board 313 of the MFDS, as illustrated in FIGS. 9 and 10. A number of input keys are disposed on the board 313, as illustrated in FIG. 16.

The function of each key of the board 313 is described hereinafter.

A start key 600 is pressed to start the original reading operationl.

An enter key 601 is pressed to settle an input selected from selective inputs arranged on the board 313.

Ten-keys 602 are pressed to set the number of copy prints or pages to be turned over.

A start page selection key 603 is pressed, in the book-original reading mode, to indicate one of the left and right spread pages of the book to be read at the time of starting the scanning operation. The left and right pages are interchanged each time the key 603 is pressed.

In the initial set state of the key 603, the page to start with is arranged as the left page. The selected page is displayed by lighting one of the LEDs 631 indicating left and right pages, respectively.

A total page number setting key 606 is pressed to set the number of total pages to be read at the time of inputting the number of pages to be read in the operation of book-original reading mode. The total number of pages to be read from the book 92 is settled by pressing the enter key 601 after pressing the key 606 and inputting the total page number by the ten-keys 602. The settled total page number is displayed in a liquid crystal display panel 630.

A book size selection key 607 is pressed to select one of an automatic book size detection mode and a book size key input mode, in the operation of book-original reading mode. Each time the key 607 is pressed, the display of LEDs 632 for indicating the book size is changed between "auto", "uniform" and "free (mm input)" one by one in turn.

In the initial setting mode of the key 607, the automatic book size detection mode is selected and the LED "auto" of the display 632 is selected to light.

The book size key input mode is composed of the "uniform or standard" mode and the "free" mode. If the book size is one of A4, B5 and A5, it becomes possible to input the book size through a uniform book size selection key 619 by selecting the "standard" mode. Every time the key 619 is pressed, the LEDs of the display 633 are changed between "A5", "B5" and "A4" to indicate the selected book size and notice it to the user.

In the initial setting state of the key 619, the LED "A4" of the display 633 is selected.

It is to be noted that the term "bood size" here designates the size of the book cover.

If the size of the book 92 is other than the uniform size mentioned above, the "free (mm input)" mode is selected by the key 607 and the longitudinal size and lateral size in mm unit of the book 92 are input by the key 602. After that, the key 601 is pressed to settle the size of the book input through the key 602.

The settled book size is displayed in the LCD panel 630.

A book binding portion masking region setting key 608 is pressed, at the time of operation in the book-original reading mode, to set the length of the area from the center of the portion 24 where the book is not to be scanned (masking area) by indicating the page "left (−)" or "right (+)".

More precisely, when the masking area is to be formed in the binding portion of the book 92, first, the page in which the masking ares is to be formed is indicated by setting the left or right by the key 608. After that, the length of the indicated left area (−) or right area (+) is input from the ten-keys 602. Then, the input length of the masking area is settled by pressing the key 601.

The settled masking area of the book 92 is displayed in the LCD panel 630.

In the initial setting state of the key 608, the length of the masking area is arranged as "±10 mm"

A reading page selection key 609 is pressed, in the operation of book-original reading mode, to select one of "single page (left)", "single page (right)"and "double pages" of the spread pages of the book 92. Each time the key 609 is pressed, the LEDs of the display 636 are changed between "single page (left)", "single page (right)" and "double pages" one by one in turn to notice the selected area to the user.

In the initial setting state of the key 609, the LED "double pages" of the display 636 is selected and lit.

If the area "single page (left)" is selected, only the left pages of the book 92 are scanned to read information from the book without reading the right pages.

On the other hand, if the area "single page (right)" is selected, only the right pages of the book 92 are scanned to read information from the book without reading the left pages.

A spread pages natural scale key 610 is pressed, in the "spread pages continuous reading mode" and "double pages mode" of the book-original reading mode, to print out the read pages in the natural scale.

A spread pages contraction key 611 is pressed, in the "spread pages continuous reading mode" and "double pages mode" of the book-original reading mode, to print out the read pages in a reduction scale. The reduction scale is set by manipulating a variable print scale key 614.

In the initial setting state of the key 611, the reference reduction scale is set as 0.71 times of the original size (from A3 to A4/from B4 to B5).

A double-page mode selection key 612 is pressed, in the operation of "spread single page reading mode" in the "double-page mode" of the book-original reading mode, to indicate the page to be printed in the front surface and the page to be printed in the rear surface of the paper by selecting one of three double-page modes composed of "spread double pages mode", "original double pages mode" and "double pages in turn mode".

Every time the key 612 is pressed, the LEDs of the display 634 are changed between "spread double pages mode", "original double pages mode" and "double pages in turn mode" one by one in turn to notice the selected mode to the user.

In the initial setting state of the key 612, the mode is set as "original double pages mode" and LED of the mode is lit in the display 634.

If the mode "spread double pages mode" is selected, the spread two pages of the book 92 are printed in such a manner that the left page of the book is printed in the front surface of the print paper while the right page of the book is printed in the rear surface of the print paper.

It is to be noted that if the starting page of the book to be read is set as "right" by the key 603 mentioned before, the first sheet of the print paper is printed only in one side thereof.

Also, if the mode "original double pages mode" is selected, the spread pages of the book 92 are printed in such a manner that the right page of spread pages of the book is printed in the front surface of the print paper while the left page of the spread pages of the book after the page is turned over is printed in the rear surface of the print paper. Therefore, in accordance with the "original double pages mode", the book is printed precisely in the same arrangement as the original book.

It is to be noted that if the starting page of the book to be read is set as "right" by the key 603 mentioned before, the first sheet of the print paper is printed only in one surface thereof as in the case of the "spread double pages mode" mentioned before.

Also, if the mode "double pages in turn mode" is selected, the page indicated by the key 603 from the spread two pages of the book 92 is printed in the front surface of the first sheet of the print paper then the next page after the preceding page is turned over is printed in the rear surface of the print sheet, after that the pages are printed in both surfaces of the print papers in order of reading the pages of the book.

A spread pages high speed print setting key 613 is pressed, in the operation of the "single page mode" of the "spread two pages continuous reading mode" in the book-original reading mode, to continuously read and print the left and right pages of the book without slowing down or stopping the operation of the unit 1 around the binding portion of the book 92.

A print variable key 614 is the key for setting the magnification of the print scale when the read original is to be printed in an enlarged or reduced scale.

When the key 614 is pressed, a predetermined magnification is displayed in the LCD panel 630. The magnification is varied by moving the cursor to a desired magnification value by a cursor moving key 617 and after that pressing the key 601 for settling the magnification.

An image processing setting key 615 is arranged to set the image processing mode at the time of printing the read image of the original after processing the image.

The image processing mode is selected by moving the cursor to a desired mode by the key 617 and settled by the key 601.

A mode selection key 616 is arranged to select and set the function mode of the MFDS. When the key 616 is pressed, a predetermined function mode of the MFDS is displayed in the LCD panel 630. The function mode is selected by moving the cursor to a desired mode by the key 617 and settled by pressing the key 601.

The cursor moving key 617 is the key for moving the cursor to each selection area displayed in the liquid crystal display panel 630.

A skip page setting key 618 is the key for setting the pages to be skipped without being scanned in the operation of the book-original reading mode.

More precisely, in the case when there are pages which are to be skipped without being read in the book 92, the key 618 is pressed first, after that the numbers of turn of the skip pages from the starting page of the book are input by the ten-keys 602 and after that the skip page numbers are settled by pressing the key 601. The skip page numbers input by the above mentioned way are displayed in the LCD panel 630.

A standard book size selection key 619 is the key for selecting the book size of the book-original 92. As mentioned above, there are two modes as the book size key input mode, i.e., "standard mode" and "free (mm input) mode". Only in case that the book size is one of A5, B5 and A4, the book size can be input through the key 619 by selecting the "standard mode". Every time the key 619 is pressed, the LEDs of the display 633 are changed between A5, B5 and A4, one by one in turn so that the selected size is visually noticed to the operator.

The initial setting state of the key 619 is set as A4 and the LED of A4 is lit.

It is to be noted that the term "book size" here indicates the size of cover page of the book-original 92.

An open key 620 is arranged for opening the conveyer unit 19 of the MFDS.

A sheet-original setting selection key 625 is the key for selecting "upward" or "downward" for the side of the original 200 to be read set on the original placing surface 116, in the operation of sheet-original reading mode and at the time of operating in the "sheet-original through mode" or the "single side original reading mode". Every time the key 625 is pressed, the LEDs of the display 635 are changed between "upward" and "downward" in turn and the selected side is visually noticed to the operator.

The initial state of the key 625 is set as "upward" and the LED of "upward" is lit.

Next, the printer 300 illustrated in FIGS. 9 and 10 is described hereinafter.

Figure 17:
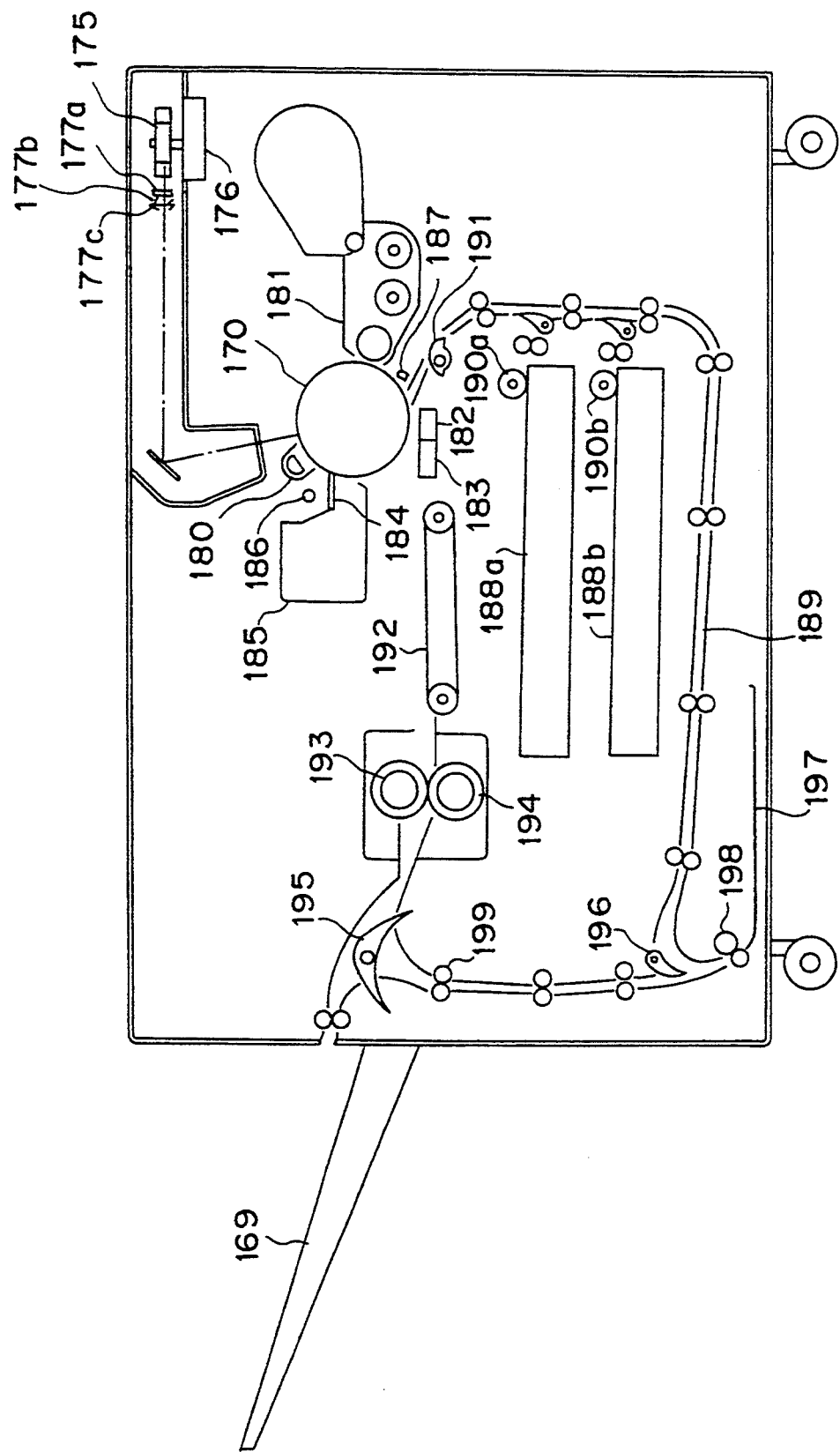
FIG. 17 is a sectional view of the printer of FIG. 9.

FIG. 17 illustrates a sectional view of the printer.

The image information after processing the image is written on a photosensitive drum 170 by raster scan with the use of laser beam in the image writing portion of the printer 300. A semiconductor laser is used as the laser source of the raster scan.

Figure 18:
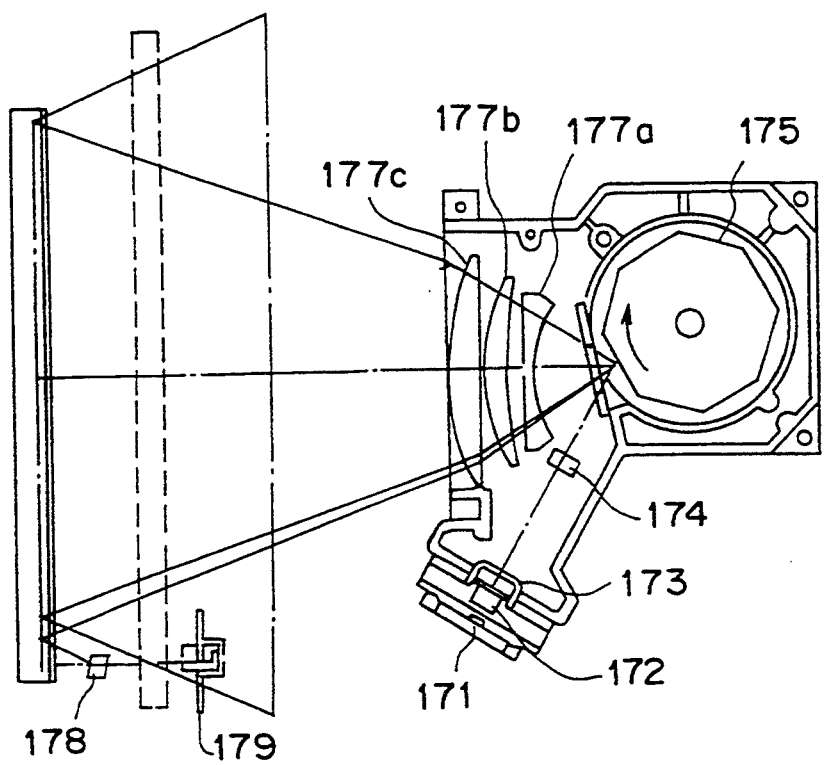
FIG. 18 is a plan view of a writing portion of the printer of FIG. 9.

FIG. 18 illustrated a plan view of the writing portion of the printer 300.

In FIG. 18, a semiconductor laser 171 emits a laser beam which is then collimated by a collimator lens 172. The collimated laser beam is then trimmed by an aperture 173 to form a predetermined shape of beam.

The shaped beam is contracted in the sub-scanning direction by a first cylindrical lens 174 and introduced to a polygon mirror 175.

The polygon mirror 175 has a precise polygon shape and rotated by a motor 176 at a regular speed in a predetermined direction. The rotational speed of the mirror 175 is determined from the speed of the drum 170, writing density of information and the mirror face number.

The laser beam introduced to the mirror 175 is reflected by the mirror and the reflection beam is deflected by the rotation of the mirror 175.

The deflected reflection beam passes through a group of f-$\theta$ lenses 177a, 177b and 177c. Each lens 177a, 177b, 177c has a function of scanning the drum 170 at a constant speed thereon with a scanning beam of a constant angular velocity. The lens also has a function of converging the scanning beam on the surface of the drum 170 to form a minimum optical spot thereon and a function of correcting the inclination of the spot image as well.

After passing through the lenses 177a, 177b and 177c, the optical scanning beam is guided to a synchronizing detection sensor 179 through a synchronizing detection mirror 178 in the outside of the image formation area so that the sensor 179 outputs a synchronizing head signal corresponding to the start timing of the scanning line in the main scanning direction. At a timing a predetermined time has passed after the head signal is output from the sensor 179, image data for one line is transmitted. After that, the data transmission is repeated for the subsequent lines to form one image of information.

On the other hand, a photosensitive layer (photoconductor) is formed on the drum 170. The laser source 171 emits a laser of 178 nm wavelength. Examples of photosensitive agent for such a laser are organic photo-conductor (OPC), $\alpha$-Si, and Se—Te. In this particular embodiment, an OPC layer is formed on the drum 170.

Also, in general, there are two kinds of processes for writing information on the drum with the use of laser, that is, an N/P process wherein the beam is irradiated to the image portion and a P/P process wherein the beam is irradiated to the background portion. In this particular embodiment, the N/P process is used for writing data on the drum.

In FIG. 17, the surface of the drum 170 is uniformly charged with negative electricity by an electric charger 180 of scorotron type having a grid in the side of drum 170.

After that, the laser beam is irradiated to the image portion on the drum 170 charged with minus electricity to remove the electric charges from the image portion so that a latent image having potential of −750 to −800 V at the background portion and −50 V at the image portion is formed on the surface of the drum 170.

The latent image is developed by toner charged with minus electricity by applying a bias voltage of −500 to −600 V to the developing roller of a developer 181.

The visualized image developed by the developer 181 is transferred to a transfer paper being fed and synchronized with the rotation of the drum 170 by the function of a transfer charger 182 which charges the paper with positive electricity from the rear side of the paper.

The paper to which the toner image is transferred is separated from the surface of the drum 170 by applying alternate current to remove electric charges from the paper by a separation charger 183 which is held and assembled with the charger 182 as one unit.

The toner being remained on the drum 170 without being transferred to the paper is scratched away from the drum surface by a cleaning blade 184 and collected in a tank 185 disposed surrounding the blade 184.

Also, the potential pattern remaining on the drum surface is erased by irradiating light to the drum surface from an electricity erasing lamp 186.

A photosensor 187 is disposed right below the the developer 181. The sensor 187 is constituted from a light receiving element and a light emitting element and detects the reflection density of the drum surface which corresponds to the toner density after development. If the reflection density becomes below a predetermined reference value, a toner supplement signal is output to supply new toner to the developer 181.

More precisely, the sensor 187 is constructed to output the toner supplement signal in such a way that, for example, a predetermined pattern of all black or mesh pattern is written at the position corresponding to the reading position of the sensor 187 and that the pattern is developed and after that the optical reflectivity of the pattern and that of the portion other than the pattern portion are measured so as to obtain the ratio between the two reflectivity values from which ratio the density of the developed image is discriminated and that if the density is below a predetermined value, the toner supplement signal is output.

If the supplemental toner is insufficient, the development density is not raised after the toner supplemental signal is output. Therefore, the sensor 187 can be used as the sensor for detecting the shortage of supplemental toner.

On the other hand, the printer 300 of the present invention comprises a plurality of paper cassettes 188a and 188b. Also, a paper refeeding loop 189 is arranged to print image on both sides of the paper.

More precisely, in FIG. 17, when the start button of the printer 300 is pressed after a predetermined cassette is selected, a paper feed roller 190a, 190b of the selected cassette is rotated so that a paper in the cassette is conveyed until the paper abuts against a nip of a resist roller 191.

The roller 191 is rotated to convey the paper to the surface of the drum 170 at a timing where the image position formed on the drum 170 is synchronized with the position of the paper.

By the arrangement mentioned above, the image is transferred to the paper which is then removed from the drum surface and sucked on and conveyed by a separation conveyer unit 192. The paper is conveyed to a fixing roller unit comprising a heat roller 193 and a pressing roller 194 where the toner image transferred to the paper is fixed.

Figure 19A:
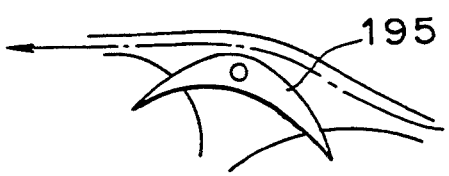
FIGS. 19a to 19c are explanatory views for explaining the function of a change lever for changing the print paper conveyer route of the printer of FIG. 9.

In a normal printing operation, the paper on which the toner image is fixed is discharged onto the paper discharge tray 169 through an paper outlet of the printer 300 by the function of a route change lever 195 which is at a position illustarated in FIG. 19a.

Figure 19B:
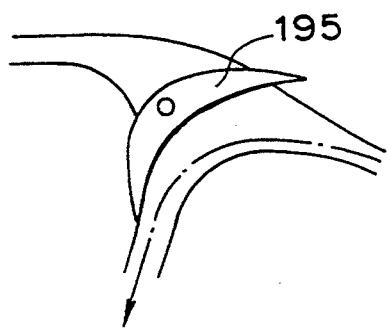

When the printer 300 is operated in the "both-side printing mode", the lever 195 is changed to the position illustrated in FIG. 19b so that the paper is conveyed to the both-side paper conveyer route formed in the left side of the printer 300. In the conveyer route, the paper is temporarily guided to a reverse guide tray 197 through a reverse lever 196. After that, the direction of the lever 196 is changed and the roller 198 is reversed so that the paper is conveyed along the route 189 until the paper abuts against the nip of the roller 191.

After that, the reconveyed paper is treated in the same manner as the paper in the normal printing operation mentioned above, that is, the toner image formed on the drum 170 is transferred to the paper and fixed thereon and after that the lever 195 is changed to the initial state illustrated in FIG. 19a so that the paper is discharged onto the tray 169.

When the upside down paper discharge mode is selected wherein the printed paper is discharged onto the tray in a state where the printed surface is in the lower side to face the placing surface of the tray 169 at the time of operating in the single side printing mode, the lever 195 is changed to the state of FIG. 19b as in the case of double-side printing mode, so that the paper is temporarily guided to the double-side printing paper conveyer route rather than discharging the paper as it is through the outlet.

Figure 19C:
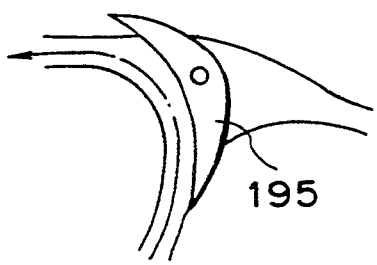

Then, right after the rear end of the paper passes through the lever 195, the lever 195 is changed to the state of FIG. 19c and the roller 199 is reversed so that the paper is switched back to the outlet of the printer 300 and discharged onto the tray 169.

In accordance with the above mentioned "upside down paper discharge mode", the paper having the print image on one of the sides thereof is discharged on the tray 169 in the state where the print surface of the paper is facing to the placing surface of the tray so that the papers are accumulated on the tray in order of the read pages of the original.

The unit 1 comprises, as mentioned before referring to FIG. 4, a first side plate 40, a second side plate 41, and rollers 2 to 6 which are rotatably installed between the plates 40 and 41. Also, the belt 8 is arranged to wind around the rollers 2 to 6.

A first high voltage source 320 is connected to the roller 3. An alternate voltage is applied to the source 320 from two ports for sucking the paper and for removing electricity, respectively.

Also, within the unit 1, a guide 10 is arranged between the roller 2 and the unit 9. And a page holder portion 7 is disposed along the inside surface of the belt 8 on the guide 10.

A page turning over sensor 29 is disposed on the holder portion 7. The sensor 29 is composed of, for example, a photosensor and arranged for detecting error of turning over pages. The sensor 29 may be disposed on the guide 10.

Also, the sensor unit 9 described before with reference to FIG. 11 is disposed between the rollers 2 and 6.

The unit 9 is vertically movable for about 3 mm with respect to the unit 1 in such a way that at the time of reading the original, the unit 9 is urged downward by the spring 147 so as to be pressed against the original surface of the sheet 200 or the book 92 to be read.

Figure 21:
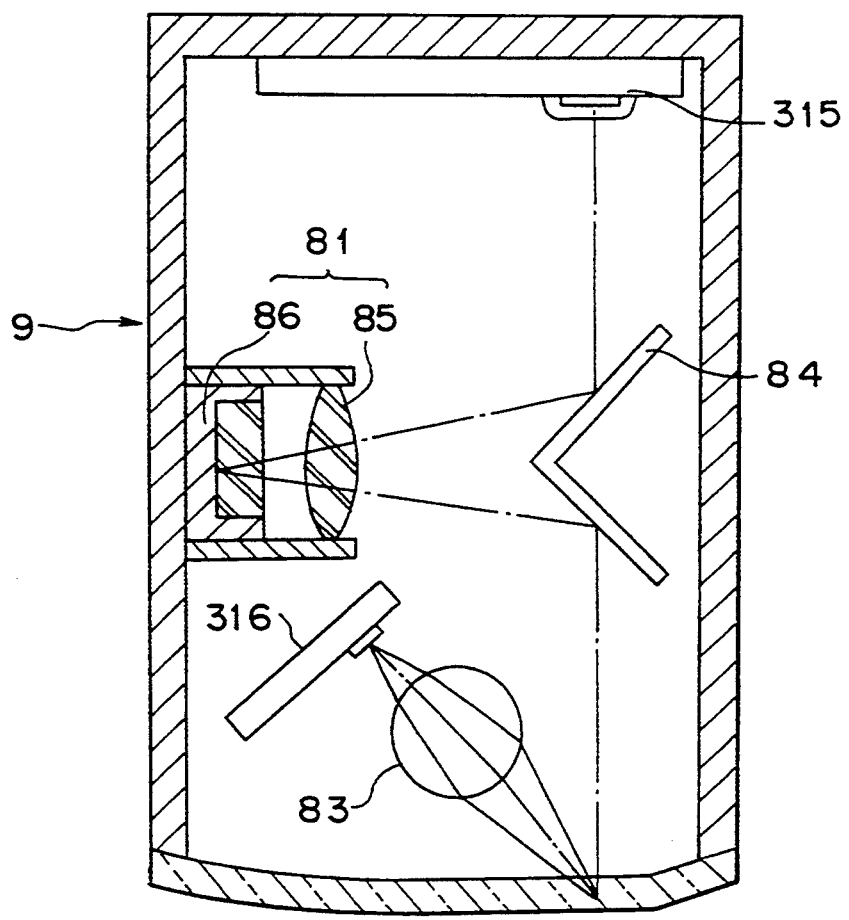
FIG. 21 is a sectional view of the first sensor unit for reading the original.

Also, the unit 9 comprises, as illustrated in FIG. 21, an LED 316 for illuminating the original, a roof mirror lens array 81 and an Si equimultiple sensor 315 which constitutes a photoelectric converter system for converting the optical image of the original to an electric signal.

The original is read by the unit 9 as described below.

In FIG. 21, first, light emitted from the LED 316 is converged on the original by the bar lens 83 to illuminate the original.

After that, the light reflected from the original is reflected by the optical path separation mirror 84 and passes through the lens array 85 and the mirror array 86 and back to the mirror 84 which reflects the light upward. The reflected light from the mirror 84 is guided onto the light receiving surface of the sensor 315 to form an image of the original thereon so that the image data is converted to an electric signal to be output and detected.

Next, a fundamental function of turning over pages in accordance with the embodiment of the present invention having the structure mentioned above is described hereinafter.

The original is read in accordance with the following sequence.

In the case where a book-original is to be read, the key 620 in the board 313 is pressed so as to open the unit 19 as illustrated in FIG. 10. The spine of the book 92 is set in the central portion 24 of the plate 18. After that, the unit 19 is closed as illustrated in FIG. 9 in the state where the book is opened with the pages to be read being spread upward.

In this state, conditions for reading the book-original 92 are set by manipulating the keys arranged in the board 313. After that, the start key 600 is pressed to start the operation of the MFDS.

By the board operation mentioned above, as illustrated in FIG. 1, the belt 52 is driven by the motor 60 so that the unit 1 starts to move from the home position 1A at the left end to the right side. During the motion of the unit 1, the unit 9 scans and reads the original information of the book 92.

In this operation, the rotation of the belt 8 is stopped and the spread pages of the book 92 is depressed by the belt 8.

Also, as mentioned before, the unit 1 is rotated about the rod 42 and the pipe 43 of the unit 1 slides along the vertical rod 46 so that the unit 9 moves along the original surface in the state of being in contact with the surface following the surface curve.

Figure 20:
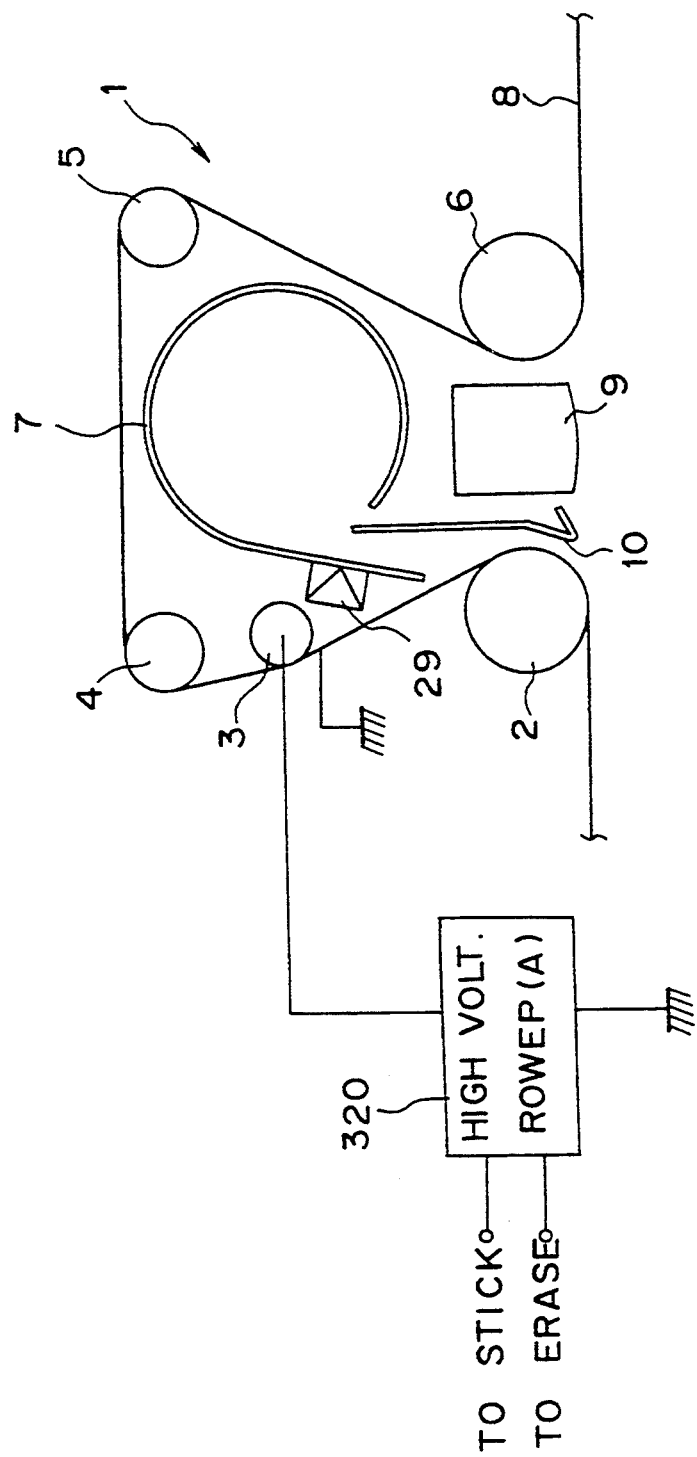
FIG. 20 is a constructional view of the page turning over and reading unit mentioned above.

When the unit 1 reaches the middle position 1B of the book 92, the alternate current for sucking the paper is applied to the roller 3 from the source 320 of FIG. 20 so that an electric charge pattern of stripe shape is formed on the belt 8.

As mentioned above, forming the stripe shaped electric charge pattern on the belt 8, the unit 1 moves to the right end position 1C in FIG. 1. During the motion of the unit 1, the unit 9 reads the information data from the book 92.

As mentioned above, the book is scanned and read by the unit 9. After the original is read, the unit 1 is moved back from the end position 1C to the home position 1A, as illustrated in FIG. 22.

Figure 23:
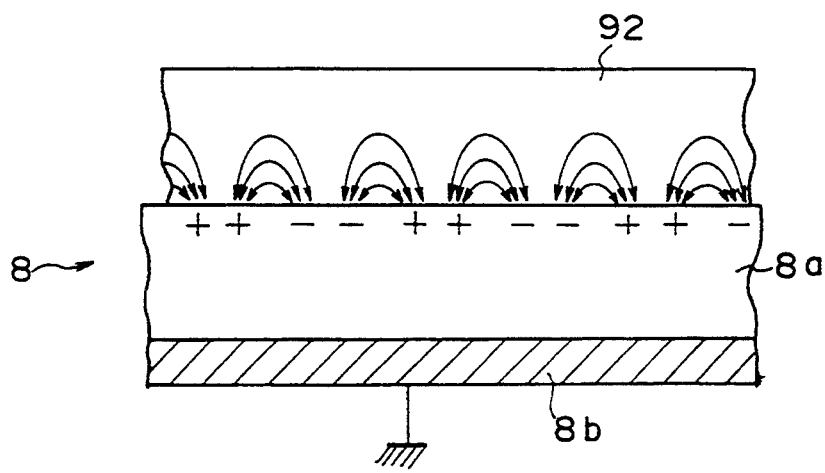
FIG. 23 is an explanatory view for explaining the function of the conveyer belt for turning the pages over assembled within the MFDS.

In this returning motion of the unit 1, as illustrated in FIG. 23, uneven electric fields are generated on the belt 8 due to the electric charge pattern formed in the reading operation, by which the right page of the book 92 is electrostatically attracted to the belt 8.

Figure 22:
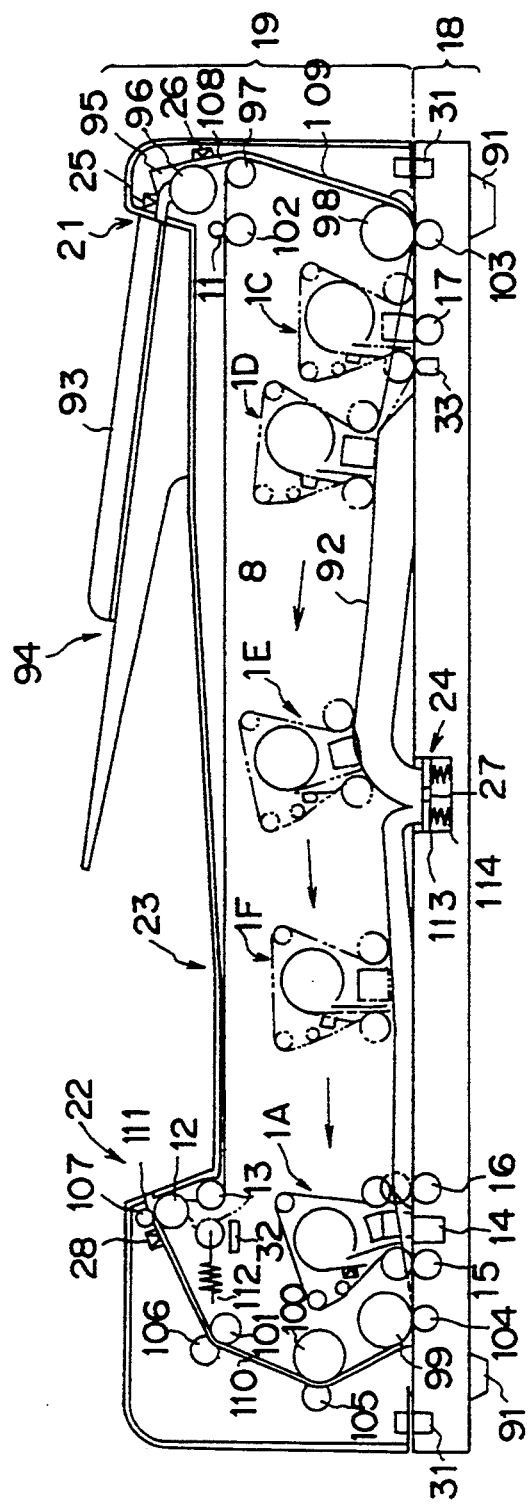
FIG. 22 is a sectional view for explaining the function thereof.
Figure 24:
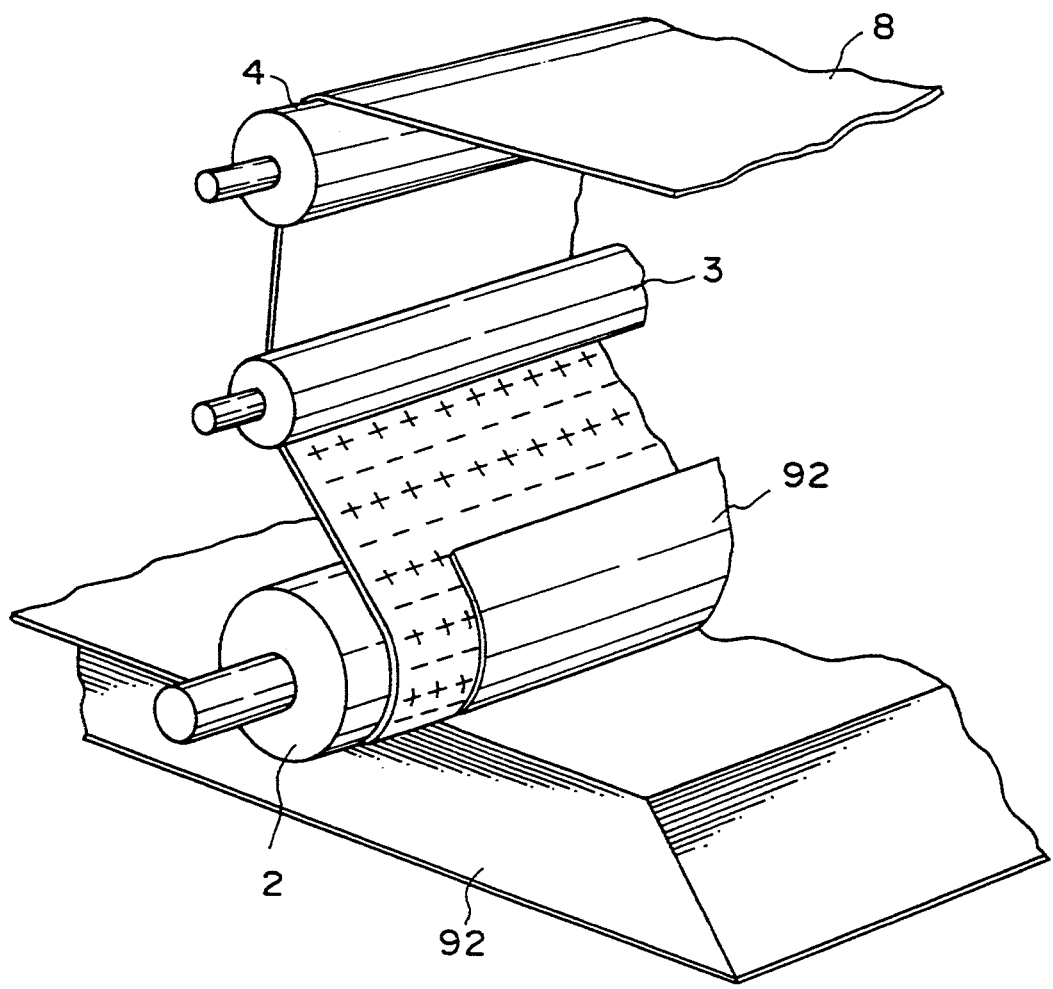
FIG. 24 is a perspective view of the conveyer belt in a state of being operated to turn a page over.

Accordingly, in this state, when the unit 1 moves toward the position 1C and reaches the position 1D where the page turning over motion is started as illustrated in FIG. 22, an end of the right page of the book is involved in the unit 1 following the belt 8, as illustrated in FIG. 24.

The page involved in the unit 1 along with the belt 8 is gradually removed from the belt 8 from the leading end thereof according as the belt 8 is advanced due to the curve of the belt path corresponding to the roller 2 and the hardness of the paper.

The page gradually separated from the belt 8 as mentioned above is conveyed along the guide 10, as illustrated in FIG. 20, and inserted into the page holder portion 7 which is disposed in the downstream side with respect to the flow of the paper.

The portion 7 is formed cylindrical as illustrated in FIG. 20. The separated page is inserted into the cylindrical hollow of the portion 7 and rolled up therein along the inside surface of the cylindrical portion 7, which makes it possible to contain and hold the page in a small space after read the page.

Therefore, in accordance with the unit 1 mentioned above, as illustrated in FIG. 22, during the returning motion of the unit 1 from the position 1D to the position 1E, the read page can be smoothly separated from the page to be read subsequently.

The page housed in the cylindrical portion 7 as mentioned above is discharged from the portion 7 due to the relative motion of the page with respect to the unit 1 in accordance with that the unit 1 is further moved from the position 1E to the position 1F beyond the center of the book.

When the unit 1 is moved back to the home position 1A, the page housed within the portion 7 is discharged entirely therefrom so that the operation of turning the read page over is ended.

On the other hand, in the page turning over motion mentioned above, the device is so programmed that right after the unit 1 starts the page involving motion to house the read page into the cylinder portion 7 until the involving motion is ended, the alternate current is applied to the roller 3 from the high voltage source 320 of FIG. 20 so that the electric charge pattern formed on the belt 8 is erased.

Therefore, in the returning motion of the unit 1, there is no electrostatic attractive force generated between the read page and the belt 8 so that it becomes possible to smoothly involve the read page in the cylinder portion and discharge it therefrom.

On the other hand, in accordance with the related art, there has been proposed an air sucking means, a comb electrode attracting means or an electric double-layer means for holding and conveying the sheet member.

Also, a page turning over device for book-original with the use of the air sucking means is proposed. However, these means or device of the related art has drawbacks as described later so that it is almost impossible to practically realize the page turning over device for book-original in accordance with the related art.

More precisely, in accordance with the air sucking means, it becomes necessary to prepare an air pump for generating vacuum pressure for sucking the air and air pipings for flowing the air, which makes the device bulky.

Also, in accordance with the comb electrode burying means, two comb electrodes are interdigitally combined together and buried in a dielectric member so that positive and negative voltages are applied to the electrodes, respectively, which increases the cost of the device and makes it difficult to use an endless belt for conveying the page of the original.

Further, in accordance with the electric double-layer means, the belt and the sheet are charged with opposed polar electric charges by a corona charger. Therefore, when the means is to be used for turning over the pages of a book-original, it becomes impossible to charge electricity unless the pages to be turned over is separated in advance.

Also, in accordance with a page turning over device using frictional force of a rubber roller, accuracy of turning over pages is limited according to the quality and size of the paper, which reduce the reliability of page turning over function.

On the other hand, in accordance with the embodiment of the present invention, as illustrated in FIGS. 20, 23 and 24, an alternate current is applied to the belt 8 comprising an endless belt from the high voltage source 320 so as to form an electric charge pattern of stripe shape or checked shape on the belt surface, by which uneven electric fields are generated on the belt surface so that the originals are held or conveyed and the pages are turned over. Therefore, it becomes possible to smoothly and reliably hold and convey the pages and turn it over.

A fundamental structure and a principle of electrostatic attractive force of the page turning over device of the present invention are described in detail hereinafter.

The belt 8 of the device is constituted from an endless belt of double-layer structure made from a dielectric belt member, the rear side of the endless belt is processed as electrically conductive. However, in a case where an opposite electrode (for example, earth roller) opposing to roller 3 is disposed, the endless belt can be made of only a dielectric belt member ( there is no need to be processed as electrically conductive on the rear side thereof).

The uneven electric fields are generated on the belt 8 in such a way, for example, that an alternate current voltage for holding paper is applied from the first high voltage source 320 to the bias roller 3 which is rotatably disposed in the state of coming in contact with the surface of the belt.

As illustrated in FIGS. 20 and 23, with the use of the conductive layer 8b of the belt 8 as an earth layer, while applying an alternate electric field to the roller 3, the belt 8 and the roller 3 are moved with respect to each other so that a stripe shaped electric charge pattern is formed on the surface of the dielectric member 8a of the belt 8.

By the operation mentioned above, the uneven electric fields are generated around the surface of the dielectric member 8a of the belt.

When dielectric material such as the paper to be read is approached to the uneven electric fields, the inside of the paper is polarized so that an attractive force is applied to the paper to move toward the belt 8 since the electric fields are uneven.

This is confirmed by surface integration of Maxwell stress along the paper surface.

Maxwell stress is represented by the following equation.

$$f = E\, div D - (\tfrac{1}{2}) grad (E \times D) + (D\, grad) E \tag{a}$$

Also, assuming that normal direction for the surface of the belt 8 is the X axis, Maxwell stress in the direction of X axis is represented by the following equation.

$$fx = Ex\left(\frac{\partial Dx}{\partial x} + \frac{\partial Dy}{\partial y} + \frac{\partial Dz}{\partial z}\right) - \frac{1}{2}\cdot\frac{\partial}{\partial x}(E\cdot D) + \left(Dx\frac{\partial Ex}{\partial x} + Dy\frac{\partial Ex}{\partial y} + Dz\frac{\partial Ex}{\partial z}\right) = \frac{\partial}{\partial x}\left\{ExDx - \frac{1}{2}(E\cdot D)\right\} + \frac{\partial}{\partial y}(ExDy) + \frac{\partial}{\partial z}(ExDz) \tag{b}$$

By calculating the surface integration of Maxwell stress force fx of the equation (b) along the outer surface (upper and lower surfaces) of the paper, the physical force (attractive force) N of the paper can be obtained.

The force N for the paper is represented by the following equation.

$$N = \int sf \times dS$$

From this equation, assuming that the frictional coefficient is $\mu$, the conveying force F for the paper is represented by the following equation.

$$F = \mu N$$

As a concrete structure for the embodiment of the invention, the belt 8 was constituted from an endless belt of a PET film (dielectric film 8a) of 75 $\mu$m thick on which an aluminum layer of 10 $\mu$m is formed by an evaporation method. Also, the pitch of the electric charge pattern was arranges as 2.4 mm.

That is, the reading speed to read the book 92 was 120 mm/s, the frequency of the alternate current was 50 Hz and the applied voltage was $\pm 2$ kVp-p.

Figure 25:
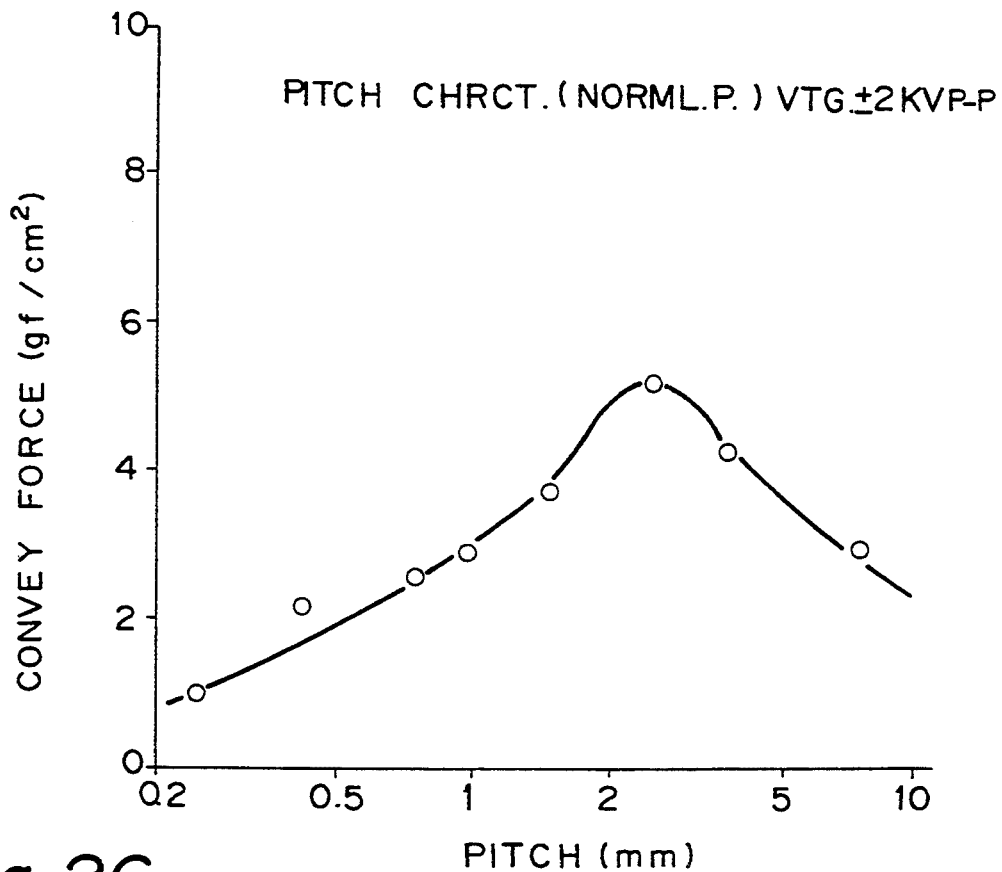
FIG. 25 is a graphical view of the conveying characteristic of the conveyer belt with respect to the pitch thereof.
Figure 26:
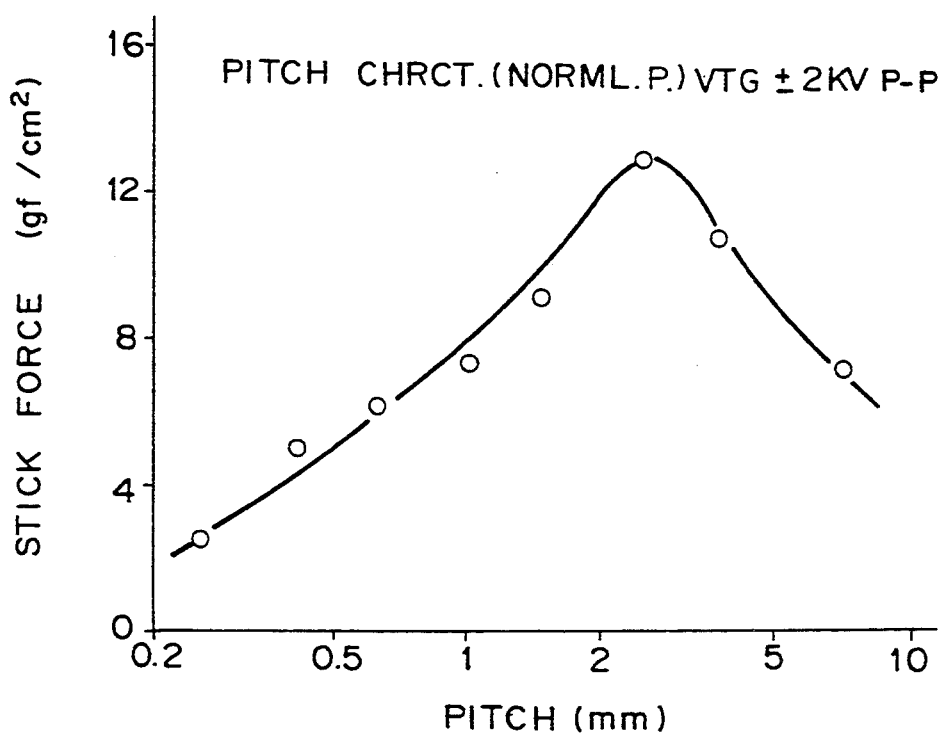
FIG. 26 is a graphical view of the sucking force of the conveyer belt with respect to the pitch thereof.
Figure 27:
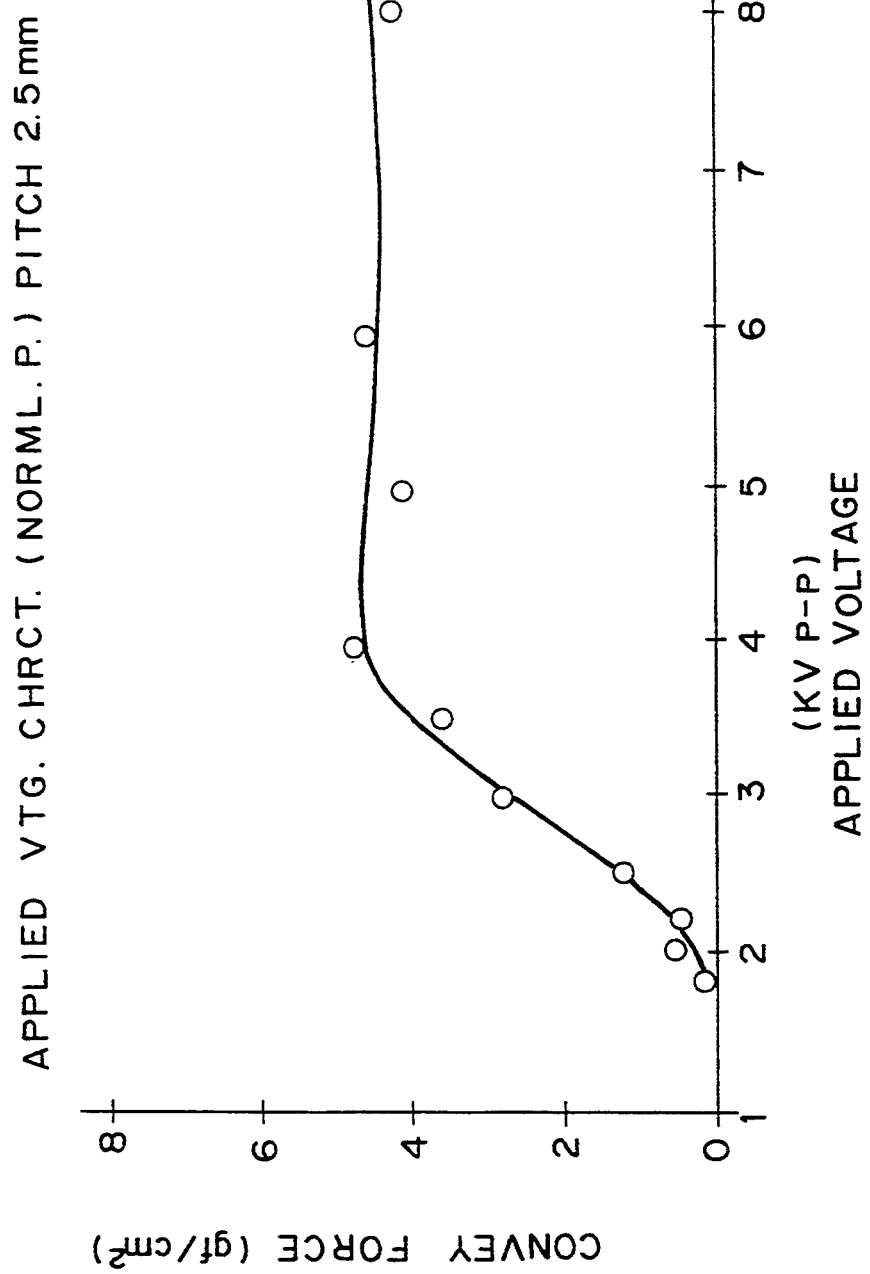
FIG. 27 is a graphical view of the conveying force of the conveyer belt with respect to the applied voltage.
Figure 28:
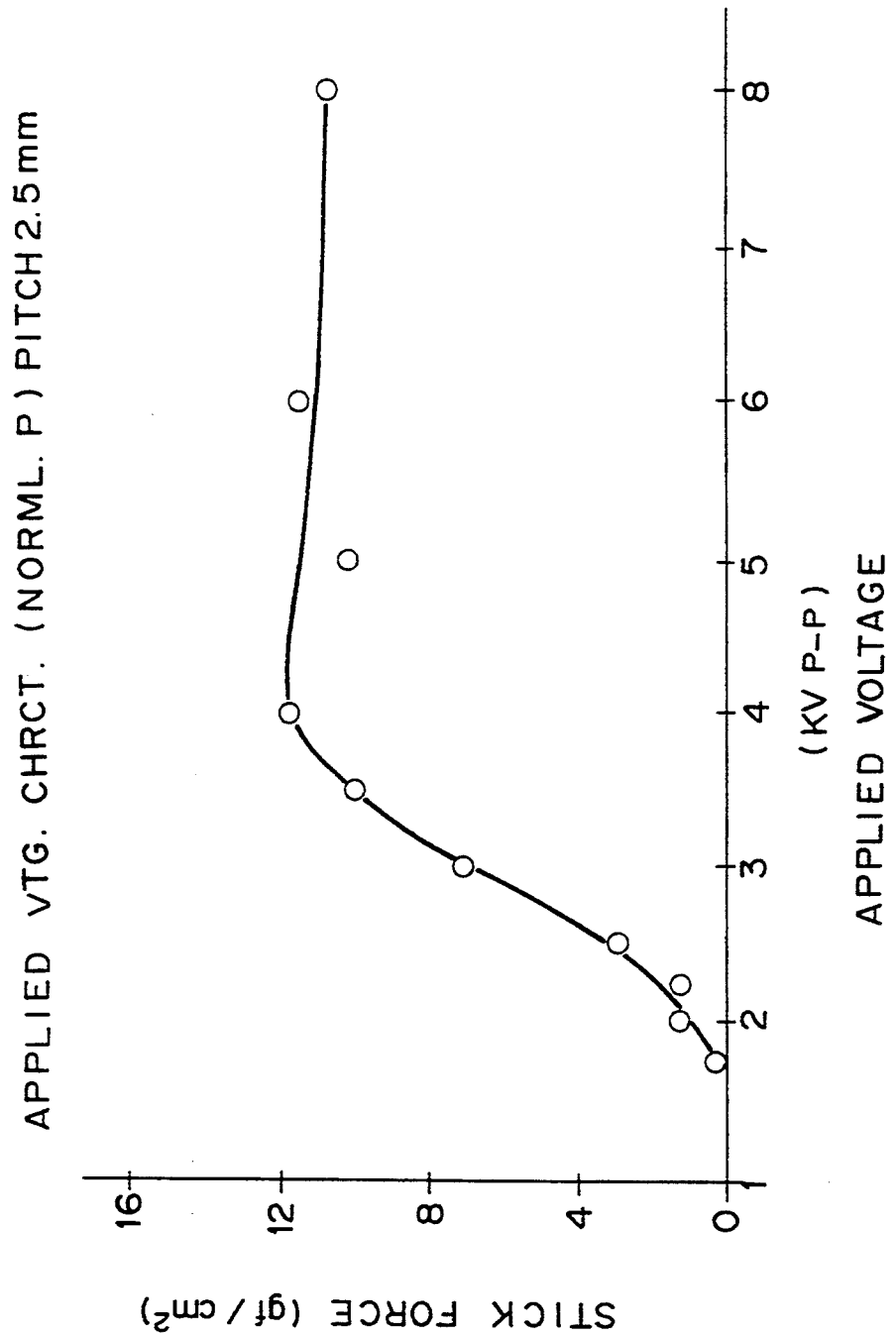
FIG. 28 is a graphical view of the sucking force of the conveyer belt with respect to the applied voltage.

FIGS. 25 to 28 represent experimental results for the embodiment of the invention. FIG. 25 represents the pitch characteristic of the conveying force maintaining the above mentioned applied voltage constant. FIG. 26 represents the pitch characteristic of the attractive force maintaining the above mentioned applied voltage constant. FIG. 27 represents the conveying force with respect to the applied voltage with the regular pattern pitch of 2.4 mm. FIG. 28 represents the attractive force with respect to the applied voltage with the regular pattern pitch of 2.4 mm.

As can be seen from the results of the experiment, the values for the pitch and the voltage applicable for the present invention are not limited to those mentioned above. For example, the pitch may be any value within a range from 0.5 mm to 10 mm and the voltage may be any value more than $\pm 1$ kVp-p.

Also, the frequency and the voltage of the alternate current are not limited to the above mentioned values but can be arranged as any values as long as the effect of discharging electricity can be obtained.

As mentioned above, in accordance with the embodiment of the present invention, an AC voltage is applied to the roller 3 from the power source 320 to charge the belt 8 with plus electricity and minus electricity to generate the uneven electric fields thereon for holding and conveying the paper and turning over the pages.

In the above mentioned operation, the voltage applied to the velt 8 is not limited to the AC voltage which periodically changes the current direction regularly so that the averaged voltage becomes zero. Instead of the AC voltage, any alternating voltage may be applied to the belt 8 to attract the paper thereto. However, by using the AC voltage, it becomes possible to obtain an effect that the force to attract the paper to the belt 8 is regulated.

Any means for generating the uneven electric fields on the surface of the belt 8 may be adopted other than that of the embodiment mentioned above.

Figure 29:
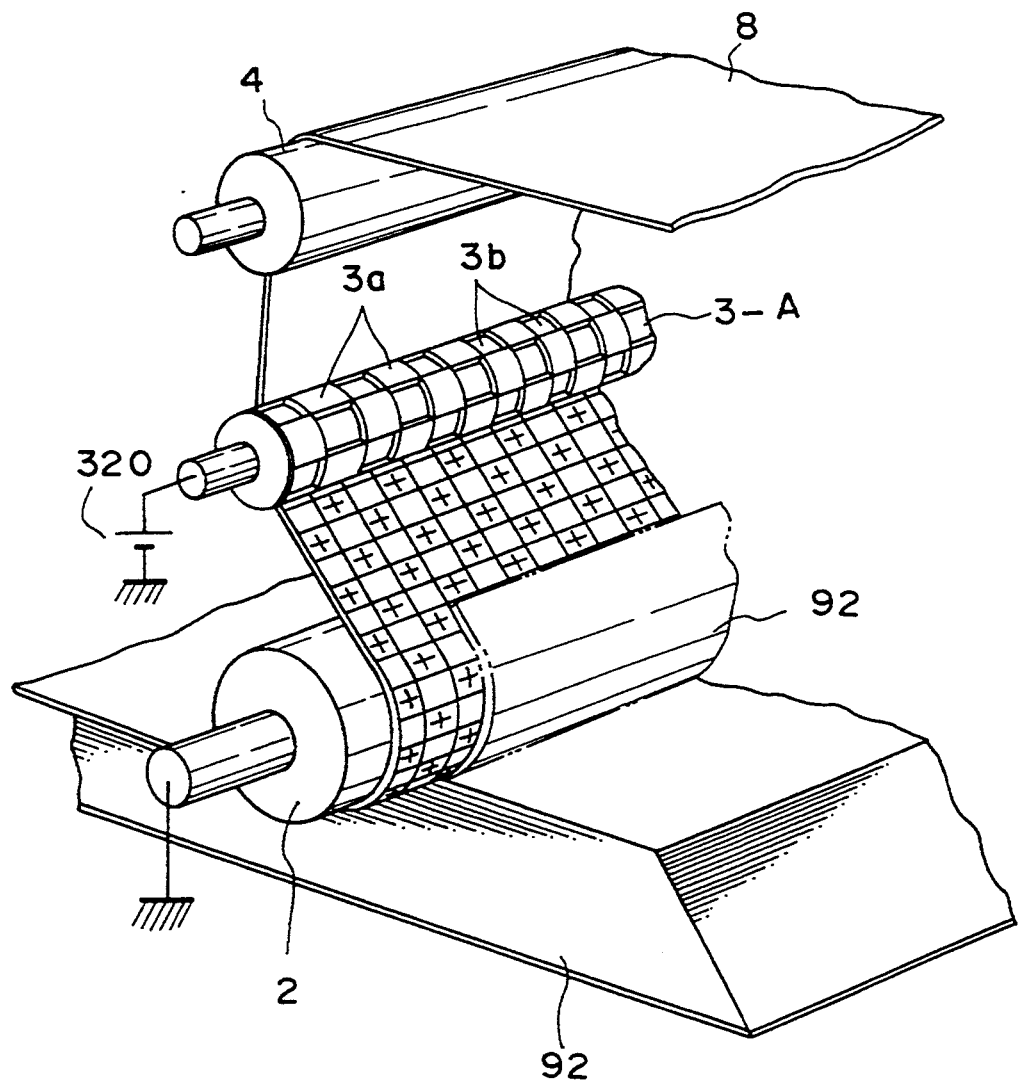
FIG. 29 is a perspective view of another example of means for applying uneven electric charges to the conveyer belt.
Figure 30:
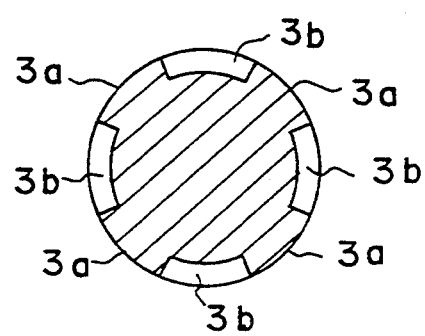
FIG. 30 is a sectional view of still another example of the means for applying uneven electric charges to the conveyer belt.

An example for such means is illustrated in FIGS. 29 and 30. As depicted in the drawing, the structure of this example comprises a bias roller 3-A made from metal and used as an electrode roller. The surface of the roller 3-A is shaped as a bumpy concavo-convex surface having bumps 3a and recesses 3b arranged in a check pattern. A DC voltage is applied to the roller 3-A from the power source 320.

In accordance with the structure mentioned above, only the projecting bumps 3a come in contact with the belt surface with the recesses 3b being disengaged from the belt surface so that a check shaped high density pattern of electric charge is formed on the surface of the belt 8 corresponding to the surface pattern of the roller 3-A.

In accordance with the arrangement mentioned above, a strong electric field is formed at each boundary between the charged area (marked by + in FIG. 29) and the non-charged area so that uneven electric fields are formed on the belt surface. The page of the book 92 is electrostatically attracted to the belt 8 due to the strong electric field generated at each edge of the check pattern of electric charges.

In accordance with the second embodiment of the invention mentioned above having the check pattern of electric charges, by forming the unit of the check pattern as squar, the length of the edge of pattern unit is doubled in comparison to the stripe pattern of FIG. 24 so that the attractive force for holding the paper is also doubled, which raises the reliability of turning over the pages.

On the other hand, instead of forming the check pattern by the bumpy concavo-convex surface on the roller 3-A as in the case of the second embodiment mentioned above, the check pattern may be formed by printing or evaporating a conductive layer of check pattern on a surface of an insulating roller made from resin or ceramic, for instance, and connecting the conductive layer to an electrode.

Figure 31:
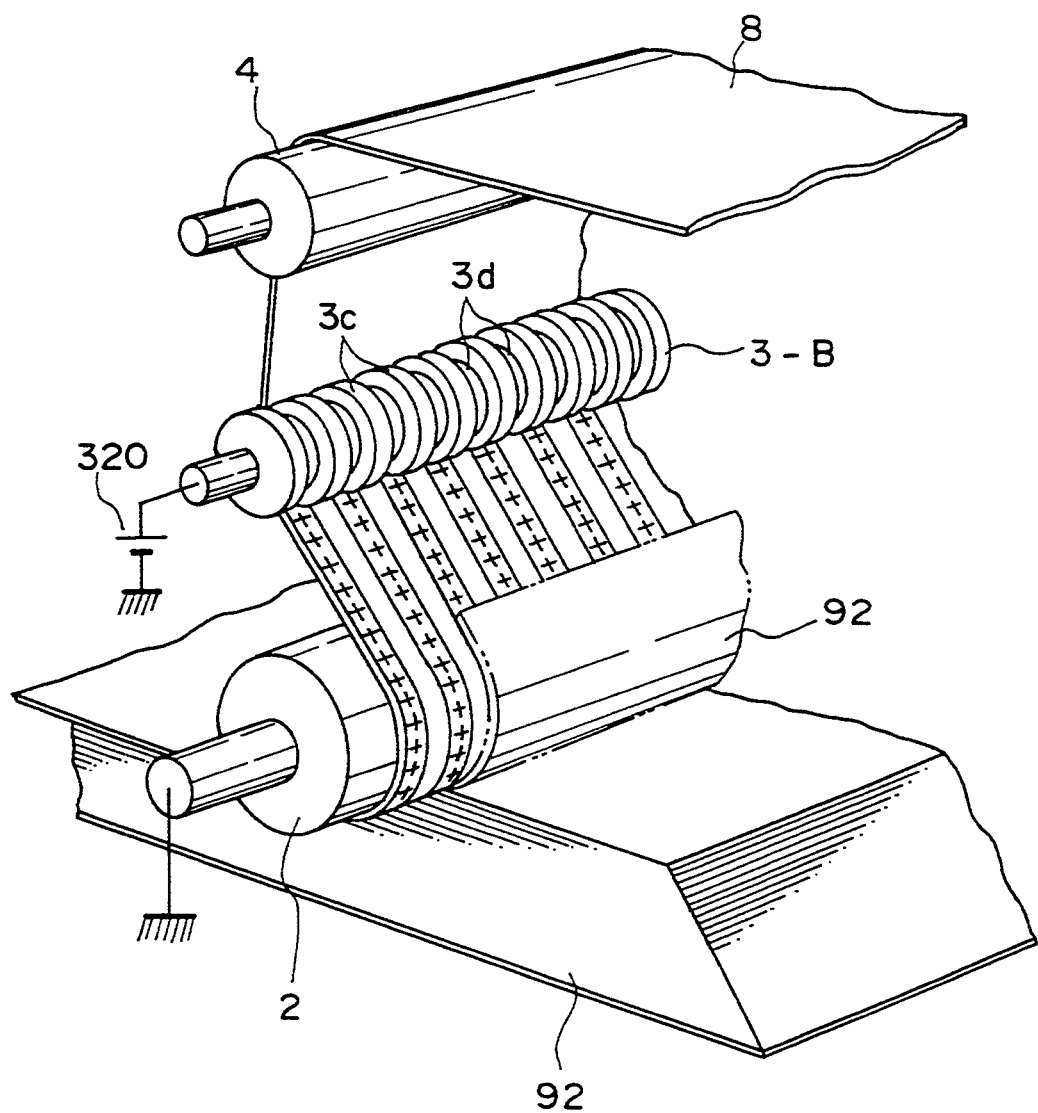
FIG. 31 is a perspective view of a further example of the means for applying uneven electric charges to the conveyer belt.

A third embodiment of the means for generating the uneven electric fields on the belt 8 is illustrated in FIG. 31. This embodiment comprises an electrode roller 3-B having a number of projecting electrode flanges 3c and ring grooves 3d alternately formed along the longitudinal axis of the roller on the outer surface of the roller 3-B. A DC voltage is applied to the roller 3-B from the power source 320.

In accordance with the third embodiment mentioned above, a stripe pattern of linear charged areas and non-charged areas alternately disposed are formed on the surface of the belt 8 as illustrated in FIG. 31.

Figure 32:
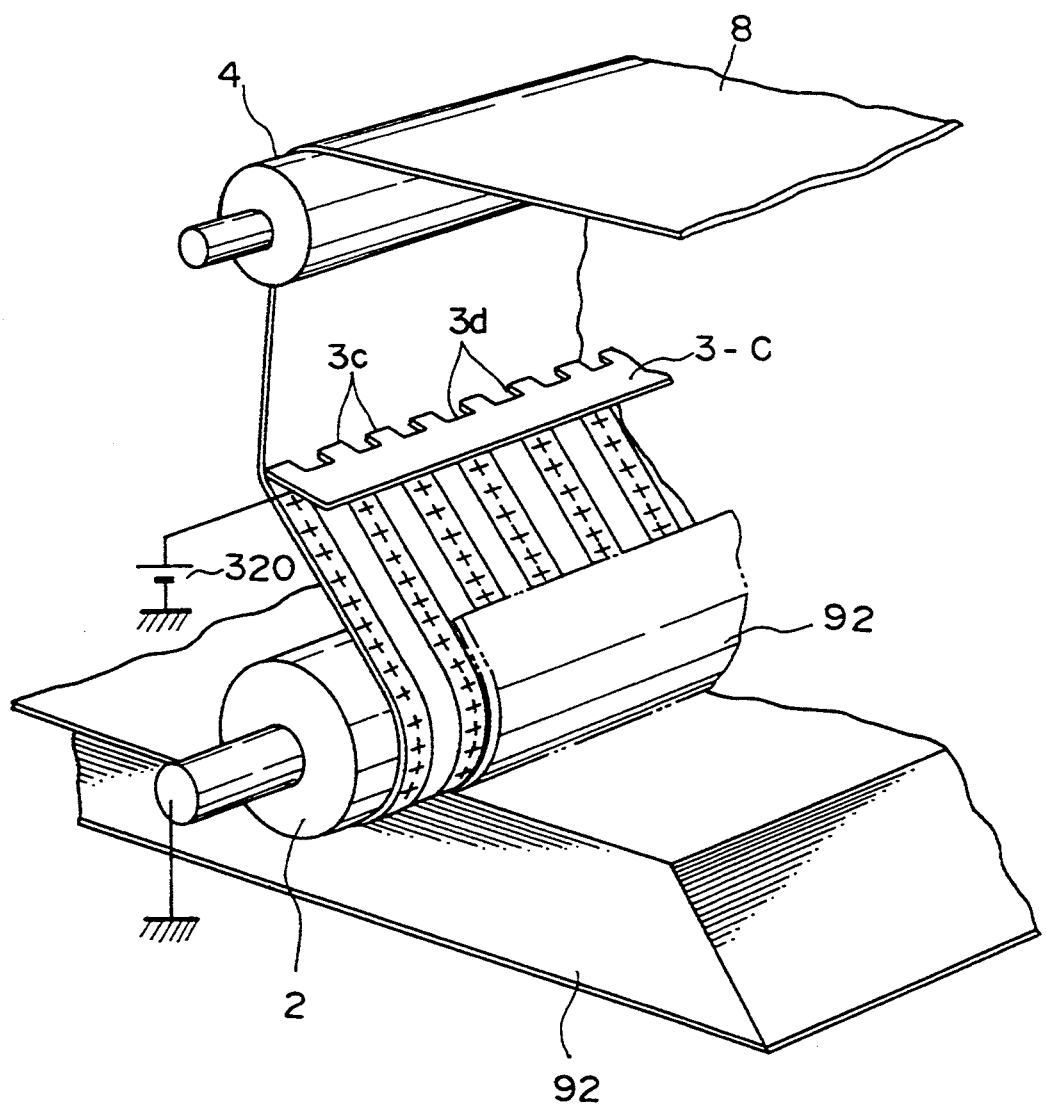
FIG. 32 is a perspective view of a still further example of the means for applying uneven electric charges to the conveyer belt.

FIG. 32 illustrates a fourth embodiment of the invention. This embodiment comprises a comb-like electrode plate 3-C having alternately arranged projecting electrode portions 3c and nonelectrode portions 3d, instead of the roller 3-B of the third embodiment of FIG. 31. The fourth embodiment functions in the same manner as the third embodiment.

In accordance with the third and fourth embodiments, the roller 3-B and the comb plate 3-C are made from conductive material so that the nonelectrode portions 3d are formed by cutting away a part of the basic material. However, instead of such a structure, the electric charge applying means may be formed in such a way that a plurality of electrodes 3c electrically connected to each other are arranged on a roller of insulating material, for example, such as resin and ceramic.

As mentioned above, in accordance with the third and fourth embodiments, the structure is simplified since the roller 3-B or plate 3-C is merely disposed facing to the belt 8 so that the rotational drive means can be deleted, which makes it possible to reduce the cost and realize a compact structure.

In accordance with the stripe pattern of electric charge formed by the above mentioned manner, the width of the charged area is easily apt to become wider than the non-charged area since the charges slip to the non-electrode portion from the electrode, which weakens the electric field of the boundary.

To cope with this problem, in accordance with the embodiments mentioned above, the width of each electrode portion 3c is formed wider than that of non-electrode portion 3d of the roller 3-B or plate 3-C in advance so that the width of the charged area formed on the belt 8 becomes equal to that of non-charged area.

Therefore, in accordance with the third and fourth embodiments, the boundary between the charged area and the non-charged area is clarified and the electric field at the boundary is strengthened, which makes it possible to arrange the pitch of the electrodes 3c in a high density to increase the edge effect so that the page of the book is strongly and reliably attracted to the belt 8.

Figure 33:
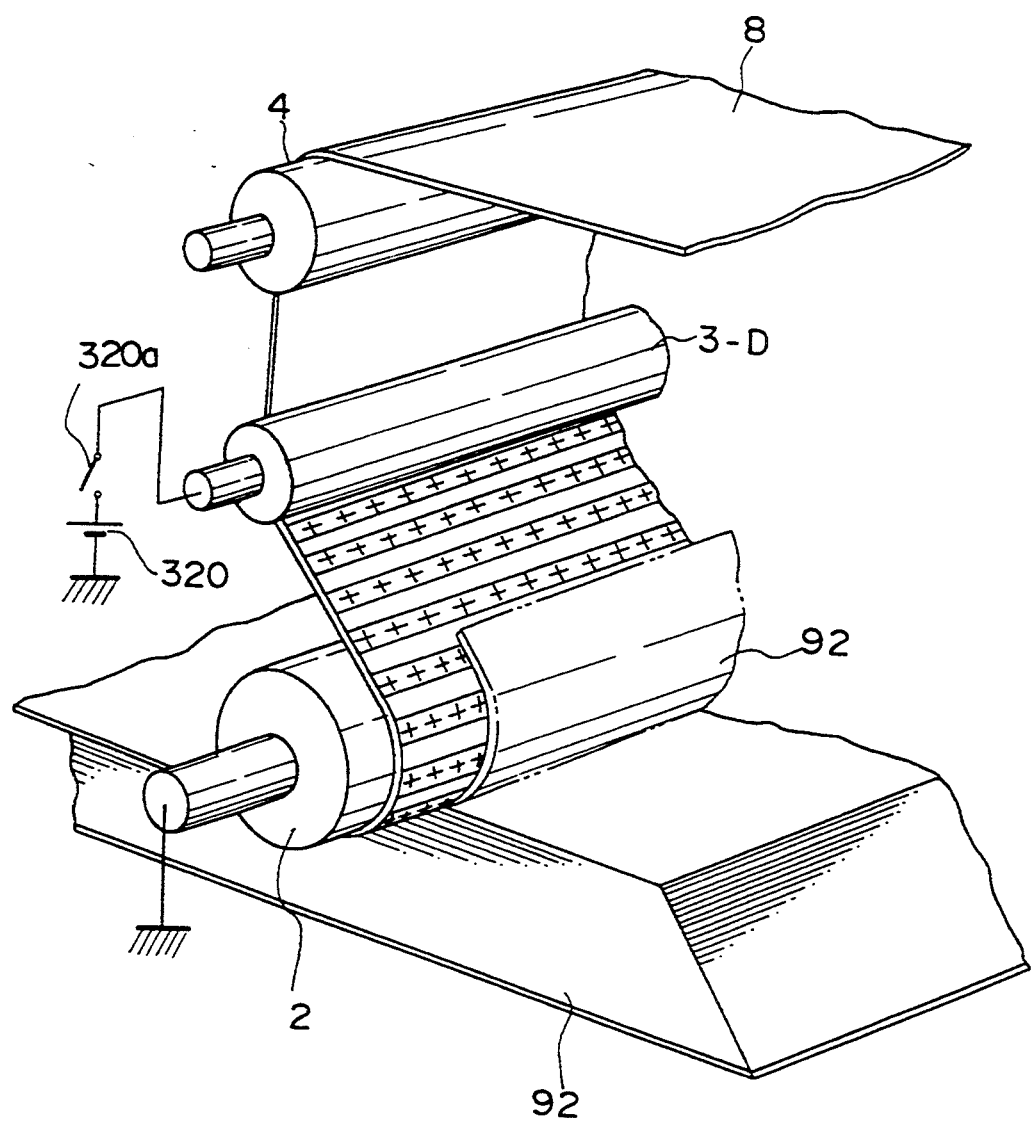
FIG. 33 is a perspective view of a still further example of the means for applying uneven electric charges to the conveyer belt.

A further example of the means for generating the uneven electric fields on around the surface of the belt 8 is illustrated in FIG. 33. In accordance with this example, a switch 320a is repeatedly turned on and off to form a stripe pattern of electric charges on the belt surface by applying a DC voltage to the roller 3-D from the power source 320.

As mentioned above, the means for generating the uneven electric fields is not limited to use the AC voltage. It is possible to use any alternating voltage having a rectangular form, a triangular form or a saw form or a combined voltage made from the AC alternating voltage to which a DC component is added and superposed thereon so that the voltage is biassed to the positive side or the negative side.

As mentioned above, in accordance with the embodiments of the present invention, it is not necessary to arrange any means to the paper (book 92) to be attracted to the belt 8, which prevents the pages from electrostatically attracting each other so that the pages are reliably turned over without mis-function due to the disturbance of the paper edges.

Also, since the page attractive force is generated in the vicinity of belt surface, the force acts only on the uppermost page to be turned over without acting on the pages below the uppermost page. Therefore, the uppermost one page is reliably turned over efficiently using the electric power. Such a method for turning over page is most appropriate for applying to the book-original.

Next, the function of the MFDS constituted as mentioned above is described hereinafter.

FIGS. 34 to 37 are a block diagram of the electric system of the MFDS, a functional mode transition diagram for reading the book-original, a functional mode transition diagram for reading the sheet-original and a flowchart of the functional mode of the MFDS.

First, a control means for controlling the MFDS is described with reference to FIG. 34.

Figure 34:
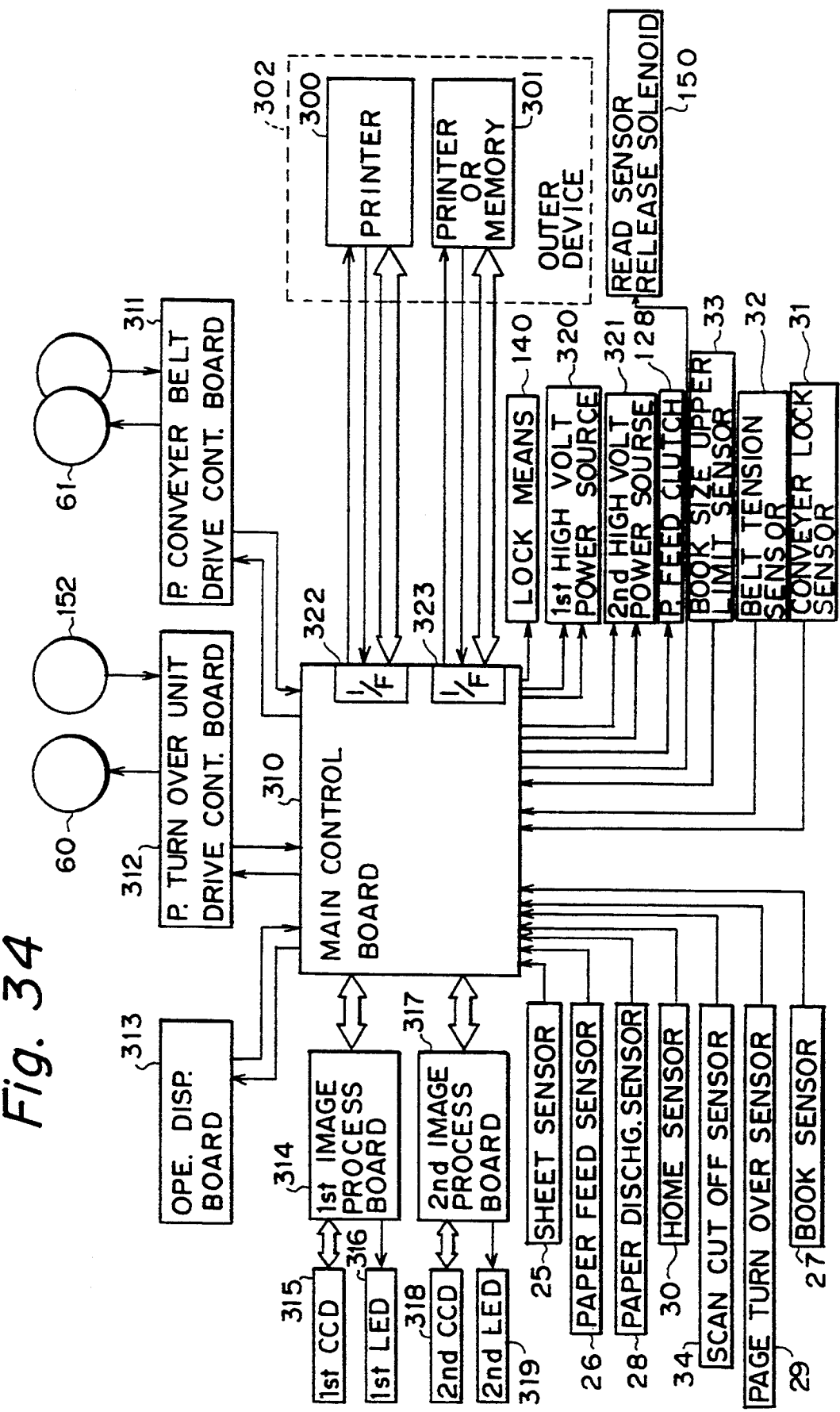
FIG. 34 is a block diagram of the electric system of the MFDS.

In FIG. 34, a main control board 310 is arranged to control the commands and data between the other boards to control the whole of the MFDS by controlling the on/off timing of each load and error correction by sensor input, etc.

Also, the main board 310 constitutes a communication protocol by communicating with the connected devices so that the board 310 is enable to cope with each device individually.

For example, in the case where a printer 300 is connected as an output device, the main board is so constructed that the pixel density, process speed, selection of print side and paper discharge mode, etc. are discriminated and checked.

Further, the board 310 comprises two interface systems for outer devices corresponding to each mode.

In accordance with this embodiment, the board 310 is further constituted in such a way that the commands between boards are transferred by serial communication and that the commands can be separated from the data/control bus so that the commands can be transmitted along with the data outputs.

In order to raise the applicability for general use, one or two of GPIB, centronics, and SCSI are preferably used as the interface so that data can displayed or stored in an optical disk device, HDD, or FDD without using a special interface.

On the other hand, in FIG. 34, a control board 311 is arranged to control the drive motor 61 for driving the belt for turning over and conveying the page of the book.

Also, a control board 312 is arranged to control the drive motor 60 for driving the page turning over unit.

The motor 61 comprises an encoder integrally attached thereto to form one unit. The encoder generates pulse signals on the basis of which the speed of the belt 8 is detected. The speed and position of the motor as well as the back and forth motion thereof are controlled by the feed back of the pulses.

On the other hand, the motor 60 comprises an encoder 152 attached to the roller 2 which encoder generates pulses which are fed back so as to detect the position of the roller 2 and control the speed and position of the motor as well as the back and forth motion thereof.

Also, the boards 311 and 312 are connected to the main board 310, respectively, so that the command for each board is transmitted by serial communication between each board and the main board 310.

An operation display board 313 is arranged to input by keys the data such as the number of prints, magnification of the print, the number of pages to be turned over and the print mode and display the input data, the state of error, the page turning over state, and the input mode, etc.

When the operation mode is to be displayed, only the mode which can be operated by the connected device (printer 300) is displayed or an error notice is displayed when a mode which is inoperable to the device is selected.

For example, in the case where a printer which is not able to print on both sides of the paper is connected, when the double-side print mode is selected by pressing the key 612, an error notice such as "the printer connected is disable to print both sides".

The original reading operation is started by pressing the start key 600 arranged on the board 313.

Further, the command and data are transmitted between the board 313 and the main board 310 by serial communication.

A first image processing board 314 is arranged to generate a drive clock signal for the Si equimultiple sensor (first CCD) 315 housed in the first reading sensor unit 9, adjust the on/off timing of the first LED 316 also housed in the unit 9 and amplify the output from the CCD 315 to process the image after A/D conversion of the output from the sensor 315.

Also, the board 314 operates the image processing functions such as shading correction, MTF correction, varying the magnification of main scanning, letter processing, photograph processing, and negative/positive selection.

The board 314 is connected to the main board 310 so that the data and command are transmitted between the boards 314 and 310.

A second image processing board 317 is arranged to generate a drive clock signal for the second CCD 318 housed in the second reading sensor unit 14 (constituted in the same manner as the unit 9), adjust the on/off timing of the second LED 319 also housed in the unit 14 and amplify the output from the CCD 318 and process the image after A/D conversion of the output from the CCD 318.

Also, the board 317 operates the image processing functions such as shading correction, MTF correction, main scanning magnification change, letter processing, photograph processing and negative/positive selection.

Further, the board 317 is connected to the main board 310 so that the data and command are transmitted between the boards 317 and 310.

The first high voltage power source 320 is arranged, as mentioned before, to apply a high AC voltage to the first bias roller 3 and comprises a means for generate two different frequencies for attracting the original paper and erasing the electric charge on the belt. The frequency is changed in accordance with the signal from the two output port of the board 310.

A paper feed clutch 128 is arranged to control the paper feed start timing for the sheet-original 200 on the basis of the control signal output from the board 310.

Also, sensors 25 to 34 are connected to the main board 310 through input ports, respectively, to perform respective functions such as changing the operation mode, detecting the control timing, or error detection by transmitting the detection signal to the board 310.

Next, the function of the MFDS is described hereinafter.

Figure 35:
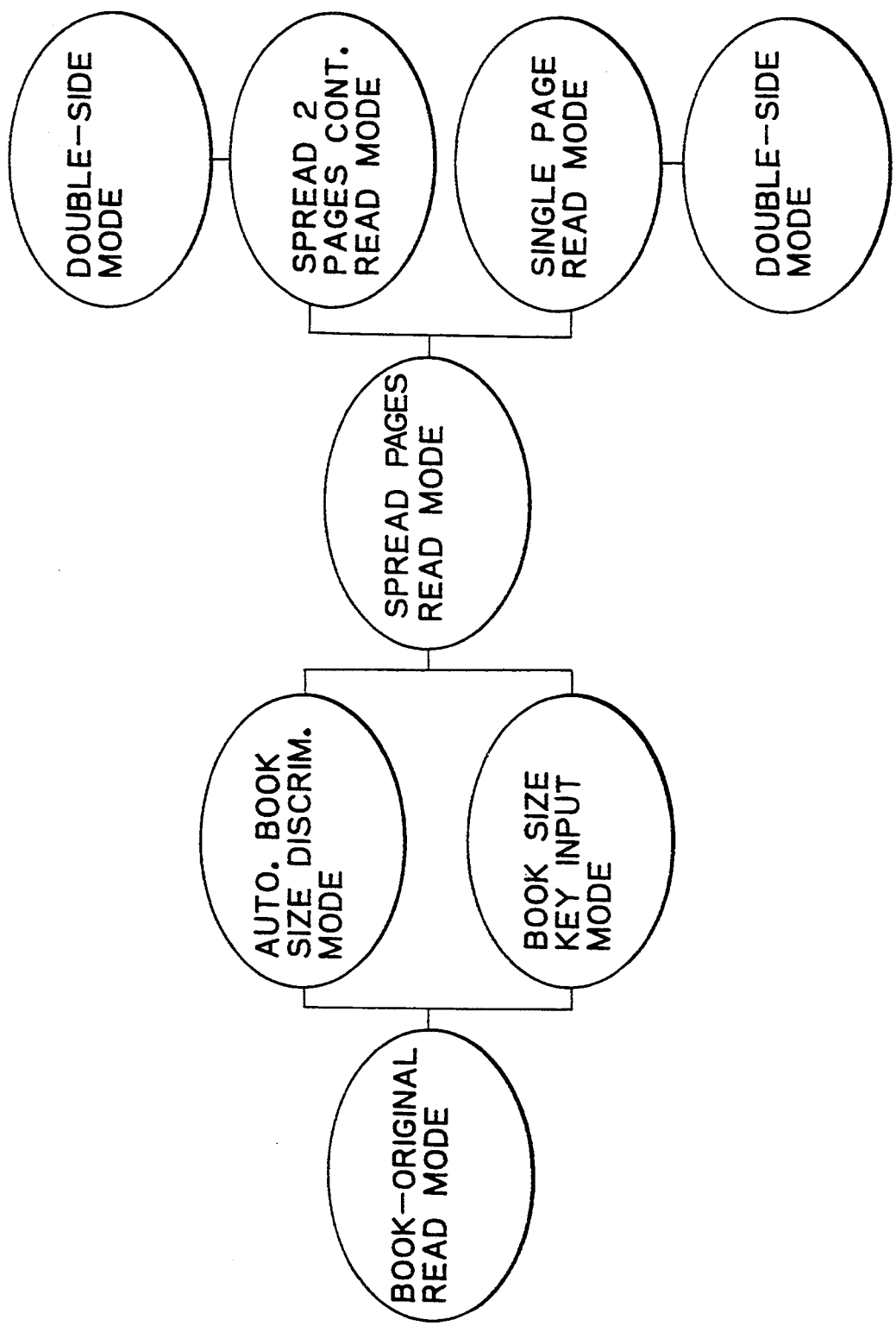
FIG. 35 is an explanatory view for explaining transition of mode for reading a book-original operated by the MFDS.
Figure 36:
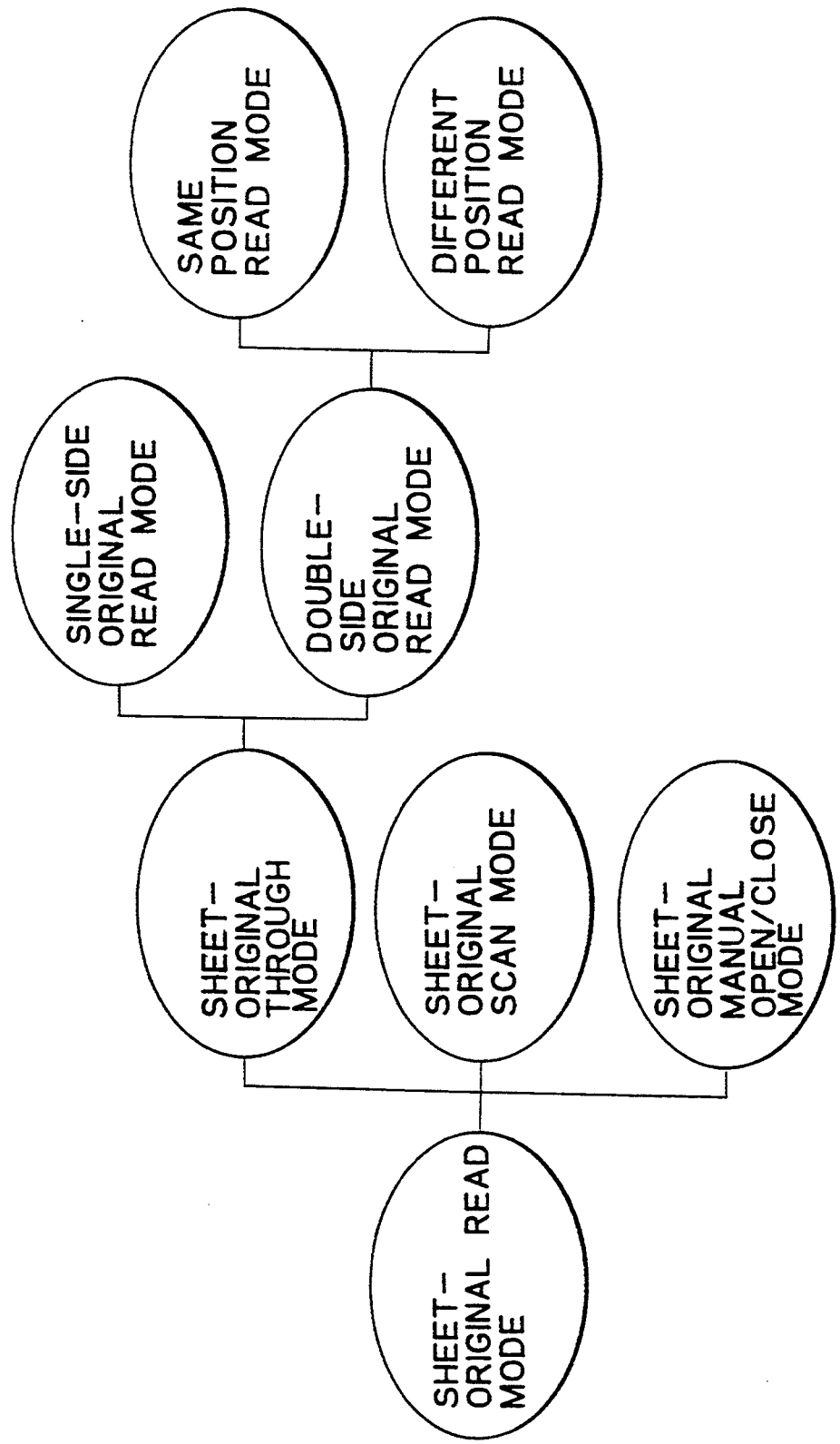
FIG. 36 is an explanatory view for explaining transition of mode for reading a sheet-original operated by the MFDS.

There are essentially two kinds of functional modes for the MFDS. The first mode is a book-original reading mode for automatically reading the book-original and turning over the pages of the book, as illustrated in FIG. 35. The second mode is a sheet-original reading mode for automatically feeding the sheet of paper original and reading the sheet, as illustrated in FIG. 36.

Each of the two modes has precise special modes belonging to the main mode.

That is, the first mode for reading the book-original has, as illustrated in FIG. 35, an automatically book size discrimination mode for automatically discriminating the size of the book 92 and a book size key input mode for indicating the book size by manipulating the keys on the board 313.

In either of the book size discrimination mode or the book size key input mode, the pages of the book 92 are automatically turned over in accordance with the spread pages reading mode wherein the book is set in a state of being opened with the spread pages arranged upwardl.

Further, the book-original reading mode comprises, as means for reading the book, in relation to the output device (especially printer): a spread two pages continuously reading mode wherein the spread two right and left pages of the book 92 are continuously read and the images of the two pages are printed on one sheet of print paper; a double-side printing mode for the spread two pages continuously reading mode mentioned above wherein the subsequent spread two pages are read and the images thereof are printed on the rear side of the print paper for the preceding spread two pages with the use of the printer which is enable to print image on both sides of one print paper; a single page reading mode wherein the spread two pages are read and printed one by one in such a way that one page is read and printed first and the other page is subsequently read and printed; and a double-side printing mode for the single page reading mode mentioned above wherein the subsequent spread two pages are read and printed one by one in the rear side of the print paper for the preceding spread two pages with the use of the printer which is enable to print image on both sides of one print paper.

On the other hand, the sheet-original reading mode comprise, as illustrated in FIG. 36: a sheet-original through mode wherein the sheet-original 200 is automatically fed and conveyed, in a state where the unit 9 or 14 is being fixed, so that the sheet-original is read by a sheet through method; a sheet-original scan mode wherein the sheet-original 200 is read by repeating the back and forth motion (scan motion) of the unit 9 of the unit 1 in a state where the sheet 200 is placed on the original placing surface 116; and a sheet-original manual set mode wherein the original is manually set in the case where the automatic document feeder (ADF) can not be used for setting the original or the operator does not want to use the ADF.

Also, the sheet-original through mode comprises a single side reading mode wherein only the image of one of the sides of the sheet 200 is read and a double-side reading mode wherein the images of both sides of the sheet 200 are simultaneously read with the use of the units 9 and 14.

Further, the both-side reading mode comprises a same position reading mode wherein the units 9 and 14 are disposed at tha same position facing to each other and a differnt position reading mode wherein the units 9 and 14 are disposed at different positions.

Next, the function of changing the above mentioned modes is described with reference to FIG. 37.

Figure 37:
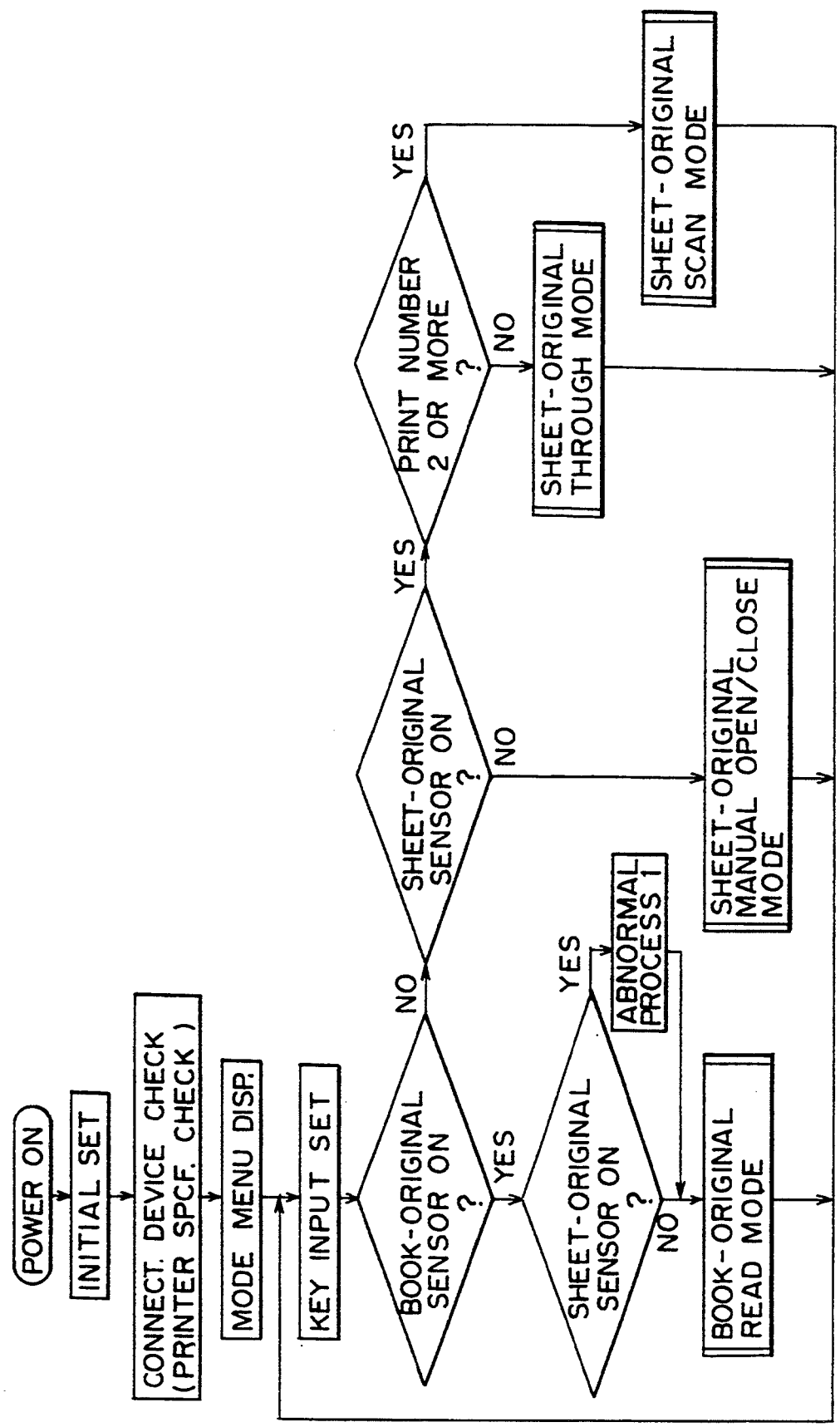
FIG. 37 is a flow chart of the mode changing function of the MFDS.

In FIG. 37, when the main power source of the MFDS is turned on, the above mentioned boards 310 to 314 and 317 of FIG. 34 are reset to the initioal state, respectively.

After that, the connecting state of each device such as the printer is checked and the operation mode for each device is displayed. Also, the number of prints, the magnification of print, the number of pages to be turned over and other functional modes are input by pressing the keys. Also, the book-original 92 or the sheet-original 200 is set on the device.

In case where the sheet-original 200 is set on the tray 94, the sheet-original sensor 25 is turned on. On the other hand, the book-original sensor 27 is turned on, in the case where the unit 19 is opened by the key 620 on the board 313 and the book 92 is set in the state of being opened.

The original image reading mode is changed, as illustrated in FIG. 37, in response to the on/off states of the sensors 25 and 27, and the print number of the sheet 200 input from the key 602 on the board 313.

More precisely, when the sensor 27 is being turned off, the sensor 25 is being turned on and the print number is 1, the operational mode is set to the sheet-original through mode.

Also, when the sensor 27 is being turned off while the sensor 25 is being turned on and the print number is 2 or more, the operational mode is changed to the sheet-original scan mode.

Further, when both of sensors 25 and 27 are being turned off, the operational mode is changed to the sheet-original manual setting mode.

Also, when the sensor 27 is being turned on while the sensor 25 is being turned off, the operational mode is changed to the book-original reading mode.

Further, when both of sensors 25 and 27 are being turned on together, an abnomality process (buzzer on and error display) is executed to notice the abnomal state to the operator and after that the mode is changed to the book-original reading mode.

After the functional flow moves to the selected mode subroutine as mentioned above, if the start key 600 on the board 313 is not pressed, the flow is returned to the step for receiving input from keys without executing the image reading operation.

Next, the function of the mode mentioned above is described hereinafter.

Figure 38:
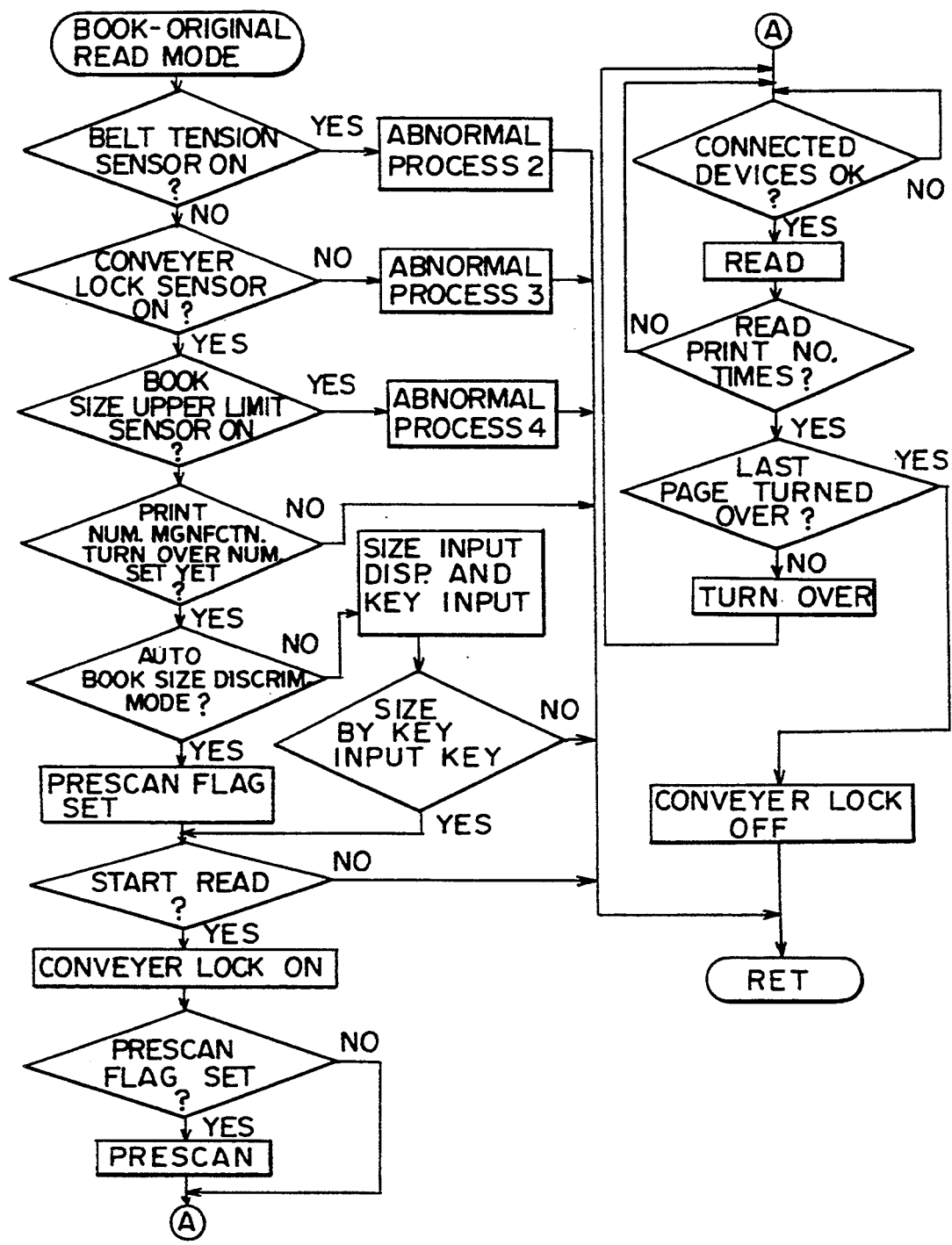
FIG. 38 is a flow chart of the function of the MFDS operated in the book-original reading mode.

First, with reference to FIG. 38, the book-original reading mode is described below.

When the mode of MFDS is set to the book-original reading mode, the on/off state of the scan cut off sensor 34 is checked. The sensor 34 is turned on, as illustrated in FIG. 4, when it detects the upper limit piece 76 when the unit 1 is lifted to the upper limit position.

The unit 1 moves vertically, as mentioned before, following to the thickness of the book 92 placed on the surface 116. The tension of the belt 8 is increased according as the unit 1 is moved upward, that is, the thickness of the book 92 is increased.

Therefore, if the book 92 is thicker than a predetermined thickness so that the unit 1 is overlifted and the tension of the belt 8 becomes too high, the tension of the belt 8 functions to brake the unit 1 to prevent the scanning motion of the unit 1.

The sensor 34 detects the level of the unit 1 at which the unit 1 becomes enable to scan the book 92 due to that the book is too thick, as mentioned above.

In the case where the sensor 34 is turned on, a second abnormality process 2 wherein the buzzer is turned on and the notice "book is too thick" is displayed to prevent the operator from forcing to close the unit 19 and keep the unit from being damaged.

On the other hand, if the thickness of the book 92 is below the predetermined value, the unit 19 is closed by the operator and the lock sensor 31 is turned on.

In the above mentioned operation, if the unit 19 is kept being opened, that is, the sensor 31 is kept being turned off, a third abnormality process 3 wherein the buzzer is turned on and the notice "close conveyer" is displayed is executed.

If the unit 19 is closed, the on/off state of the book size upper limit sensor 33 is checked as follows.

In the case where the sensor 33 is turned of by detecting the book 92, that is, the size of the book 92 placed on the surface 116 exceeds a predetermined allowable range, a fourth abnormality process wherein the buzzer is turned on and a notice "book is too large" is displayed is executed.

After that, whether the print number data, the magnification data and the page number data to be turned over are input or not is checked. After that, in the case of automatic book size discrimination mode, a prescan flag is set, while in the case of mode other than the automatic book size discrimination mode, the mode is arranged to the book size input mode wherein the area to be read in the book 92 is set by inputting the book size data from the key on the board 313.

After that, the start key 600 is pressed so that the lock means 140 is actuated to lock and secure the unit 19 to the original plate 18. Thereby, it becomes possible to prevent the user from unintentionally opening the unit 19 in the operation of unit 1 turning over pages and keep the book from being damaged.

After that, if the prescan flag is set, the prescanning operation is executed by the unit 1. Whereas, if the prescan flag is not set, the prescanning operation is skipped.

After the prescanning operation is ended, the operational flow moves to the state of wait until the connected device (printer 300) becomes ready to be operated.

When the printer becomes ready and upon receipt of the start signal from the printer, the unit 1 is actuated to start the reading operation to read the original image of the book 92, as mentioned before.

The reading operation by the unit 1 is repeated corresponding to the print number set in advance.

When the predetermined number times of reading operation are repeated, the page is turned over, as mentioned before, to read the next page, by the unit 1.

The above mentioned reading operation and the page turning over operation are repeated according to the preset print number until the last page is turned over.

When the last page is opened and the page is repeatedly read for the predetermined times, the unit 1 is returned to the home position without turning over the last page so that the book-original reading mode routine is returned.

The essential function of the book-original reading mode is as mentioned above with reference to the flow chart of FIG. 38. The above mentioned spread two pages continuously reading mode, the both-side reading mode for the spread two pages continuously reading mode, the spread one page reading mode and the both-side reading mode for the spread one page reading mode are set by inputting from the key in the step of key input illustrated in the flow chart of FIG. 37.

Each input mode is described below with reference to the timing chart after the key 600 is pressed.

First, the spread two pages continuously reading mode is described below with reference to the timing chart of FIG. 39.

Figure 39:
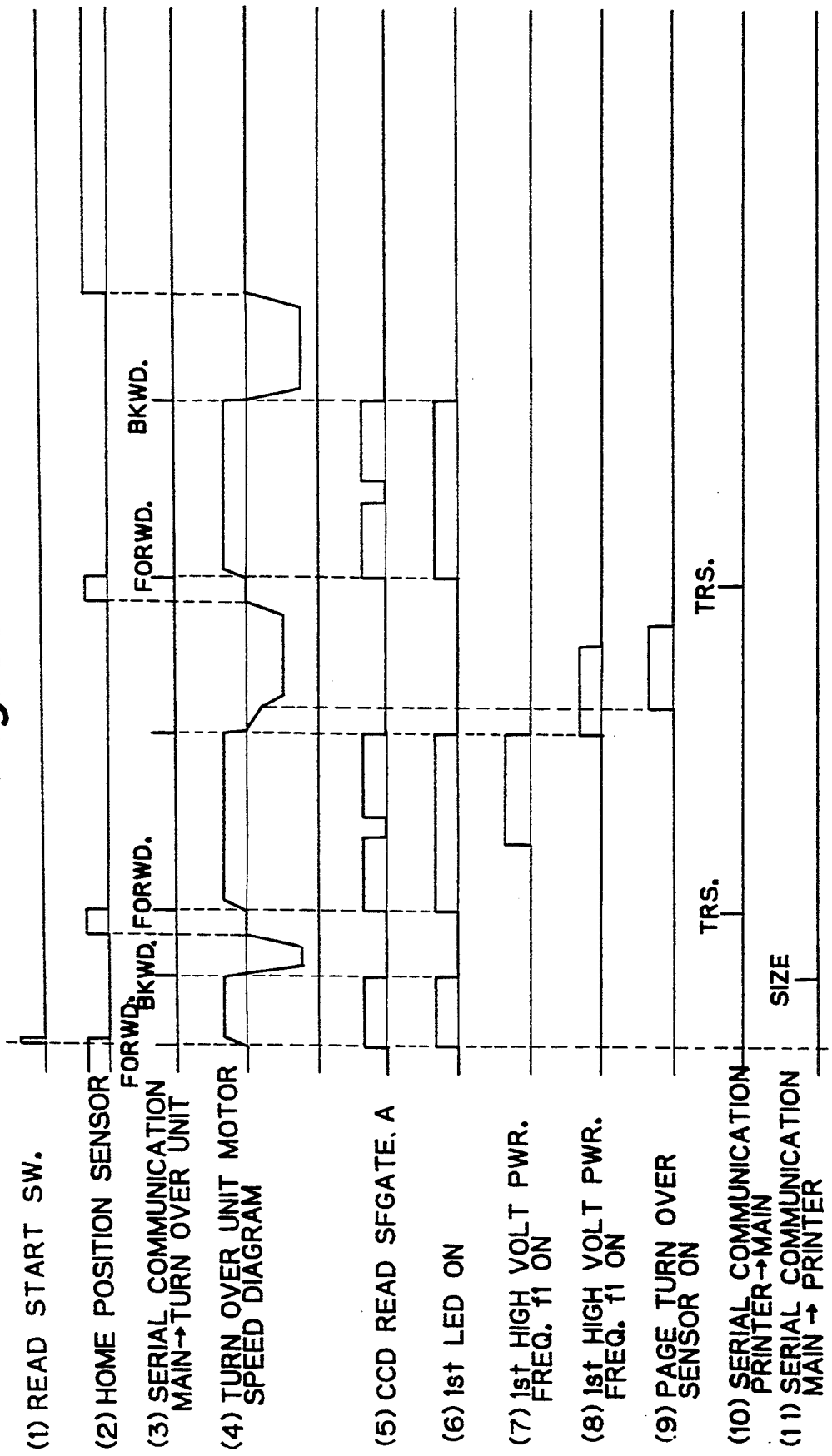
FIG. 39 is a time chart of the function of the MFDS operated in the continuous reading mode for spread two pages in the book-original reading mode.

In FIG. 39, when the key 600 on the board 313 is pressed so that the reading start switch is turned on, a shutter (not shown) is closed.

The shutter comprises a white reference plate inside of which is colored white by which the shading of the unit 9 is corrected. This shading correction for the unit 9 is conducted every time the unit 1 rises and ended before the speed of the unit 1 becomes constant. The timing chart for this motion is not illustrated.

The function of the unit 1 is started by a forth motion start signal transmitted to the board 312 from the main board 310. Upon receipt of the start signal, the unit 1 starts the prescanning operation.

After the speed of the unit 1 rises to a constant speed Vf, since the shutter is already opened, the book 92 is being read by the CCD sensor 315.

On the basis of the data obtained from the prescanning operation of the unit 1, the end of the book 92 is detected by image processing operation so that the book size of the original 92 is discriminated by counting the output from the encoder 152 attached to the roller 2 so that the reading area of the book 92 and the pages to be turned over is determined.

As mentioned above, the book 92 is set with reference to the center of the original placing surface 116, which makes it possible to calculate the reading area of the book 92 and the region of pages to be turned over by detecting only the left end of the book 92.

Therefore, in accordance with the MFDS of this embodiment of the present invention, it becomes unnecessary to prescan the whole surface of the book by the unit 1 to detect the book size of the original 92. Instead, it becomes possible to detect the book size only by short prescanning operation by the unit 1, as a result of which at the time of prescanning operation by the unit 1, it becomes possible to avoid reading the book from a wrong starting page to be turned over.

The book size data of the original 92 is transmitted from the main board 310 to the outer printer 300.

On the other hand, after the book size is detected and while the book size data is being transmitted to the printer 300, a reverse signal for driving the motor 60 in the backward direction is transmitted to the board 312 from the main board 310 so that the unit 1 moves back toward the homo position 1A at a speed of Vr.

It is to be noted that the surface 116 of the plate 18 may be colored by yellow, for instance, which is not usually used for the book-original, which enhances the contrast between the book and the surface 116 so that the discrimination reliability of the book size can be raised.

Also, by coloring the surface 116 with a medium achromatic color such as gray, it becomes possible to discriminate the book without using a color sensor for the CCD 315 of the unit 9.

After the above mentioned prescanning operation is ended and the unit 1 is evacuated to the home position 1A, and when the printer 300 is ready to be operated and upon receipt of the data transfer requirement signal from the printer 300, the main board 310 transmits the forth motion signal to the board 312 to drive the motor 60 in the forward direction so that the unit 1 is moved forward.

The unit 1 is controlled by a feed back system, as mentioned before, with the use of the output data from the encoder 152 of the roller 2 so that the unit 1 moves toward the end position 1C along the original surface of the book 92 at a constant speed of Vf.

In this forward motion of the unit 1, the LED 316 of the unit 9 is already lit so that the original information of the book 92 is already being read by the sensor 315 of the unit 9.

It is to be noted that the central binding portion of the book 92 spread open and placed on the surface 116 of the plate 18 is curved sharp, as illustrated in FIG. 1 so that it is hard to accurately read the information from this central portion.

However, usually letters or diagrams are not printed at this central binding portion of the book.

Therefore, in accordance with the MFDS of this embodiment, as illustrated in FIG. 39, the reading gate circuit SFGATE of the CCD sensor 315 is turned off at around the binding portion of the book 92 so that the original information data from this portion is masked.

The masking area for the binding portion of the book-original is set in the initial setting state as +10 mm and −10 mm from the center of the reference portion 24, as mentioned before. However, the range of the masking area can be varied by inputting the data from the key 608 of the board 313 so as to cope with a specially arranged book-original.

The original information reading operation of the book 92 by the unit 9 is continued until the unit 1 comes to the end position 1C. In this reading motion of the unit 1, when the unit 1 reaches around the center of the book 92, the power source 320 is turned on with the frequency of f1 with a result of which the pattern of electric charge is formed on the belt 8 at the portion corresponding to the right page of the book 92, as mentioned before.

The belt 8, as mentioned before, is not driven when the unit 1 is being driven and functions to press and hold the book 92 instead.

In a manner as mentioned above, the unit 1 is driven to the end position 1C reading the information from the book 92. When the right end of the book is read to end the reading operation, the power source 320 is turned off and the page turning over signal is transmitted to the board 312 from the main board 310 so that the page turning over operation for the book 92 by the unit 1 is started.

In the operation mentioned above, if the original page read by the unit 9 is the page preset as the last page of the book 92 to be read, the board 310 does not output the page turning over signal. Instead, the unit 1 moved back to the home position 1A after reading the last page of the book 92 without turning over the last page.

In the page turning operation of the book 92, until the time when the sensor 29 is turned on, the reverse motion of the unit 1 is started slow and the read page (right page in FIG. 1) electrostatically attracted to the belt 8 is guided into the page holder 7.

After that, the unit 1 is further moved toward the home position 1A so that the read page is involved into the holder portion 7 to the center of the paper.

Also, in the page turning over operation by the unit 1, to erase the electric charge pattern formed on the original attracting area on the belt 8, the power source 320 is turned on with the frequency of f2.

The read page of the book 92 involved into the holder 7 of the unit 1, as mentioned above, is discharged from the holder 7 after the unit 1 exceeds the center portion of the book 92 and before reaching the end position 1C to end the page turning over operation.

The return speed Vrm of the unit 1 in the page discharging operation is arranged to be faster than the speed Vf in the reading operation, that is, Vrm>Vf so as to raise the speed of page turning over motion.

The state of the series of page turning over operation is detected by the sensor 29.

That is, the on/off state of the sensor 29 is checked at various position of the unit 1 so as to detect an abnormal state. When the abnormal state is detected, an abnormality process is executed.

In the abnormality process, a buzzer is actuated and in the case, for example, where the page is not involved into the holder 7, a message such as "page turn over disabled" or in the case where the page is not discharged from the holder 7, a message such as "page discharge disabled" is displayed in the board 312 as well as the page turning over operation is stopped.

Also, to enable the user to confirm such an abnormal state of page turning over operation, the position where the error occurred is displayed in the board 313.

After that, the reading and turning over operation for the pages after the first page is repeated in turn in response to the transfer requirement signal transmitted from the printer 300 until the last page is read.

In accordance with the timing chart of FIG. 39, the print number is set as "1" wherein the page of the book is turned over once the page is read. However, in the case where the print number is set as "2", when the unit 9 ended the reading operation for the first time, the board 310 transmits the reverse motion signal instead of the page turning over signal to the board 312 so that the unit 1 is moved back to the home position at a speed of Vr to start the reading operation by the unit 1 for the second time.

The page reading operation by the unit 1 is repeated for the predetermined times set in advance. When the number of the reading operation performed by the unit 1 becomes coincident with the preset number, the board 310 outputs the page turning over signal to the board 312 to execute the page turning over operation mentioned above.

After that, the page reading and turning over operation for the pages after the first page is repeated in turn in response to the data transfer requirement signal transmitted from the printer 300 so that the above mentioned operation is repeated until the last page is read by the predetermined times.

Also, in the case wherein the print magnification for the read image is set by the key 614, the scanning speed Vf of the unit 9 is varied in response to the magnification so that the magnification in the sub-scanning direction is varied and that the magnification in the main scanning direction of the image is varied by the board 314 as well.

On the other hand, in the operation of both-side print mode in the spread two pages continuously reading mode, since the printer 300 prints the image on both sides of the print paper, the timing of transmitting the data transfer requirement signal to the board 310 from the printer is slightly delayed in comparison to the above mentioned single side print mode operation. Except for this point, the function of the mode is substantially the same as that of the single side print mode for the spread two pages continuously reading mode.

Next, with reference to FIG. 40, the spread single page reading mode is described below.

In this mode, the right page and the left page of the spread two pages of the book are independently read and respective images of the pages are processed individually. This mode comprises two sub-modes i.e., a single side print mode wherein the two images are printed in the respective papers individually, that is, each image is printed in one side of each paper and a double-side print mode wherein the two images are printed in the two sides of one paper, respectively.

Also, in this mode, it is possible to select the operation to start reading from the right page or left page by the key 603 on the board 313.

Figure 40:
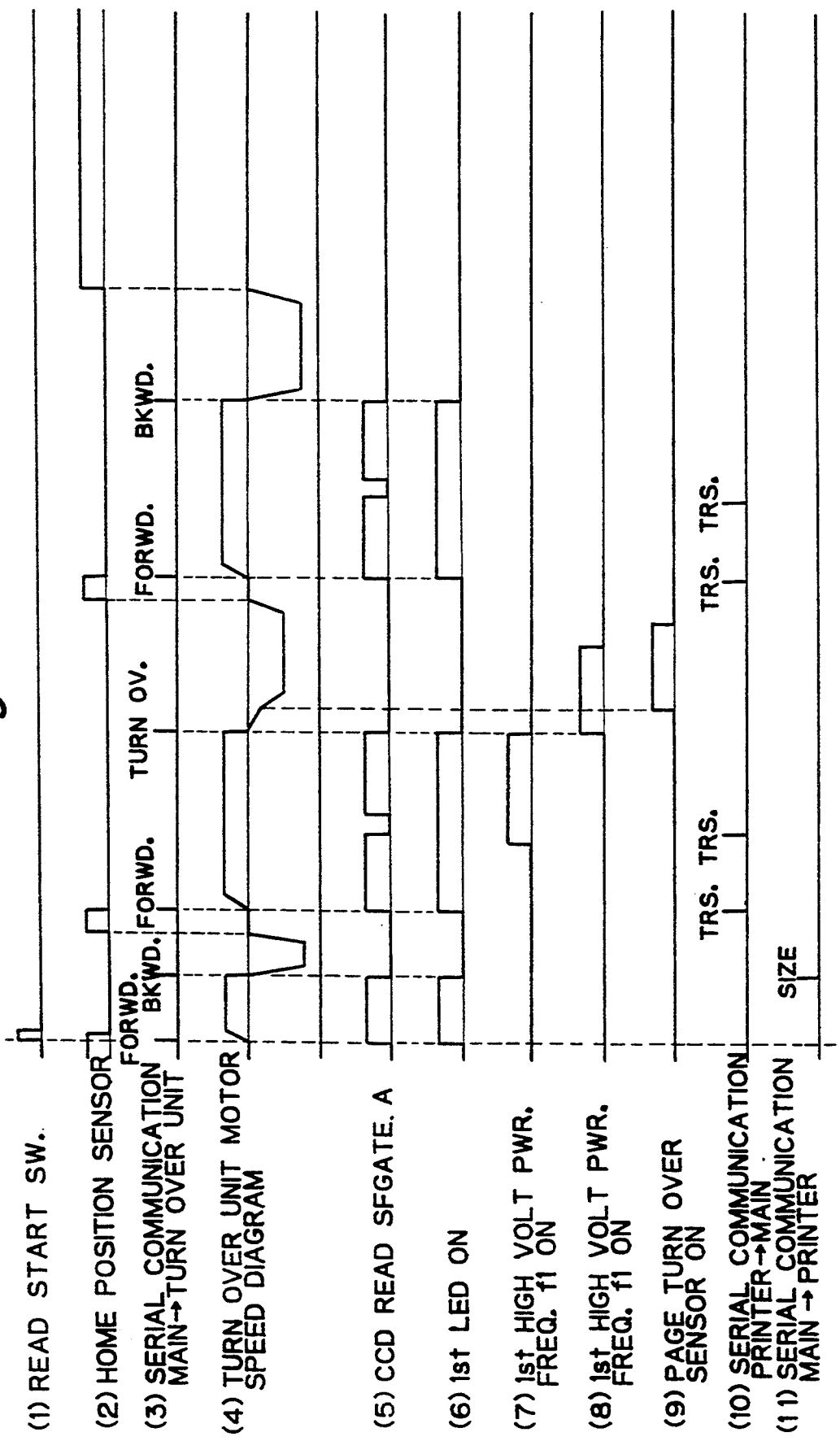
FIG. 40 is a time chart of the function of the MFDS operated in the single page reading mode for reading one of spread two pages in the book-original reading mode.

FIG. 40 illustrates the timing chart wherein the reading operation starts from the left page of the book 92 facing thereto.

The function of this mode is substantially the same as that of the above mentioned double-side print mode of the spread two pages continuously reading mode except that the data transfer requirement signal is transmitted for every one page from the printer 300 to the main board 310 so that the unit 1 scans the book from the left page to the right page at a same speed.

Figure 41:
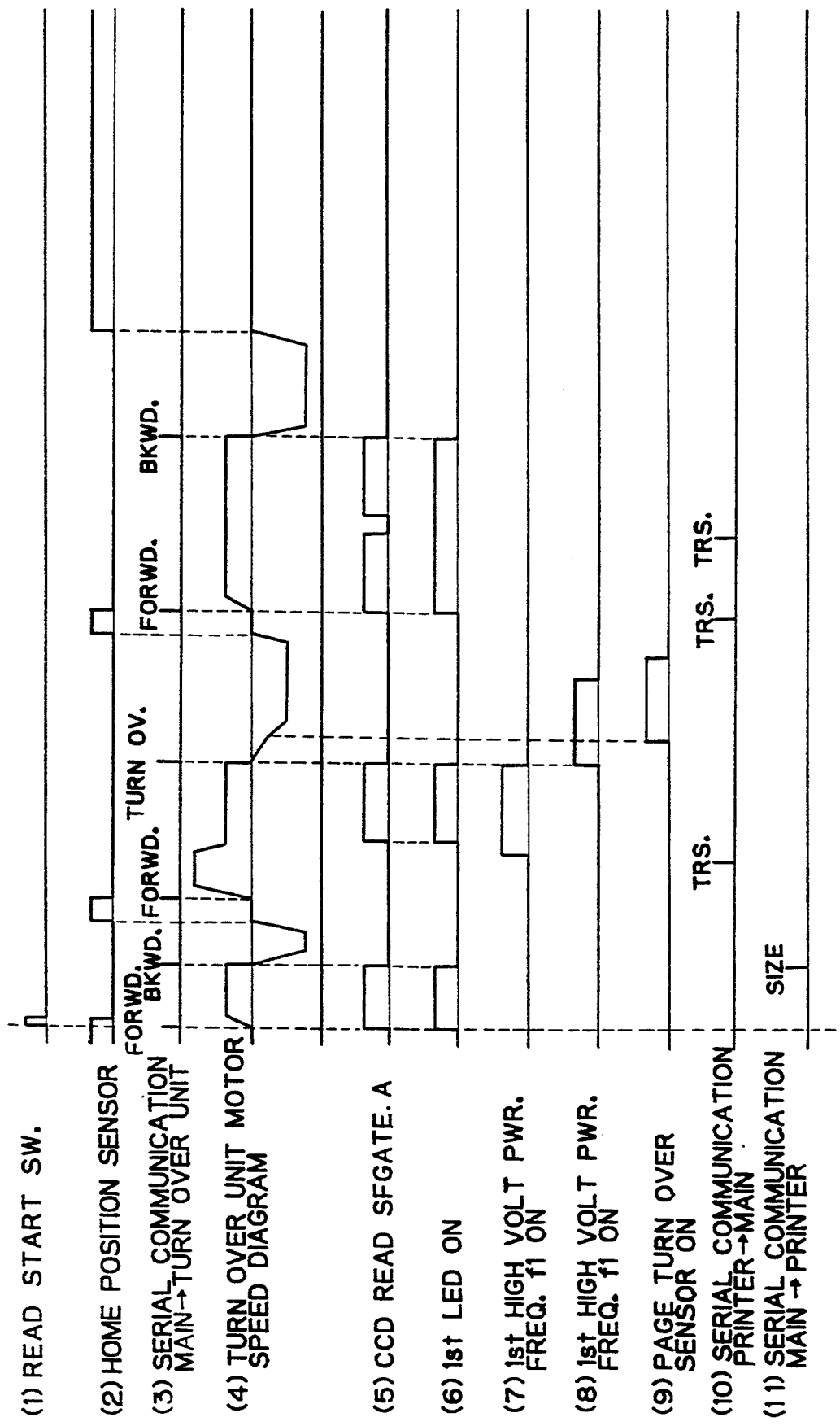
FIG. 41 is a time chart of the function of the MFDS operated in the single page reading mode for reading one of the spread two pages arranged so that the original book is read from the right-side page.

FIG. 41 illustrates a timing chart wherein the functional mode is set so that the book is read from the right page thereof in the spread single page reading mode.

As can be seen from this timing chart, in the case where the book is read from the right page, the functional program is arranged in such a way that the speed of the movement of the unit 1 for the left page not to be read is faster than the scanning speed Vf for the right page to be read so that the time for reading original is shortened and the functional ability for reading pages is heightened.

Also, in the above mentioned mode, in the case where the page to be skipped without being read is set by the key 618, the functional program is arranged in such a way that the unit 1 moves over the page to be skipped at a speed faster than the scanning speed Vf of the unit 9 at the time of reading pages and that the skipped page is immediately turned over. This motion is not illustrated in the timing chart.

In general, few printers can transmit the data transfer requirement signals in series in a normal state to the board 310 as illustrated in FIGS. 40 and 41.

Therefore, when the normal general printer is to be used for the operation of the spread single page reading mode, the operation can be achieved by feeding two papers superposed together on the side of the printer.

Also, if the two papers have to be fed with a certain space formed between the papers from the stand point of resist force between the paper and the photoconductor drum, the image data of the left page of the book 92 is transmitted to the printer directly while the image data of the right page is transmitted to the printer through a delay memory to delay the timing for transmitting the image data to the printer corresponding to the distance between the papers.

Figure 42:
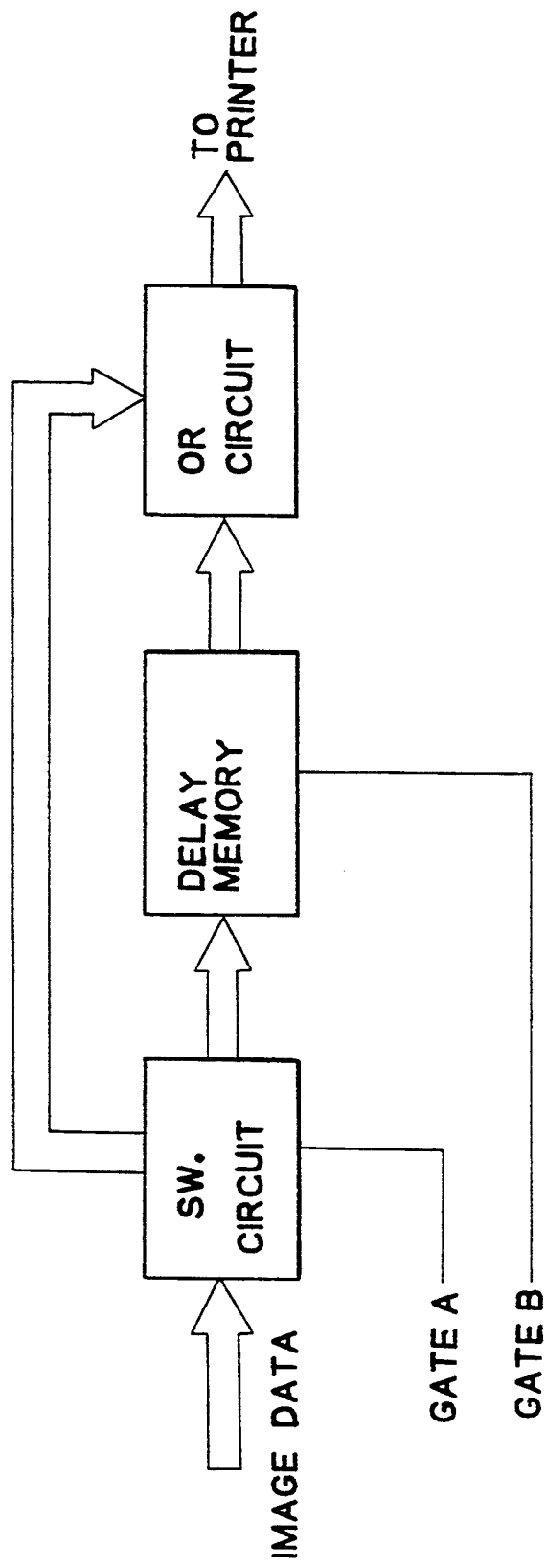
FIG. 42 is a block diagram of the delay circuit for delaying the timing for transferring the data read by the MFDS in the single page reading mode.
Figure 43:
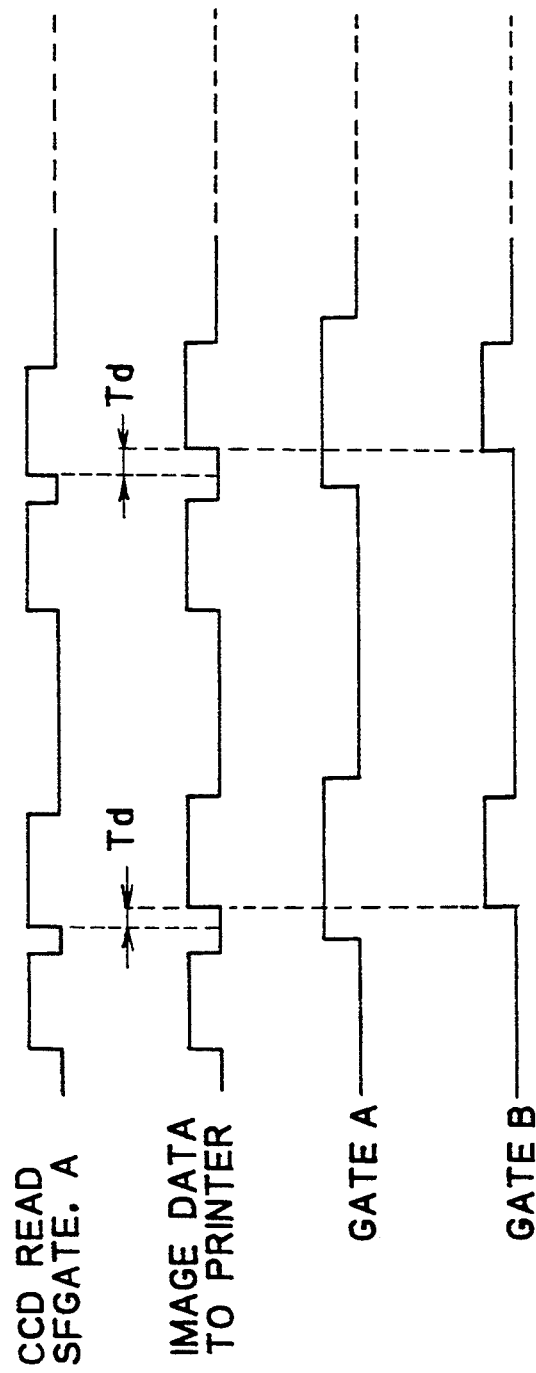
FIG. 43 is a timing chart of the data transfer function for transferring the data read in the single page reading mode.

An example for realizing such an operation is illustrated in FIG. 42 and the timing chart thereof is illustrated in FIG. 43.

In this example, the image data to be transmitted to the printer through the switching circuit is delayed by the time Td through the delay memory by the function of each gate A, B arranged in the board 310.

Next, the double-side print mode for the spread single page reading mode is described below.

First, the mode is described in the case wherein the image data of spread right and left two pages are to be printed in both sides of one print paper.

In this case, it is necessary to reverse the conveying direction in the side of the printer. Therefore, it takes some time after the left page data is printed until starting to print the right page data. Therefore, in this mode, when the unit 1 ends the reading operation for the left page of the book and comes to the binding portion of the book, the drive of the unit 1 is temporarily stopped.

After that, when the left page data is printed and the print paper is conveyed backward in the printer 300, and when the data transfer requirement signal is output from the printer to the main board 310, the unit 1 is driven again at the predetermined scanning speed Vf to read the right page information and transmit the information data to the printer so that the image of the right page is printed in the rear side of the print paper in the front side of which is printed the image of the left page, whereby the double-side print mode operation is performed.

Figure 44:
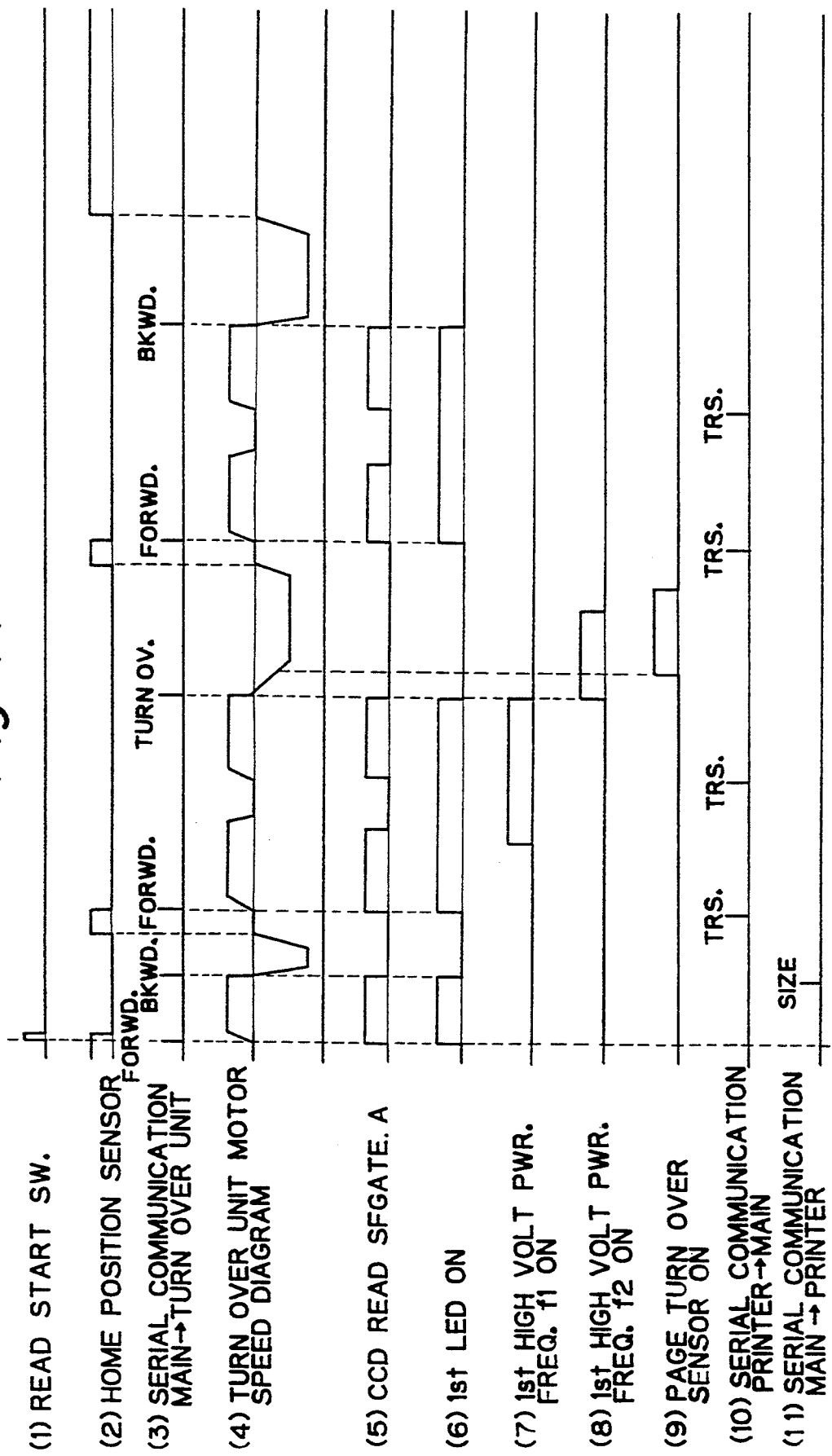
FIG. 44 is a timing chart of the function of the MFDS operated in the double sides reading mode for reading both sides of spread two pages in the single page reading mode.

The timing chart of the operation mentioned above is illustrated in FIG. 44.

Next, in the above mentioned spread single page reading mode, the both-side print mode is described wherein images of the front and rear sides of the print paper are printed in the same arrangement as the front and rear sides of the page of the book-original.

In this mode, in the case wherein the reading operation is to be started from the left page of the book, as mentioned above, a command is transmitted to the printer 300 to feed two papers sequentially so that the paper on which the left page image is printed is discharged directly while the paper on which the right page image is printed is conveyed backward to print the next left page image on the rear side of the reversed paper.

During this time, in the MFDS side, the read page of the book-original is turned over.

When the page turning over operation in the MFDS is ended, the reading operation for the next page is performed so that the image of the read left page is printed on the rear side of the paper on which the preceding right page image is printed in the front side thereof and which is conveyed back after that the paper is discharged.

Also, the image of the right page read in this subsequent operation is printed on the new paper.

The newly fed paper is also conveyed backward as the preceding print paper so that the left page image of the next spread pages of the book 92 is printed on the rear side of the reversed new paper.

By repeating the above mentioned sequence of print mode, the images of the book-original are printed on the front and rear sides of each print paper in the same arrangement as the original.

The function of the book-original reading mode is as mentioned above.

Next, the original setting operation for the spread pages reading mode is described below.

In the step of checking the connected devices of FIG. 34, if the printer 300 is able to discharge the print paper with the rear side thereof being arranged upward, the following messages are displayed. That is, "If the book is written in horizontal lines (opened leftward), spread leading pages to be read and set the book with opened leading spread pages being upward" and "If the book is written in vertical lines (opened rightward), spread leading pages to be read and set the book with opened spread pages upside down".

On the other hand, if the printer 300 is only able to discharge the paper with the front side thereof being arranged upward, the following messages are displayed. That is, "If the book is written in horizontal lines (opened leftward), spread last pages to be read and set the book with the opened last spread pages being upside down" and "If the book is written in vertical lines (opened rightward), spread last pages to be read and set the book with the opened last pages being upside down".

In accordance with the above mentioned direction to set the book-original, the pages of the print papers can be desirably arranged irrespective of the functional ability of the printer 300.

The number of pages to be turned over in the MFDS can be input by keys on the board 313. There are two selective ways to input the page number from the keys on the board 313.

One is to set the total number of pages to be read with the use of key 606 and the other is to set the leading page and the last page to be read with the use of the keys 604 and 605. Either way may be selected, as long as it becomes possible to accurately calculate the number of times for turning over pages by the unit 1.

A method for calculating the number of times for turning over pages is described hereinafter.

First, the method in the case where the total page number is input is described.

Assuming that the total number of pages to be read is represented by X and the number of times for turning over the pages is represented by M, the following equations are satisfied, that is, in the case where the book is read from the left page, $$(X-2)/2 = M + surplus \quad (1)$$

while in the case where the book is read from the right page, $$(X-1)/2 = M + surplus \quad (2).$$

By calculating the number of M from the equation, it becomes possible to obtain the number of times for turning over the pages.

Next, the method in the case where the leading and last pages are input is described.

Assuming that the leading page number to be read is represented by Y and the last page number to be read is represented by Z, and the total number of pages to be read is represented by X, the following equation is satisfied, that is, $$X = Z - Y + 1 \quad (3).$$

By substituting the equation (3) to the above mentioned equation (1) or (2), the number M of the times for turning over pages can be calculated.

In accordance with the MFDS of the present invention, original image can be read and formed on the print paper selectively discriminating the book-original and the sheet-original by one apparatus, as mentioned before.

The function of image reading mode for the book-original is as mentioned above. The function of image reading mode for the sheet-original is described hereinafter.

The sheet-original reading mode comprises, as mentioned before with reference to FIG. 36, a sheet-original through mode, a sheet-original scan mode and a sheet-original manual open/close mode.

First, the sheet-original through mode is described below.

In this mode, there are two sub-modes, that is, a single side original reading mode and a double-side original reading mode. Also, the double-side original reading mode comprises a same position reading mode and a different position reading mode.

Figure 45:
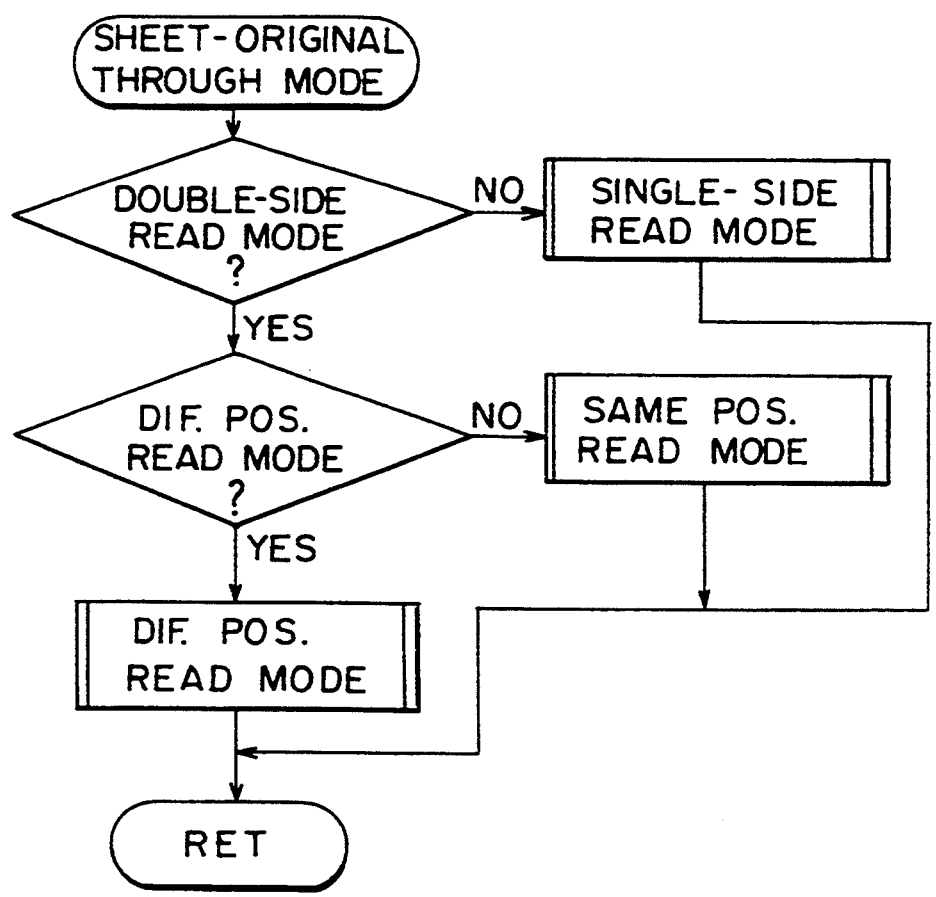
FIG. 45 is a flow chart of the function of for changing the sheet-original through mode in the sheet-original reading mode.

The modes are selected as illustrated in FIG. 45.

Figure 46:
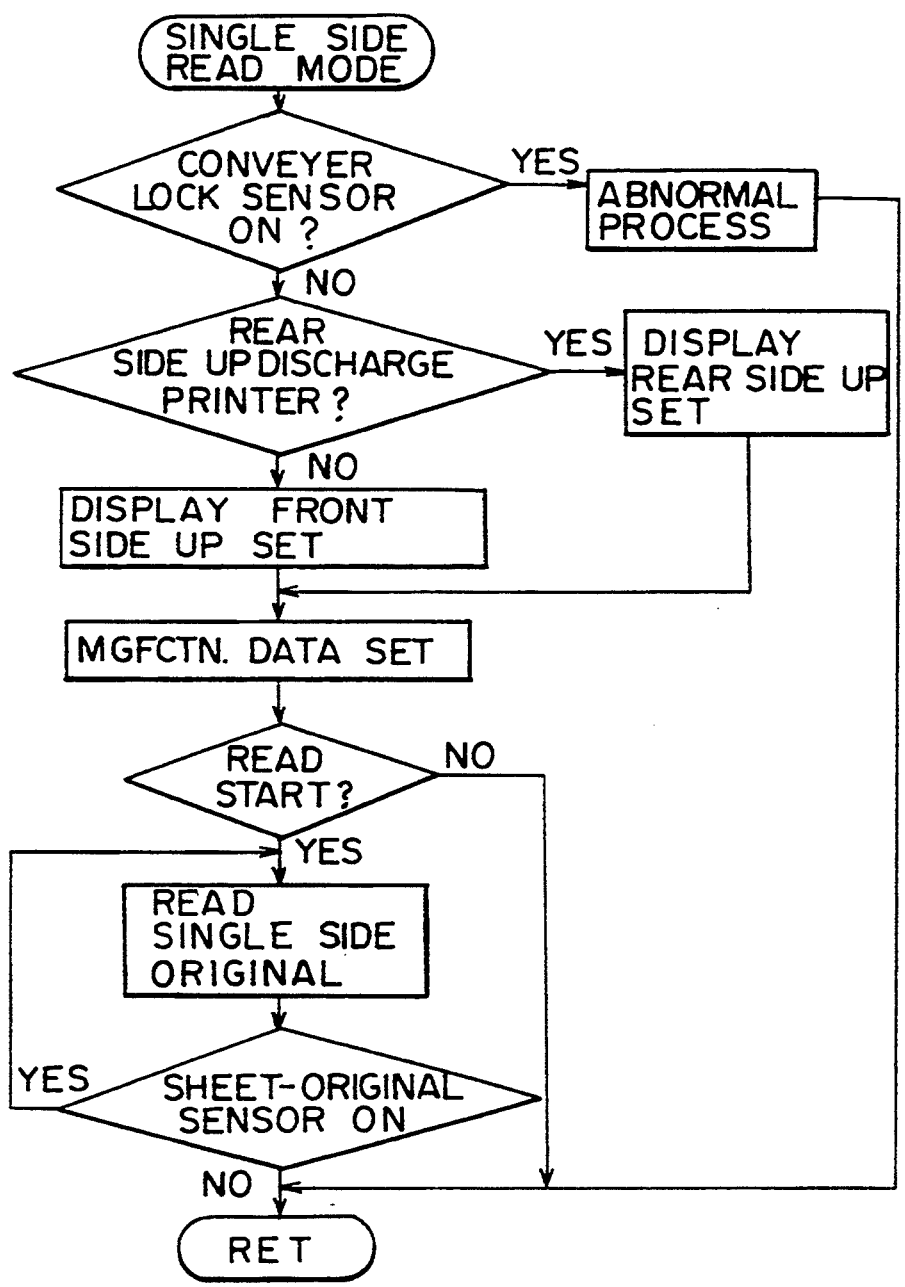
FIG. 46 is a flow chart of the function of the single side reading mode in the sheet-original through mode.
Figure 47:
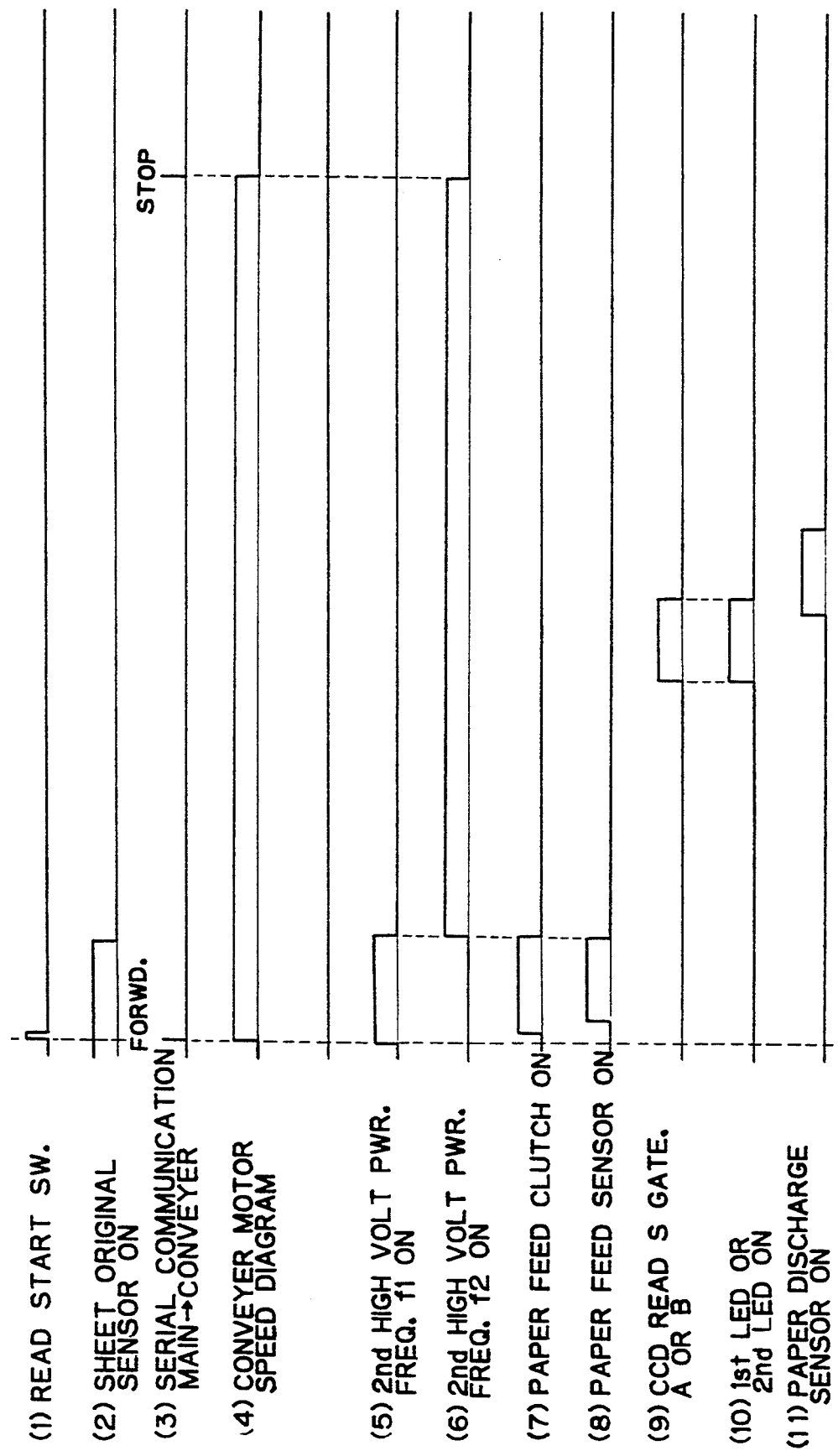
FIG. 47 is a timing chart of the function of the single side reading mode.

First, in the single side original reading mode, as illustrated in FIGS. 46 and 47, sheet-originals 200 are stacked and set on the tray 94. In this state, the start key 600 is pressed so that the motor 61 is turned on and the roller 12 is rotated to move the belt 8.

In this operation, if there are no abnormal state detected from each sensor and input data, the paper feed clutch 128 is turned on to rotate the roller 96 through the pulley 130 attached to the roller 97 and the belt 127 so that sheets 200 are conveyed toward the paper separation pad 95.

By the function of the pad 95, a lowermost sheet of original 200 is separated from the other sheets and guided by the guide members 108 and 109 to the position coming in contact with the belt 8.

A paper feed sensor 26 is attached to the guide 109 so that the control timing for conveying the sheet-original 200 is arranged in such a way that when the sensor 26 detects the rear end of the paper 200, the clutch is turned on.

Meanwhile, along with driving the belt 8, an AC high voltage is applied to the roller 11 from the AC power source 35 to form a stripe pattern of electric charge on the belt 8. Thereby, the sheet 200 is electrostatically attracted and attached to the belt 8 and conveyed by the belt 8.

The speed of the belt 8 is set as 360 mm/s at the time of equimultiple print mode operation while it is variable according to the magnification of the print.

On the other hand, in this mode, the unit 1 is positioned at the end position 1C, so that the original information of the sheets 200 conveyed by the belt 8 are read in series by the unit 9 with the pixel density of 400 dpi.

After that, the read sheet 200 is held and conveyed by the guide 110 and the rollers 103 to 106 and discharged onto the tray 23 through the outlet 117.

On the guide member 110 in the vicinity of the outlet 117 is attached a paper discharge sensor 28 to detect jam state of the paper.

When the first sheet 200 is read, the clutch 128 is turned on again at a predetermined timing so as to feed the second sheet of original 200 which is to be read in the same way as mentioned above.

As mentioned above, the sheets 200 of original set on the tray 94 are fed in sequence and read in turn. When the last (uppermost) sheet 200 is fed and the sensor 25 is turned off, the power source for the roller 11 is changed to a high frequency AC voltage to erase the electric charge pattern formed on the belt 8. When the last sheet 200 is discharged, all of the functions of the MFDS are stopped.

The above mentioned operation is performed in the case where the MFDS is connected to a printer which is able to discharge the print paper with the rear side being upward, thereby the sheets 200 and the print papers are discharged in a predetermined desired arrangement.

On the other hand, if the printer is only able to discharge the print paper with the front side being upward, the sheets 200 are set on the tray 94 with the original side being upward so that the original is read by the unit 14, whereby as in the case of the printer which is able to discharge papers with the front side being upward, the sheets 200 and the print papers are discharged in a predetermined desired arrangement. The other functions of the apparatus connected with the printer which is only able to discharge the paper with the front side being upward is the same as those of the above mentioned apparatus connected with the printer which is able to discharge the paper with the rear side being upward.

Next, the both-side original reading mode for the sheet-original through mode is described hereinafter.

In this mode, sheet-originals written in horizontal lines are set on the tray 94 with the leading end of the original being downward. This is because since the units 9 and 14 both do not comprise a memory means, it is only possible to use the means for reversing the mirror in the direction of main scan.

Figure 48:
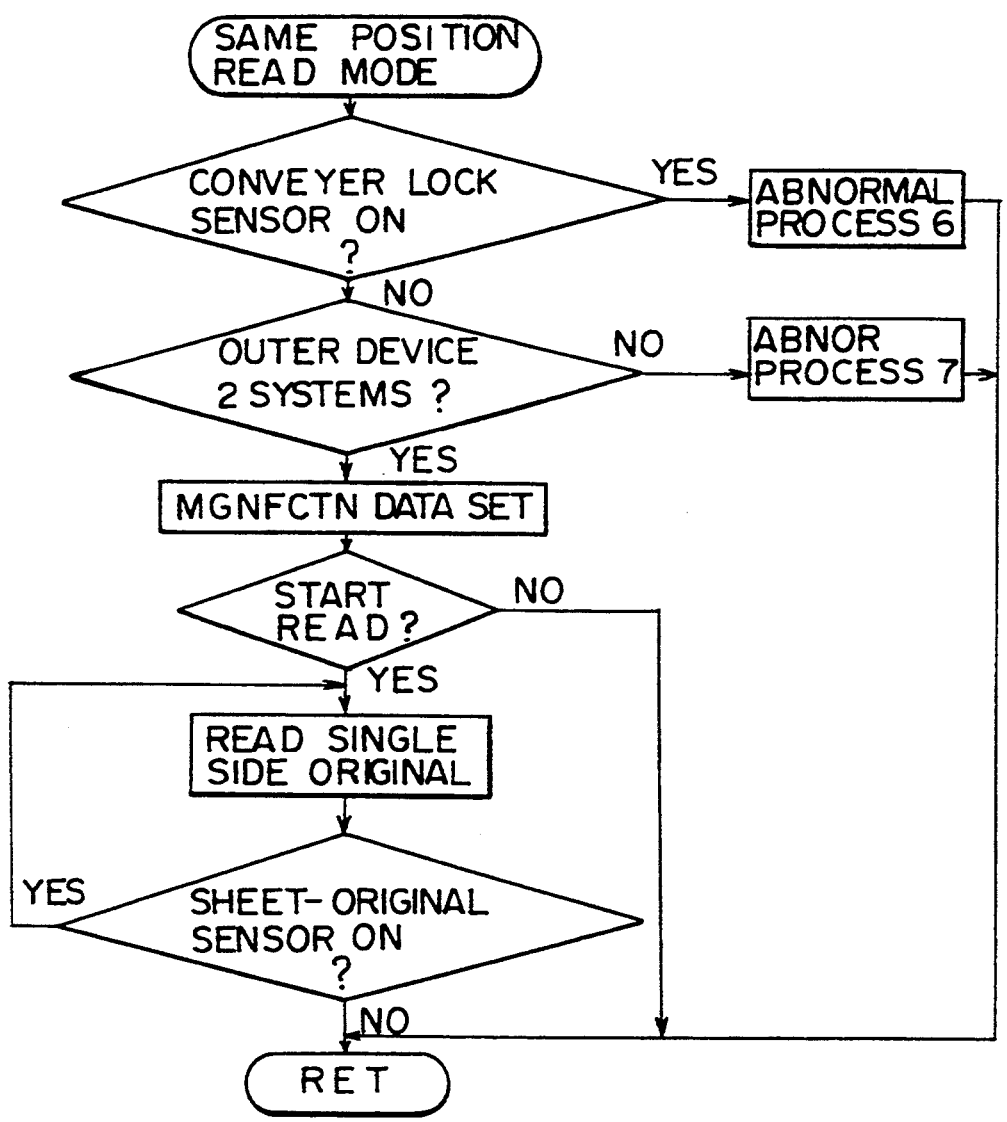
FIG. 48 is a flow chart of the function of the same position reading mode in the sheet-original through mode.
Figure 49:
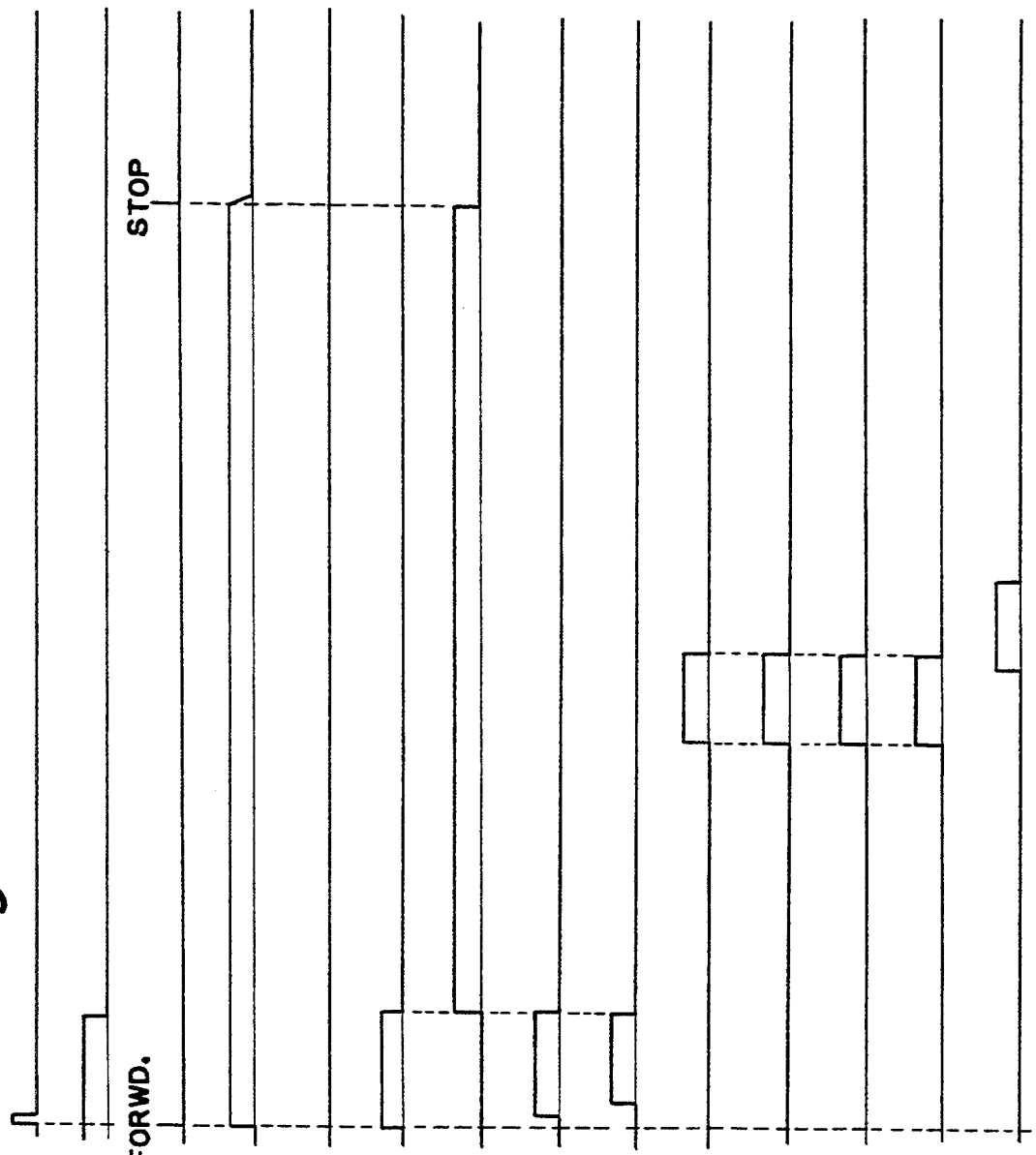
FIG. 49 is a timing chart of the function of the same position reading mode.

First, the essential function of the same position reading mode operation in the both-side original reading mode is described referring to FIGS. 48 and 49. The function is substantially the same as that of the single side reading mode operation. However, in this mode, the unit 1 is positioned at the home position 1A and along with the unit 14 disposed in the plate 18 side, the units 9 and 14 read the image of the upper and lower sides of the sheet-original 200 simultaneously at the same position.

Figure 50:
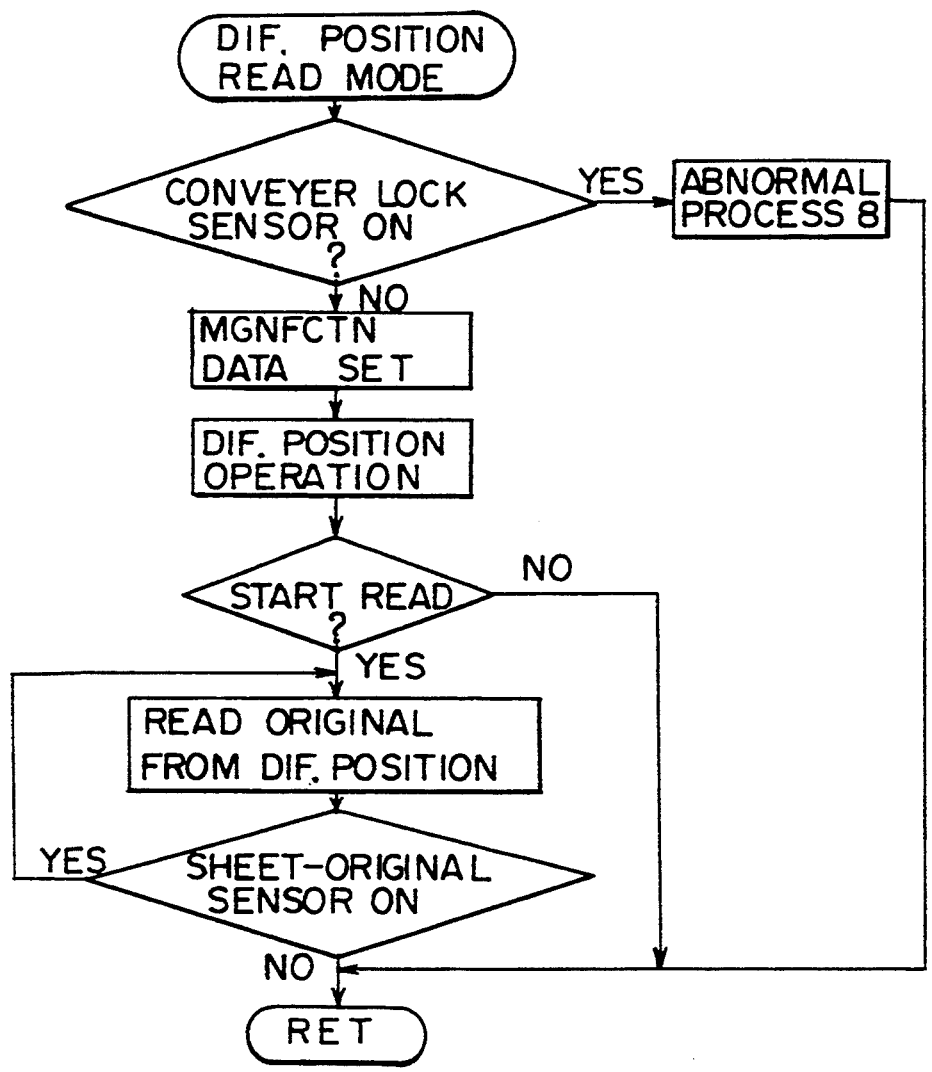
FIG. 50 is a flow chart of the function of the different position reading mode in the sheet-original through mode.
Figure 51:
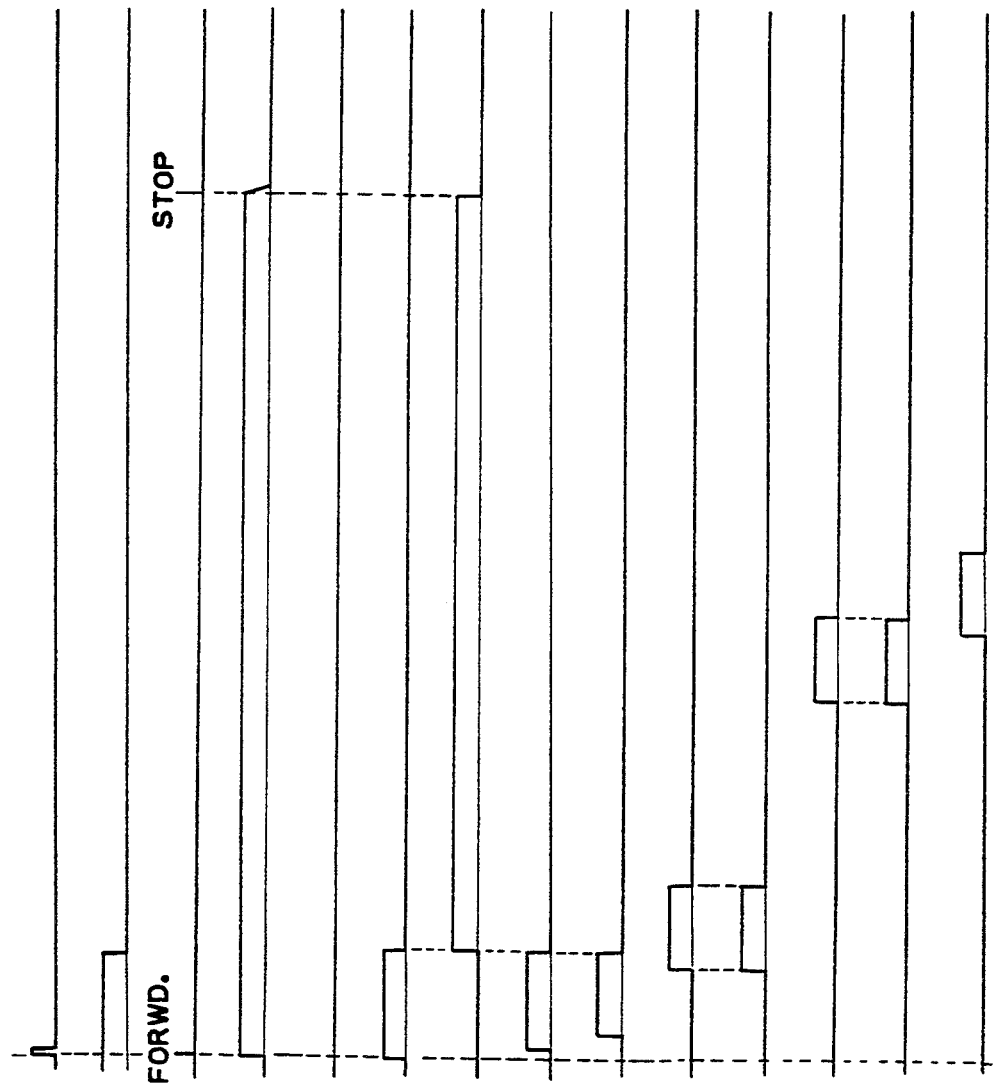
FIG. 51 is a timing chart of the function of the different position reading mode.

On the other hand, the essential function of the different position reading mode operation for the both-side original reading mode is substantially the same as that of the single side reading mode, as illustrated in FIGS. 50 and 51. However, in this mode, the unit 1 is positioned at the end position 1C.

It is clear that in the different position reading mode, the distance between the reading positions of the units 9 and 14 is larger than the length of the largest original as a result of which the original information of both sides of the sheet 200 read by the units 9 and 14 are output in time series.

Next, the sheet scan mode operation in the sheet-original reading mode is described below.

Figure 52:
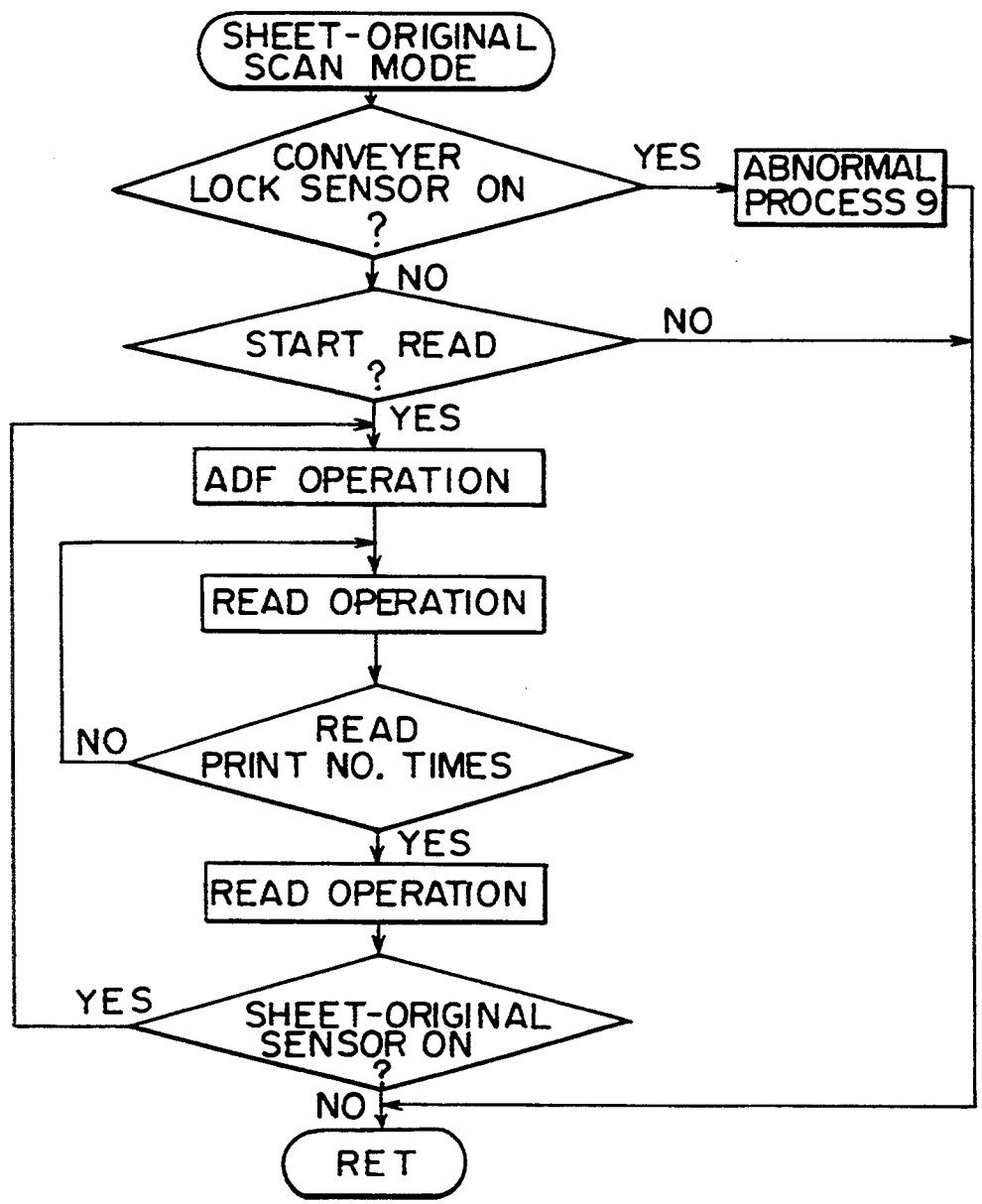
FIG. 52 is a flow chart of the function of the sheet-original scan mode in the sheet-original reading mode.
Figure 53:
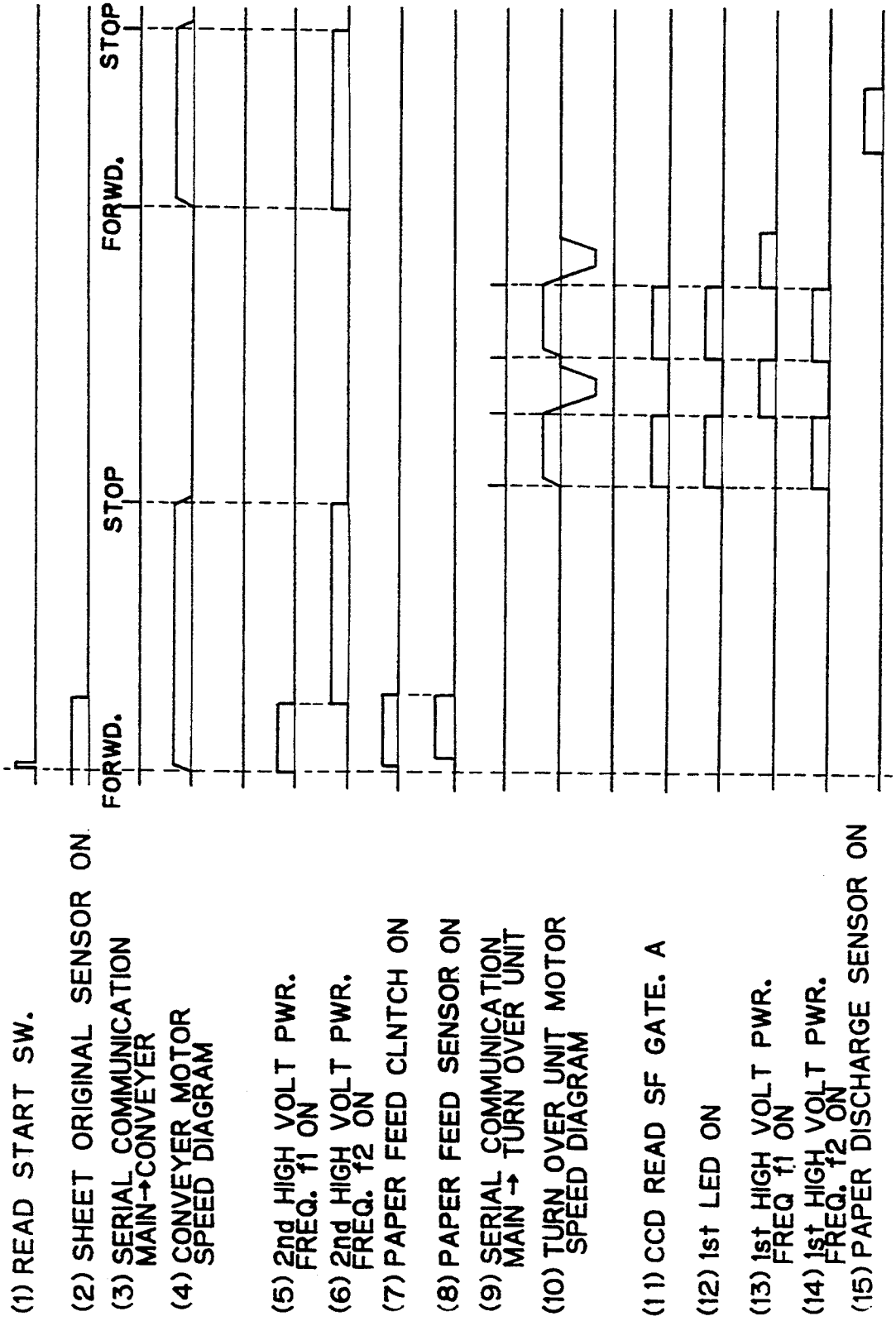
FIG. 53 is a timing chart of the function of the sheet-original scan mode.

In this mode, the sheet-originals 200 are upwardly set on the tray 94, as illustrated in FIGS. 52 and 53. In this state, the key 600 is pressed so that the motor 61 is turned on first and the roller 12 is rotated to move the belt 8.

In this operation, if there are no abnormal state detected from the sensors and the input data, the clutch 128 is turned on so as to rotate the roller 96 through the pulley 130 attached to the roller 97 and the belt 127 so that the sheet-original 200 is conveyed toward the pad 95.

By the function of the pad 95, the lowermost one sheet of original 200 is separated from the other sheets and guided by the guide members 108 and 109 and conveyed to the position where the sheet comes in contact with the belt 8.

A paper feed sensor 26 is attached to the guid 109. The functional timing is arranged in such a way that when the sensor 26 detects the rear end of the sheet 200, the clutch 128 is turned off.

Meanwhile, along with the circular motion of the belt 8, an AC high voltage is applied to the roller 11 from the AC power source 35 to form a stripe pattern of electric charge on the belt 8, whereby the sheet 200 is electrostatically attracted and attached to the belt 8 and conveyed by the belt 8.

In this operation, the speed of the belt 8 is set as 360 mm/s. When the leading end of the sheet 200 comes to the home position 1A, the motion of the belt 8 is stopped.

On the other hand, in this mode, the unit 1 is positioned at the home position 1A. When the belt 8 is stopped, the unit 1 is moved toward the end position 1C by the motor 60. During this motion, the original information of the sheets 200 conveyed in series are read sequentially by the unit 9 with the pixel density of 400 dpi.

At the time of this operation for reading the information from the original sheets, a high frequency AC voltage is applied to the roller 3 from the power source 320 to erase the electric charge pattern formed on the belt 8. Thereby, it becomes possible to prevent the sheet 200 from entering into the unit 1 at the time of returning motion of the unit 1.

When the sheet-original 200 is read, the unit 1 is moved back toward the home position 1A.

Also, in the returning motion of the unit 1, the unit 9 is evacuated upward from the original surface of the sheet 200 and an AC high voltage is applied to the roller 3 from the power source 320 to form a stripe pattern of electric charge on the belt 8 so that the sheet 200 is electrically attracted and secured to the belt 8.

The above mentioned operation is repeated for a predetermined times. After that, the motor 61 is turned on to drive the belt 8 so that the read sheet-original 200 is discharged onto the tray 23 through the outlet 117.

A paper discharge sensor 28 is attached to the guide 110 in the vicinity of the outlet 117 to detect the jam state of the sheet 200.

When the reading operation for the first sheet-original 200 is ended, the clutch 128 is again turned on at a predetermined timing so as to feed the subsequent sheet-original 200 which is read in the same way as the preceding sheet as mentioned above.

As mentioned above, the sheets 200 set on the tray 94 are fed and read sequentially until the last (uppermost) sheet is fed when the sensor 25 is turned off. Then, the power source for the roller 11 is changed to the high frequency AC voltage to erase the electric charge pattern on the belt 8. When the last sheet 200 is discharged, all of the function of the MFDS are stopped.

Next, the sheet-original manual open/close mode for the sheet-original through mode is described below.

Figure 54:
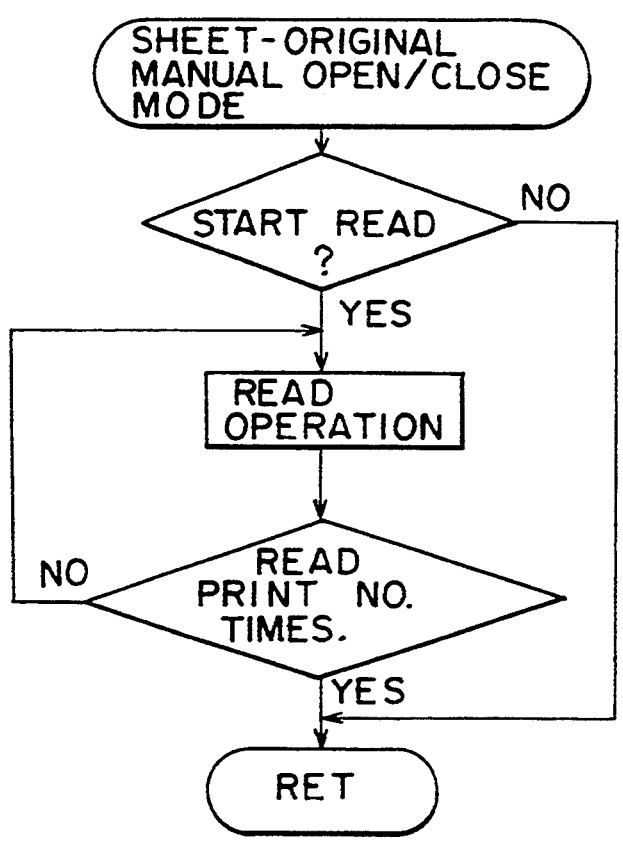
FIG. 54 is a flow chart of the function of the sheet-original manual open/close mode in the sheet-original reading mode.
Figure 55:
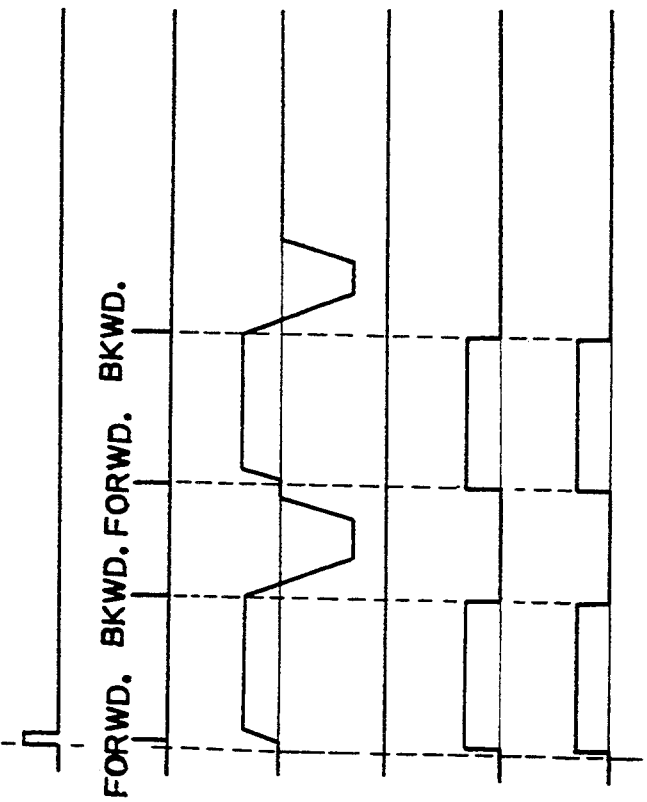
FIG. 55 is a timing chart of the sheet-original manual open/close mode.

In this mode of operation, as illustrated in FIGS. 54 and 55, the operator changes the sheet-originals by hand, in a state where the sheet conveying means in the above mentioned function of the sheet-original scanning mode and the power source for attracting the sheet are being turned off.

The operation control for the unit 1 of the MFDS is described below.

Figure 56:
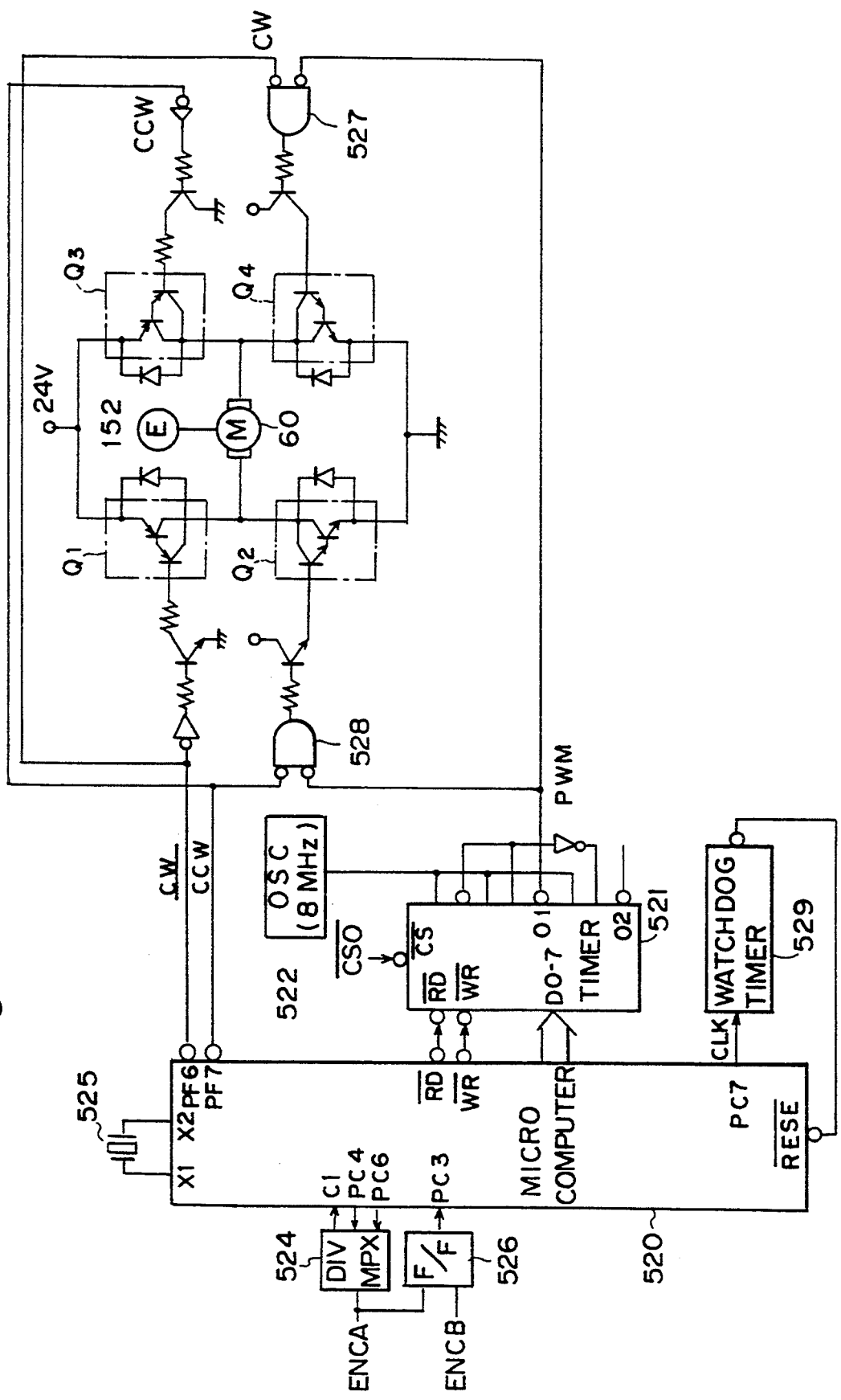
FIG. 56 is a circuit diagram of the scan control circuit of the page turning over and reading unit of the present invention.

FIG. 56 illustrates an operation control circuit diagram of the unit 1 for the MFDS. The circuit is installed in the board 312 and controls the back and forth motion of the unit 1 and the speed of the motion.

In FIG. 56, a micro-computer 520 is arranged to control the mode of the MFDS and the operational sequence thereof. To the computer 520 is connected, for instance, a programmable interval timer 521 of μPD71054G. The timer 521 outputs a pulse width modulation signal PWM for controlling the speed of the DC motor 60 in accordance with the control function of the computer 520.

The period of the PWM control signal is 50 μsec and controlled with 400 bit resolution. To the timer 521 is connected a oscillator 522 of 8 MHz to generate a clock signal.

Also, the motor 60 is connected to the computer 520 through drive transistors Q1 to Q4. In the state where the transistors Q1 and Q4 are being turned on while the transistors Q2 and Q3 are being turned off, the motor 60 is supplied with a current which drives the motor in the clockwise direction. Whereas, in the state where the transistors Q2 and Q3 are being turned on while the transistors Q1 and Q4 are being turned off, the motor 60 is supplied with a current which drives the motor in the counterclockwise direction.

When the motor 60 is rotated in the clockwise direction, the unit 1 is moved forward, while the motor 60 is rotated in the counterclockwise direction, the unit 1 is moved backward. The rotational direction of the motor 60 is controlled by the CW signal and the CCW signal output from ports PF6 and PF7 of the computer 520, respectively.

Also, to the roller 2 is directly connected the encoder 152 which generates pulses in accordance with the rotation of the roller 2. The encoder 152 generates two kinds of pulse signals having different phases from each other in accordance with the revolution number and the revolutional direction of the motor 60. That is, one is an A-phase encoder pulse ENCA and the other is a B-phase encoder pulse ENCB.

The A-phase pulse ENCA is input to a counter input terminal C1 of the computer 520 through a frequency dividing multiplexer 524. By this arrangement, the pulse interval of the A-phase pulse can be measured by the counter installed in the computer 520 and regulated by the oscillating frequency of 10 MHz of the oscillator 525 of the computer 520.

Also, the input signal to the terminal C1 is an interruption input signal so that in the process of the interruption program, the measurement data of the A-phase pulse interval is read and on the basis of this data, various operations are executed such that the revolution number of the motor 60 is calculated, that the motor control amount by the proportional integration is calculated and that the calculation results are output, for example, the data is loaded to the timer 521.

More precisely, the output of the pulse signal ENCA is divided to 1, 2, 4 or 8 by the multiplexer 524 in response to the desired speed so that the interruption input is transmitted to the counter input terminal C1.

In the case of one frequency division, the unit 9 is shifted for 0.116 mm by one pulse from the encoder 152 by which the speed is calculated in the computer 520 according to the interruption interval. Further, on the basis of the calculated data of speed, the timer number is calculated by the proportional integration process.

Also, the pulse signals ENCA and ENCB are input to an input terminal PC3 of the microcomputer 520 through a flip-flop circuit 526 so that the phase difference between the signals is detected to determine the rotational derection of the motor 60. That is, the state of the B-phase pulse is input to the port of the microcomputer 520 at the time when the A-phase pulse signal rises, whereby the rotational direction of the motor 60 is discriminated.

Next, the speed control for the motor 60 is described below. The motor 60 is controlled by the PWM control process.

First, when the unit 1 is scanning the original, that is, the motor 60 is rotated in the clockwise direction, the transistor Q1 is turned on as well as the transistor Q4 is turned on/off repeatedly through the gate 527 by the PWM output from the timer 521 to generate a potential difference between the both terminals of the motor 60 so that the motor 60 is rotated at a speed corresponding to the duty ratio of the PWM signal.

On the other hand, when the unit 1 is being returned, to the contrary to the motion mentioned above, the transistor Q3 is turned on as well as the transistor Q2 is turned on/off repeatedly through the gate 528 by the PWM output signal from the timer 521 to generate a reversed potential difference between the both terminals of the motor 60 so as to rotate the motor 60 at the speed corresponding to the duty ratio of the PWM signal.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for turning over a page of a book-type original which is set with spread pages being arranged upward, said apparatus comprising:
    a belt arranged for turning over said page;
    an electrode held in contact with a surface of said belt for forming an electric charge pattern on the surface of said belt and generating uneven electric fields on the surface of said belt;
    a voltage applying means for applying a voltage to said electrode in order to form the electric charge pattern;
    a belt deforming means for deforming a part of said belt upward at a portion of said belt; and
    a moving means for moving said belt deforming means continuously along a surface of said page so that an uppermost page of said original contacting with said belt is attracted by the uneven electric fields generated on the surface of said belt and is separated from a next page of said original.

2. An apparatus according to claim 1, wherein the apparatus further comprises means for erasing said uneven electric fields applied on said belt.

3. An apparatus according to claim 2, wherein the apparatus further comprises a bias member which is arranged in contact with said belt and commonly constitutes said electrode and said erasing means as well.

4. An apparatus for turning over a page of a book-type original which is set with spread pages being arranged upward, said apparatus comprising:
    an original pressing means for pressing an original surface downwardly;
    an attracting and separating means for contacting with at least one portion of the spread pages and attracting and separating the spread pages;
    a holding means for the attracted and separated original; and
    a page housing means for housing the separated pages, said page housing means is adapted that a housing speed of the page is no less than a separation speed of the page.

5. An apparatus for turning over a page of a book-type original which is set with spread pages being arranged upward, said apparatus comprising:
- an original pressing means for pressing an original surface downwardly;
- an attracting and separating means, including a belt, for contacting with at least one portion of the spread pages and attracting and separating the spread pages;
- a means for holding the attracted and separated original;
- means for detecting a tension of the belt; and
- means for identifying originals for which is not possible to turn over the pages on the basis of the tension of the belt detected by said detecting means.

6. An apparatus for turning over a page of a book-type original which is set with spread pages being arranged upwards, said apparatus comprising:
- means for turning over a page including:
  - a belt contacting with a surface of said spread pages of the original in the face of said spread pages, an electrode held in contact with a surface of said belt for forming an electric charge pattern on the surface of said belt and generating uneven electric fields on the surface of said belt,
- a voltage applying means for applying a voltage to said electrode in order to form the electric charge pattern,
- a belt moving means for moving the surface of said belt from one end of the spread pages to the other end thereof continuously in a direction of separating said surface from said book-type original while attracting said one of pages on said surface of the belt so that an uppermost page of said original contacting with said belt is attracted by the uneven electric fields generated on the surface of said belt and is separated from a next page of said original,
- a page stripping means for stripping continuously said attracted page separated from a next page of said original from said belt, and
- a supporting means for supporting said page stripped from said belt; and
- moving means for moving said means for turning over a page along a surface of said spread pages from one end of said original to the other end thereof.

7. An apparatus according to claim 6, wherein the apparatus further comprises means for erasing uneven electric fields applied on said belt.

8. An apparatus according to claim 6, wherein the apparatus further comprises means for switching over a voltage supplied to a member both in applying uneven electric fields to said belt and in erasing said uneven electric fields applied on said belt, said member constituting said uneven electric fields applying means and said erasing means.

9. An apparatus for turning over a page of a book-type original which is set with spread pages being arranged upwards, said apparatus comprising:
- an original placing base for placing the original set with spread pages;
- page contacting means for contacting with a surface of an uppermost page of the spread pages;
- an electrode contacting with a surface of said page contacting means and forming an electric charge pattern on the surface of said page contacting means for generating uneven electric fields on the surface of said page contacting means;
- a voltage source for applying a voltage to said electrode to form the electric charge patten; and
- a moving means for moving a contact face of said page contacting means contacting with the surface of the uppermost page of the spread pages from one end of the spread pages to the other end thereof, thereby to turn over the uppermost page of the spread pages attracted to said contact face of said page contacting means by said uneven electric fields generated on the surface of said page contacting means.

10. An apparatus according to claim 9, wherein said electrode is a roller shaped electrode.

11. An apparatus according to claim 9, wherein said electrode is a plate shaped electrode.

12. An apparatus according to claim 9, wherein said electric charge pattern is an electric charge pattern of stripe shape.

13. An apparatus according to claim 9, wherein said electric charge pattern is an electric charge pattern of checked shape.

14. An apparatus according to claim 9, further comprising:
- a removing means for removing the turned-over page from said page contacting means.

15. An apparatus according to claim 9, further comprising:
- a guiding means for guiding a page, to be turned-over, in a direction apart from a surface of a next page of said original.

16. An apparatus according to claim 9, further comprising:
- a guiding means for guiding a page, to be turned-over, in a direction apart from a surface of a next page of said original; and
- a removing means for removing the turned-over page from said page contacting means.

17. An apparatus according to claim 9, further comprising:
- a guiding means for guiding a page, to be turned-over, in a direction apart from a surface of a next page of said original;
- wherein at least said page contacting means, said electrode and said guiding means are integrated as a page turning-over unit.

18. An apparatus according to claim 9, further comprising:
- a guiding means for guiding a page, to be turned-over, in a direction apart from a surface of a next page of said original;
- at least said page contacting means, said electrode and said guiding means being integrated as a page turning-over unit, and
- said moving means moving said page turning-over unit from one end of the spread pages to the other end thereof.

19. An apparatus according to claim 9, further comprising:
- original depressing means for depressing a surface of the original with spread pages placed on said original placing base;
- a guiding means for guiding a page, to be turned-over, in a direction apart from a surface of a next page of said original; and
- a removing means for removing the turned-over page from said page contacting means.

20. An apparatus according to claim 9, further comprising:

a guiding means for guiding a page, to be turned-over, in a direction apart from a surface of a next page of said original;

at least said page contacting means, said electrode and said guiding means being integrated as a page turning-over unit; and said page turning-over unit being disposed in a unit structure arranged changeably between an opened position and a closed position with respect to said original placing base.

* * * * *